(12) United States Patent
Imaoka et al.

(10) Patent No.: US 7,880,972 B2
(45) Date of Patent: Feb. 1, 2011

(54) PROJECTION OPTICAL SYSTEM

(75) Inventors: Masayuki Imaoka, Izumiotsu (JP);
Tomokazu Masubuchi, Osaka (JP); Jun Ishihara, Kobe (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 376 days.

(21) Appl. No.: 12/165,969

(22) Filed: Jul. 1, 2008

(65) Prior Publication Data
US 2008/0273177 A1 Nov. 6, 2008

Related U.S. Application Data

(62) Division of application No. 11/253,224, filed on Oct. 18, 2005, now Pat. No. 7,411,737.

(30) Foreign Application Priority Data

Nov. 25, 2004 (JP) .............................. 2004-340470
Sep. 6, 2005 (JP) .............................. 2005-257613

(51) Int. Cl.
*G02B 9/00* (2006.01)
*G02B 17/00* (2006.01)
(52) U.S. Cl. ..................... 359/649; 359/726
(58) Field of Classification Search .......... 359/649–651
See application file for complete search history.

(56) References Cited

U.S. PATENT DOCUMENTS

| | | | |
|---|---|---|---|
| 5,191,472 A | 3/1993 | Kurematsu et al. .......... 359/619 |
| 5,390,050 A | 2/1995 | Yanagi et al. ............... 359/742 |
| 6,008,948 A | 12/1999 | Togino ....................... 359/637 |
| 6,513,935 B2 | 2/2003 | Ogawa ......................... 353/37 |
| 6,612,704 B2 | 9/2003 | Ogawa ........................ 353/99 |
| 6,626,541 B2 | 9/2003 | Sunaga ........................ 353/69 |
| 6,626,542 B2 | 9/2003 | Baba et al. .................... 353/98 |
| 6,710,902 B2 | 3/2004 | Takeyama .................... 359/13 |
| 6,752,500 B1 | 6/2004 | Yoshii et al. ................. 353/78 |
| 6,771,427 B1 | 8/2004 | Matsuo ....................... 359/649 |
| 6,779,897 B2 | 8/2004 | Konno et al. ................. 353/99 |
| 6,850,361 B1 | 2/2005 | Nakano et al. ............. 359/365 |
| 7,123,420 B2 * | 10/2006 | Matsuo ..................... 359/649 |
| 7,182,466 B2 | 2/2007 | Sunaga ........................ 353/70 |
| 7,637,621 B2 * | 12/2009 | Takaura et al. ................ 353/99 |
| 2002/0071186 A1 * | 6/2002 | Ohzawa et al. .............. 359/649 |

(Continued)

FOREIGN PATENT DOCUMENTS

JP 2-146535 A 6/1990

(Continued)

OTHER PUBLICATIONS

Japanese "Notice of Reasons for Refusal", dated Dec. 11, 2007, for counterpart Japanese Patent Application No. 2003-090958; along with an English-language translation thereof.

*Primary Examiner*—Jordan M. Schwartz
(74) *Attorney, Agent, or Firm*—Sidley Austin LLP

(57) ABSTRACT

A projection optical system for projecting, while enlarging, an image formed on an image formation surface onto an image projection surface from an oblique direction relative thereto has at least three optically powered reflective surfaces and a refractive lens surface having a non-rotation-symmetric free-form curved surface and disposed between the first and second reflective surfaces as counted from the image formation surface side.

7 Claims, 39 Drawing Sheets

U.S. PATENT DOCUMENTS

| | | | |
|---|---|---|---|
| 2004/0090683 A1 | 5/2004 | Nagata | 359/736 |
| 2004/0201904 A1 | 10/2004 | Togino | 359/720 |
| 2004/0212905 A1 | 10/2004 | Togino | 359/834 |
| 2005/0219671 A1 | 10/2005 | Inoguchi et al. | 359/196 |
| 2006/0056037 A1 | 3/2006 | Kuwa | 359/649 |
| 2009/0153954 A1* | 6/2009 | Smirnov et al. | 359/365 |

FOREIGN PATENT DOCUMENTS

| | | |
|---|---|---|
| JP | 2-153338 A | 6/1990 |
| JP | 4-27928 A | 1/1992 |
| JP | 2000-199852 A | 7/2000 |
| JP | 2002-40326 A | 2/2002 |
| JP | 2002-255462 A | 9/2002 |
| JP | 2002-311379 A | 10/2002 |
| JP | 2003-75767 A | 3/2003 |
| WO | WO 01/11425 A1 | 2/2001 |

* cited by examiner

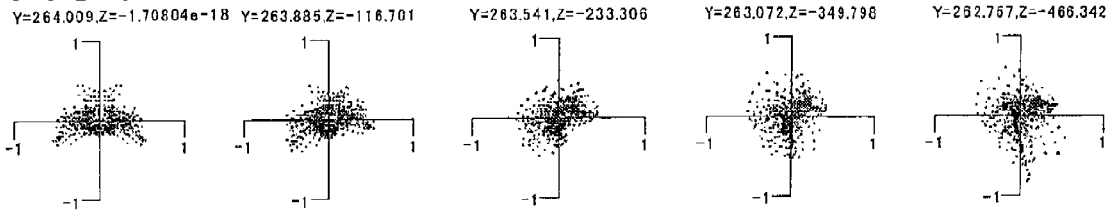
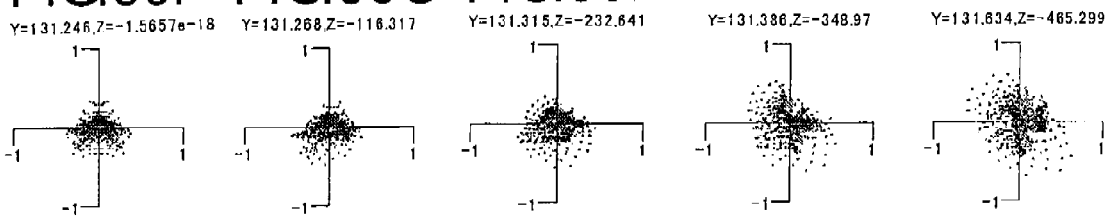
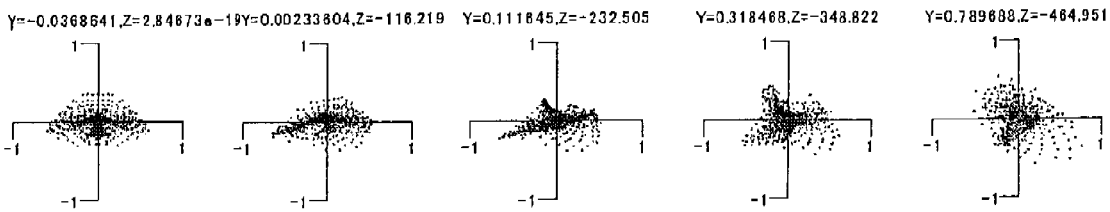
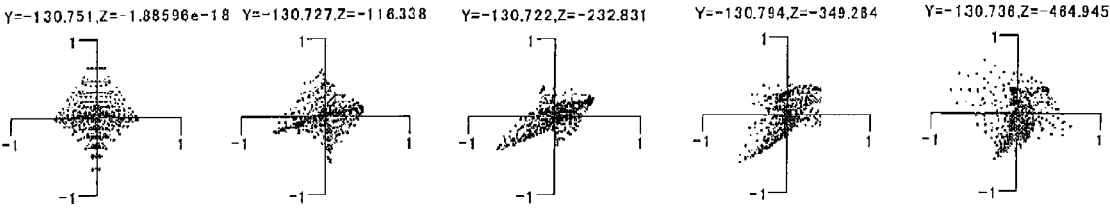
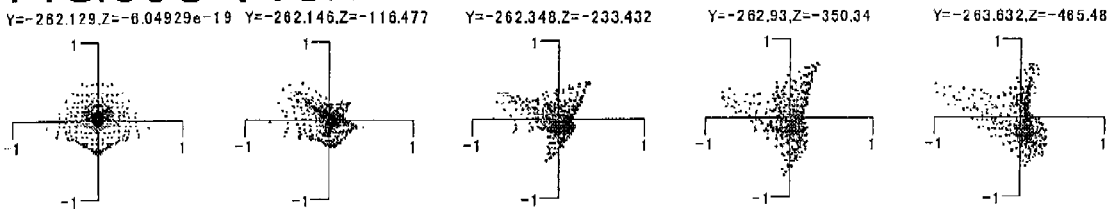

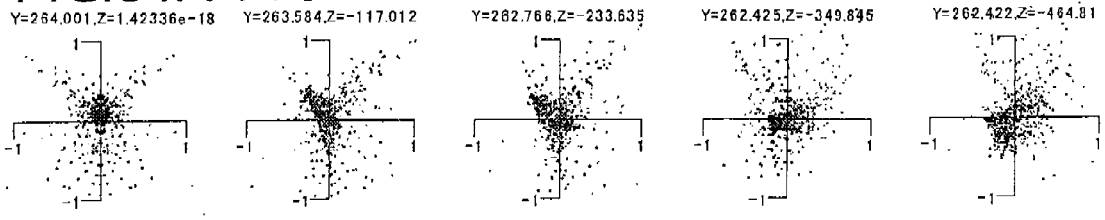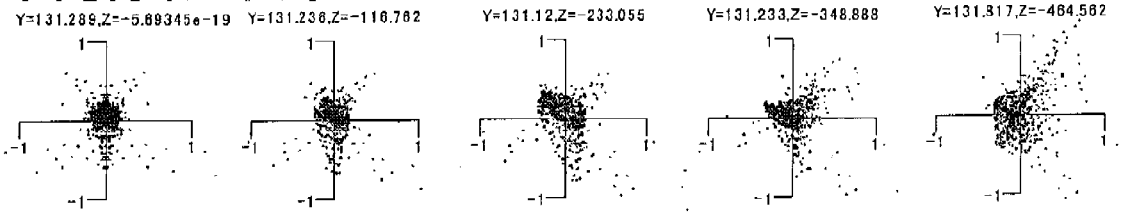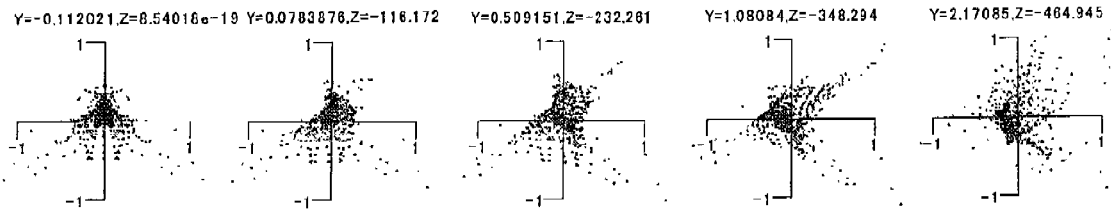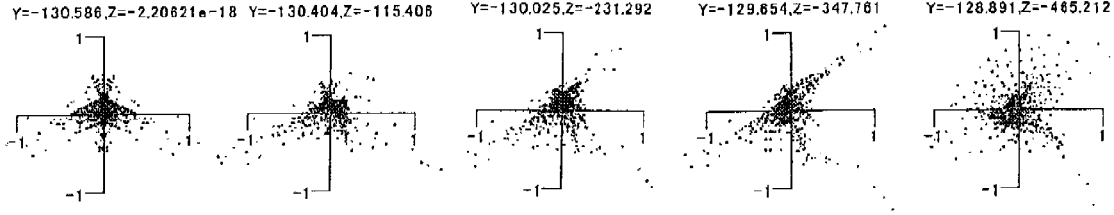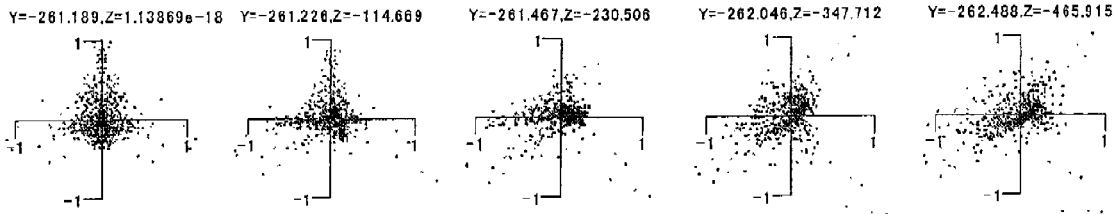

Y=264.002,Z=-2.27738e-18  Y=263.515,Z=-117.046  Y=262.647,Z=-233.787  Y=262.424,Z=-350.009  Y=262.505,Z=-464.214

Y=131.508,Z=0  Y=131.223,Z=-116.586  Y=130.588,Z=-232.807  Y=130.346,Z=-348.532  Y=131.081,Z=-463.182

Y=-0.0711512,Z=-3.41607e-19  Y=-0.0143992,Z=-116.213  Y=0.111008,Z=-232.496  Y=0.446157,Z=-348.575  Y=1.68669,Z=-463.8

Y=-129.746,Z=-1.28103e-18  Y=-129.873,Z=-115.88  Y=-129.522,Z=-232.419  Y=-129.303,Z=-349.225  Y=-128.529,Z=-464.552

Y=-260.494,Z=1.7792e-19  Y=-260.874,Z=-115.423  Y=-261.199,Z=-232.1  Y=-261.859,Z=-349.397  Y=-262.029,Z=-464.04

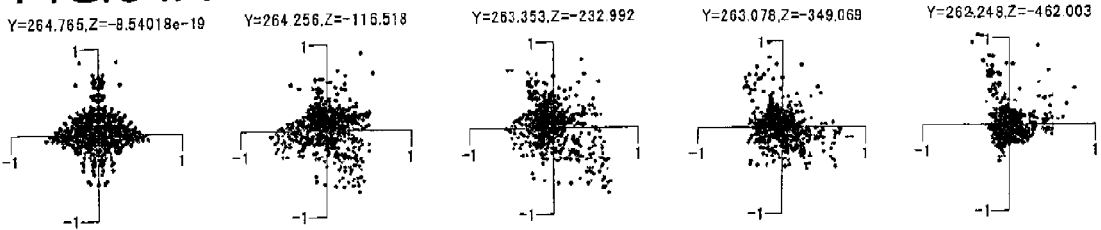
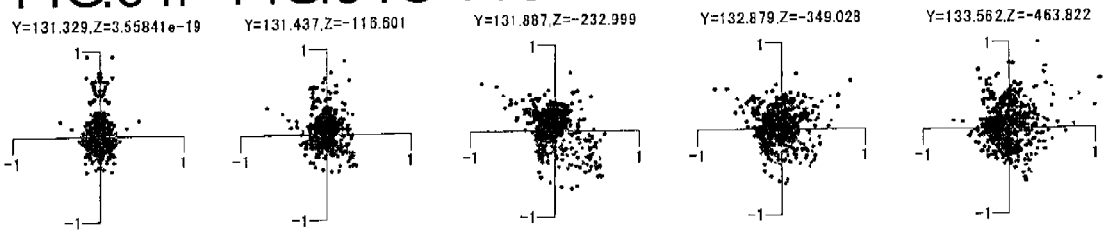
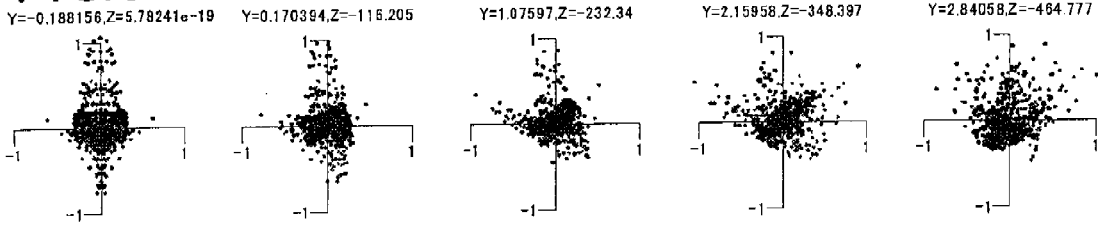
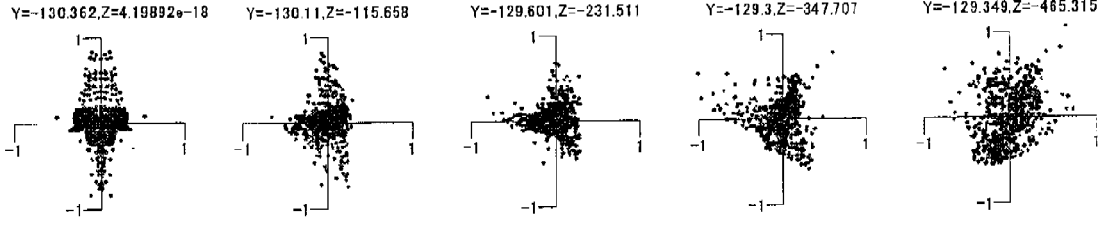
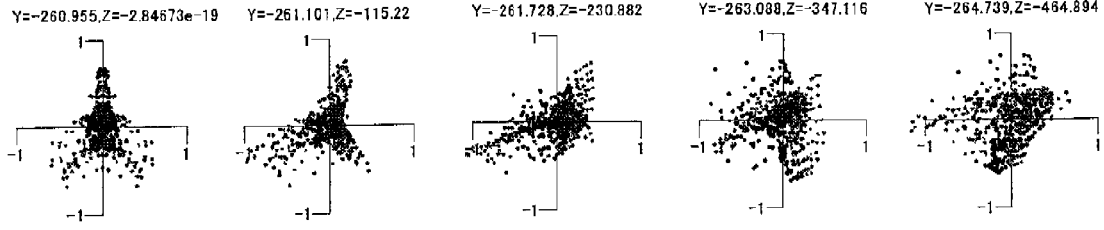

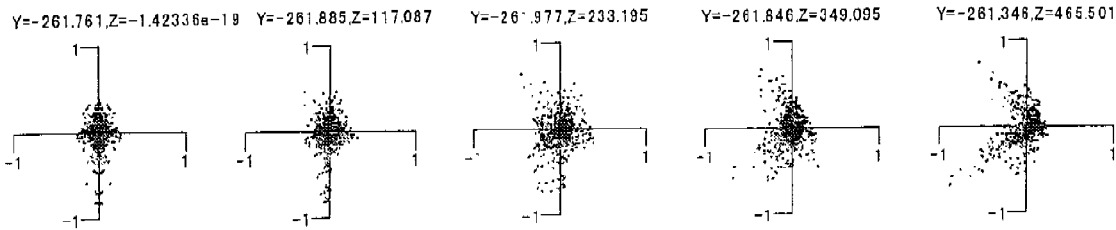
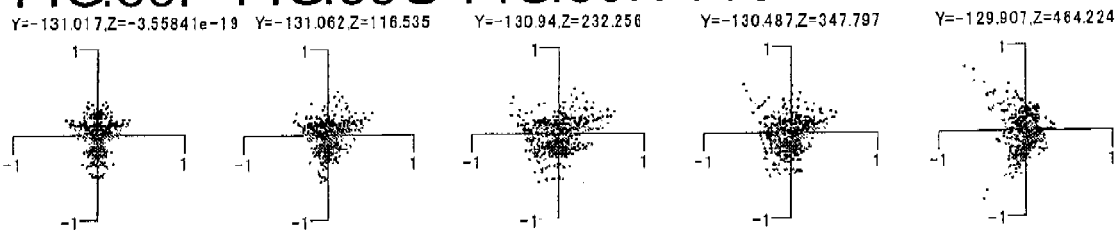
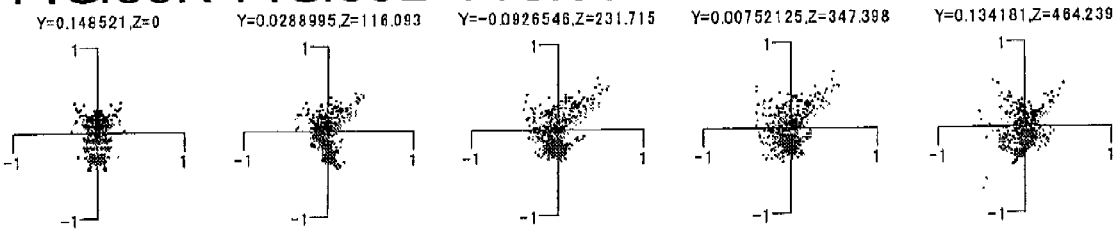
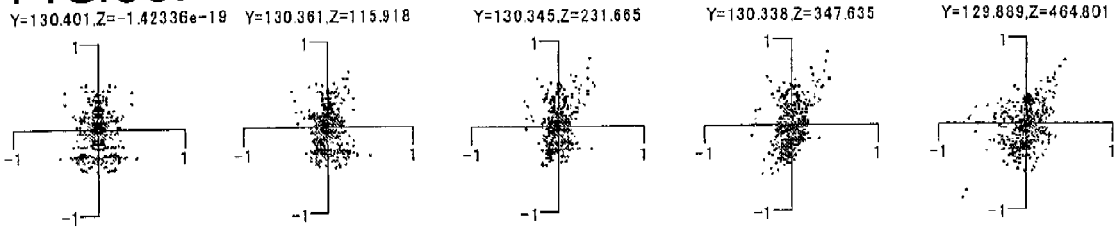
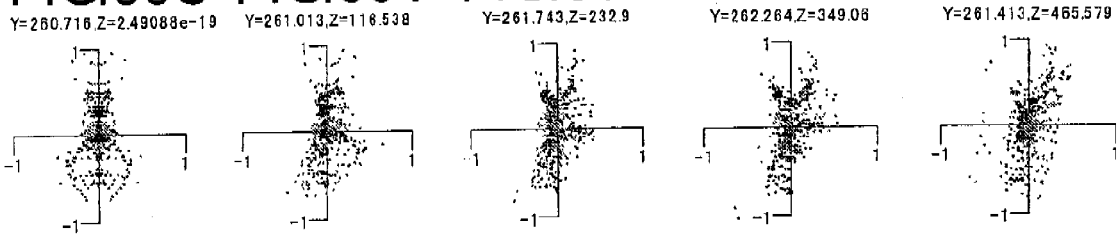

PROJECTION OPTICAL SYSTEM

This application is a divisional of U.S. application Ser. No. 11/253,224, filed Oct. 18, 2005, allowed, which is based on Japanese Patent Application No. 2003-90958 filed on Mar. 28, 2003, Japanese Patent Application No. 2004-340470 filed on Nov. 25, 2004, and Japanese Patent Application No. 2005-257613 filed on Sep. 6, 2005, the contents of all of which are hereby incorporated by reference.

BACKGROUND OF THE INVENTION

1. Field of the Invention

The present invention relates to an image projection apparatus, and more particularly to an image projection apparatus having reflective and refractive optical surfaces incorporated in an oblique projection optical system in a construction suitable for rear projection.

2. Description of Related Art

A common rear projection apparatus incorporates a rear projection optical system that achieves slimming-down by bending the optical path of the light exiting from a projection optical system with a single reflective mirror disposed behind a screen. However, since the projection optical system used here is a coaxial optical system, the ray incident on the image center on the screen surface needs to be substantially perpendicular to the screen surface. This makes it difficult for a rear projection optical system to have a thickness smaller than a certain thickness.

For further slimming-down, therefore, various optical constructions have been proposed. For example, Patent Publications 1 to 5 listed below propose rear projection optical systems in which the optical path of a projection optical system is bent with two flat-surface reflective mirrors.

Patent Publication 1: Japanese Patent Application Laid-open No. H4-27928
Patent Publication 2: U.S. Pat. No. 5,191,472
Patent Publication 3: Japanese Patent Application Laid-open No. H2-153338
Patent Publication 4: Japanese Patent Application Laid-open No. H2-146535
Patent Publication 5: U.S. Pat. No. 5,390,050

With conventional rear projection optical systems, however, either satisfactory slimming-down is difficult, or slimming-down causes new problems. For example, the rear projection optical system proposed in Patent Publication 1 adopts a re-imaging projection optical system that projects a displayed image onto a screen surface after once imaging the image. This makes it inevitable for the projection optical system to become unduly large. Moreover, this construction requires a so-called oblique projection optical system that permits the ray incident on the image center on the screen surface to be incident thereon at a large angle of incidence. The Patent Publication 1, however, gives no description of any practical optical construction of such an oblique projection optical system. Likewise, the rear projection optical systems proposed in Patent Publications 2 to 5 also require oblique projection optical systems for slimming-down, but Patent Publications 2 to 5 leave the constructions of those projection optical systems unexplained.

An oblique projection optical system is usually realized by using part of a coaxial optical system. To slim down a rear projection optical system, however, the angle of projection of the principal ray needs to be made extremely large. This makes it necessary to use part of an extremely wide-angle coaxial optical system. A wide-angle optical system typically requires a large number of lenses, and these lenses tend to have extremely large diameters. Thus, using a wide-angle optical system makes the entire optical system unduly large.

As examples of wide-angle projection optical systems, oblique projection optical systems employing curved reflective surfaces alone are proposed in Patent Publications 6 and 7 listed below, and optical systems employing both a curved reflective surface and a refractive surface are proposed in Patent Publications 8 and 9 listed below.

Patent Publication 6: U.S. Pat. No. 6,513,935
Patent Publication 7: U.S. Pat. No. 6,779,897
Patent Publication 8: U.S. Pat. No. 6,008,948
Patent Publication 9: U.S. Pat. No. 6,850,361

In the projection optical system proposed in Patent Publication 6, however, four curved reflective surfaces alone are responsible for correction of aberrations. As a result, when this projection optical system is used as a wide-angle projection optical system, to correct aberrations that appear because of a wider angle, the curved reflective mirrors having those curved reflective surfaces formed thereon, in particular the one disposed at the enlargement-side end, need to be made larger. This is disadvantageous in terms of mass producibility, cost, and product size reduction. The projection optical system proposed in Patent Publication 7 includes many curved reflective surfaces each formed as a free-form curved surface. Free-form curved surfaces are generally more difficult to deal with, in terms of mold fabrication, molding, evaluation, adjustment, etc. than rotation-symmetric aspherical surfaces and spherical surfaces. Thus, using many free-form curved surfaces as optically highly sensitive optical surfaces may lead to low mass producibility. The optical system proposed in Patent Publication 8 is composed solely of a free-form curved surface prism. The last optical surface here is a refractive surface, and thus, when this optical system is used as a wide-angle projection optical system, its size is unduly large. This makes it extremely difficult to perform molding with high accuracy. In the optical system proposed in Patent Publication 9, an aberration correction surface is disposed only near an aperture stop. This results in unsatisfactory correction of distortion, curvature of field, and astigmatism, which are notably large in a wide-angle optical system, and thus does not contribute to mirror size reduction. Moreover, here, only spherical and rotation-symmetric aspherical surfaces are employed as reflective surfaces. This makes it extremely difficult to realize a wide-angle, high-performance projection optical system.

SUMMARY OF THE INVENTION

In view of the conventionally encountered inconveniences discussed above, it is an object of the present invention to provide a slim, large-screen image projection apparatus composed of compact optical components that, despite offering satisfactory optical performance, is advantageous in terms of mass producibility and cost.

To achieve the above object, according to one aspect of the present invention, a projection optical system for projecting, while enlarging, an image formed on an image formation surface onto a screen surface from an oblique direction relative thereto is provided with: at least three optically powered reflective surfaces; and a refractive lens surface having a non-rotation-symmetric free-form curved surface and disposed between the first and second reflective surfaces as counted from the image formation surface side.

According to another aspect of the present invention, a projection optical system for projecting, while enlarging, an image formed on an image formation surface onto a screen surface from an oblique direction relative thereto is provided with, from the image formation surface side: a first curved reflective surface; a refractive optical element having as a refractive surface a non-rotation-symmetric free-form curved surface; a second curved reflective surface; a third curved reflective surface that is a non-rotation-symmetric free-form curved surface; and a fourth curved reflective surface that is a non-rotation-symmetric free-form curved surface.

According to another aspect of the present invention, a projection optical system for projecting, while enlarging, an image formed on an image formation surface onto a screen surface from an oblique direction relative thereto is provided with: four optically powered reflective surfaces; and a refractive lens surface having a non-rotation-symmetric free-form curved surface and disposed in the optical path on the screen side of the reflective surface located closest to an image forming device. Here, the third and fourth reflective surfaces as counted from the image forming device side are non-rotation-symmetric free-form curved surfaces, and the free-form curved surface of the refractive lens surface is plane-symmetric about at most one plane of symmetry.

According to another aspect of the present invention, a projection optical system for projecting, while enlarging, an image formed on an image formation surface onto a screen surface from an oblique direction relative thereto is provided with: four optically powered reflective surfaces; and a refractive lens surface having a non-rotation-symmetric free-form curved surface and disposed in the optical path on the screen side of the reflective surface located closest to the image forming device. Here, of the reflective surfaces, at most two are eccentric rotation-symmetric optical surfaces and the rest are non-rotation-symmetric free-form curved surfaces.

According to another aspect of the present invention, a projection optical system for projecting, while enlarging, an image formed on an image formation surface onto a screen surface obliquely relative thereto is provided with: a plurality of curved reflective surfaces; and at least one aberration correcting refractive surface. Here, at least one of the aberration correcting refractive surface fulfills conditional formula (4b) below, and is located in the optical path on the enlargement side of the first convex reflective surface as counted from the reduction side, and the most enlargement-side curved optical surface is a reflective surface:

$$1.1 < Lr/La < 2 \quad (4b)$$

where, let the ray traveling from the image center on the image formation surface through the center of the pupil to the image center on the screen surface be called a "reference ray",
La represents the distance from the image formation surface to the pupil along the reference ray; and
Lr represents the distance from the image formation surface to the aberration correction refractive surface along the reference ray.

BRIEF DESCRIPTION OF THE DRAWINGS

FIGS. 30A to 30Y are spot diagrams of Example 5;
FIGS. 31A to 31Y are spot diagrams of Example 6;
FIGS. 34A to 34Y are spot diagrams of Example 9;
FIGS. 35A to 35Y are spot diagrams of Example 10;

DETAILED DESCRIPTION OF PREFERRED EMBODIMENTS

Hereinafter, image projection apparatuses and projection optical systems embodying the present invention will be described with reference to the accompanying drawings.

First to Fourth Embodiments

FIGS. 1 to 3, FIGS. 4 to 6, FIGS. 7 to 9, and FIGS. 10 to 12 show the projection optical constructions (the optical arrangement of the oblique projection optical system, the projection optical path, etc.) of the rear-projection-type image projection apparatuses (rear projectors) of a first to a fourth embodiment, respectively, of the invention. FIGS. 1, 4, 7, and 10 show the optical constructions along the entire projection optical path of the first to fourth embodiments, respectively, as seen in a XY-plane section in a rectangular coordinate system (X, Y, Z). FIGS. 2, 5, 8, and 11 show the optical constructions along the entire projection optical path of the first to fourth embodiments, respectively, as seen in a XZ-plane section in the rectangular coordinate system (X, Y, Z). FIGS. 3, 6, 9, and 12 are enlarged views of principal portions of FIGS. 1, 4, 7, and 10, respectively. In FIGS. 1 to 12, the following reference symbols are used: LV represents an image forming device (light valve, or display device); GP represents a glass plate; GL represents a refractive lens; M1 to M5 represent a first to a fifth projection mirror, respectively; SC represents a screen; S0 represents the image formation surface (panel display surface) of the image forming device LV; S1 to S9 represent a first to a ninth surface, respectively; and S10 represents the image projection surface (screen surface) on the screen SC. The origin (0) of the rectangular coordinate system (X, Y, Z) is located at the center of the image formation surface S0 of the image forming device LV. The image formation surface S0 and the image projection surface S10 are parallel to the YZ-plane.

Figure 1:
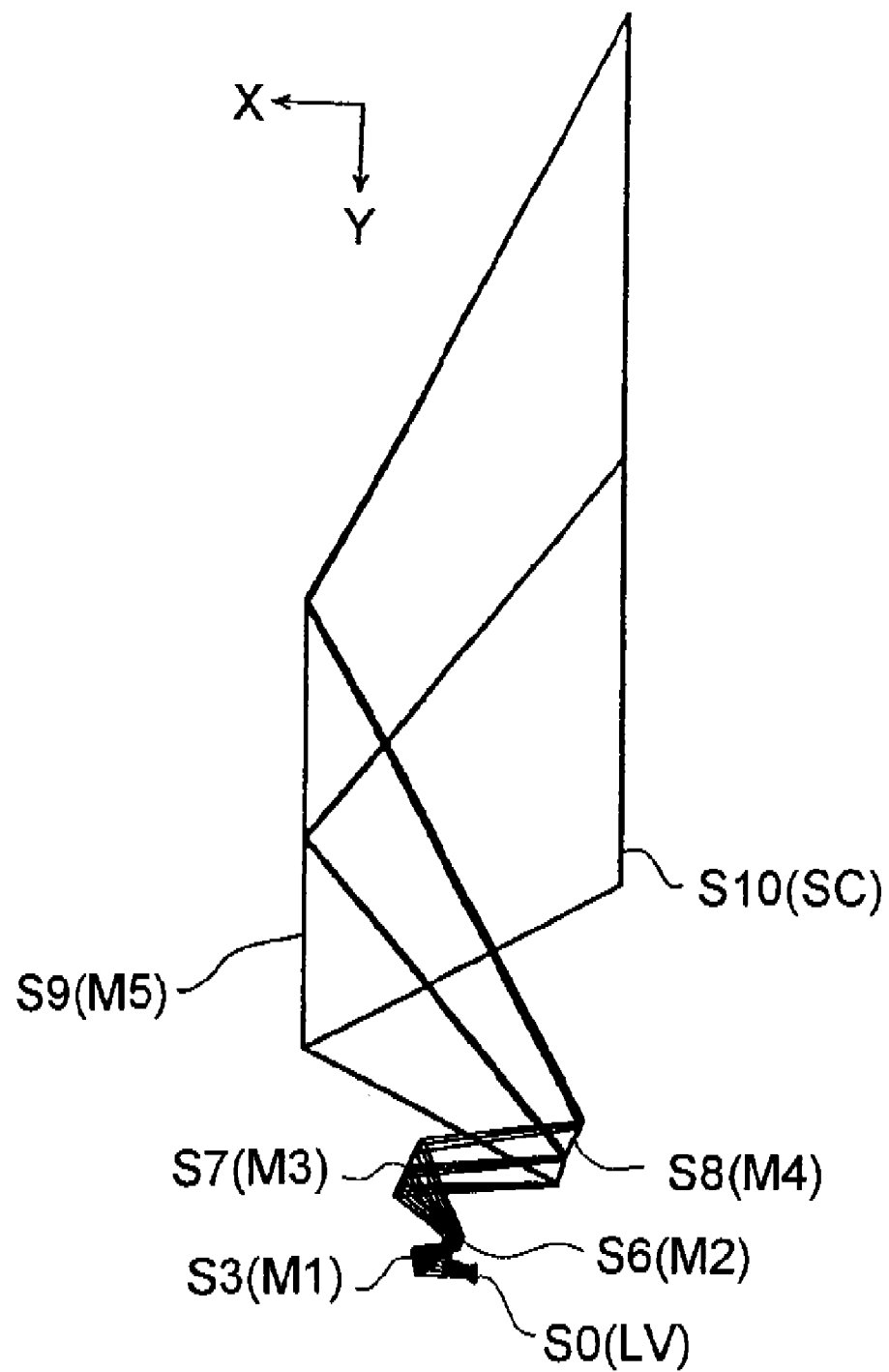
FIG. 1 is an XY-plane sectional view of a first embodiment (Example 1) of the invention, showing the projection optical construction and projection optical path thereof.
Figure 2:
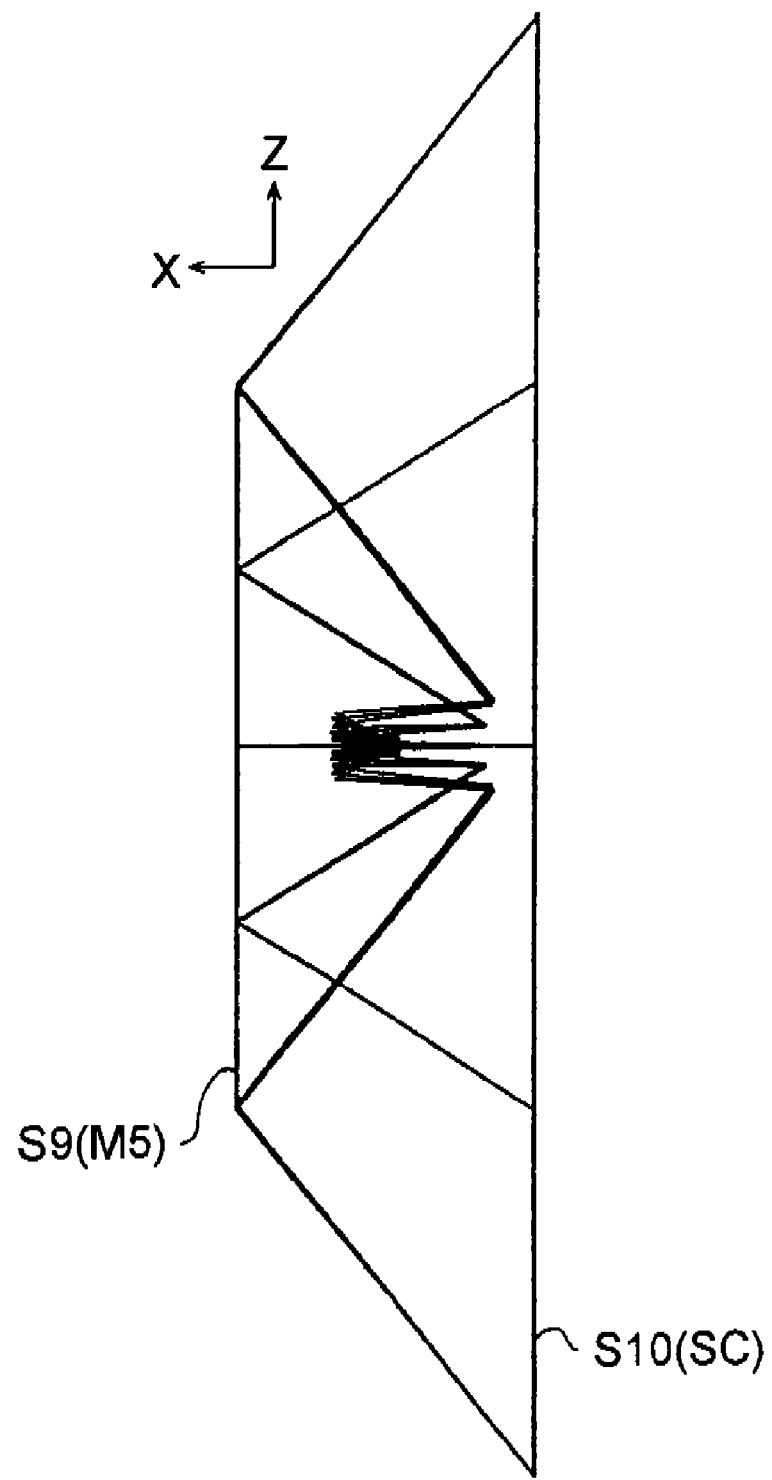
FIG. 2 is an XZ-plane sectional view of the first embodiment (Example 1), showing the projection optical construction and projection optical path thereof.
Figure 3:
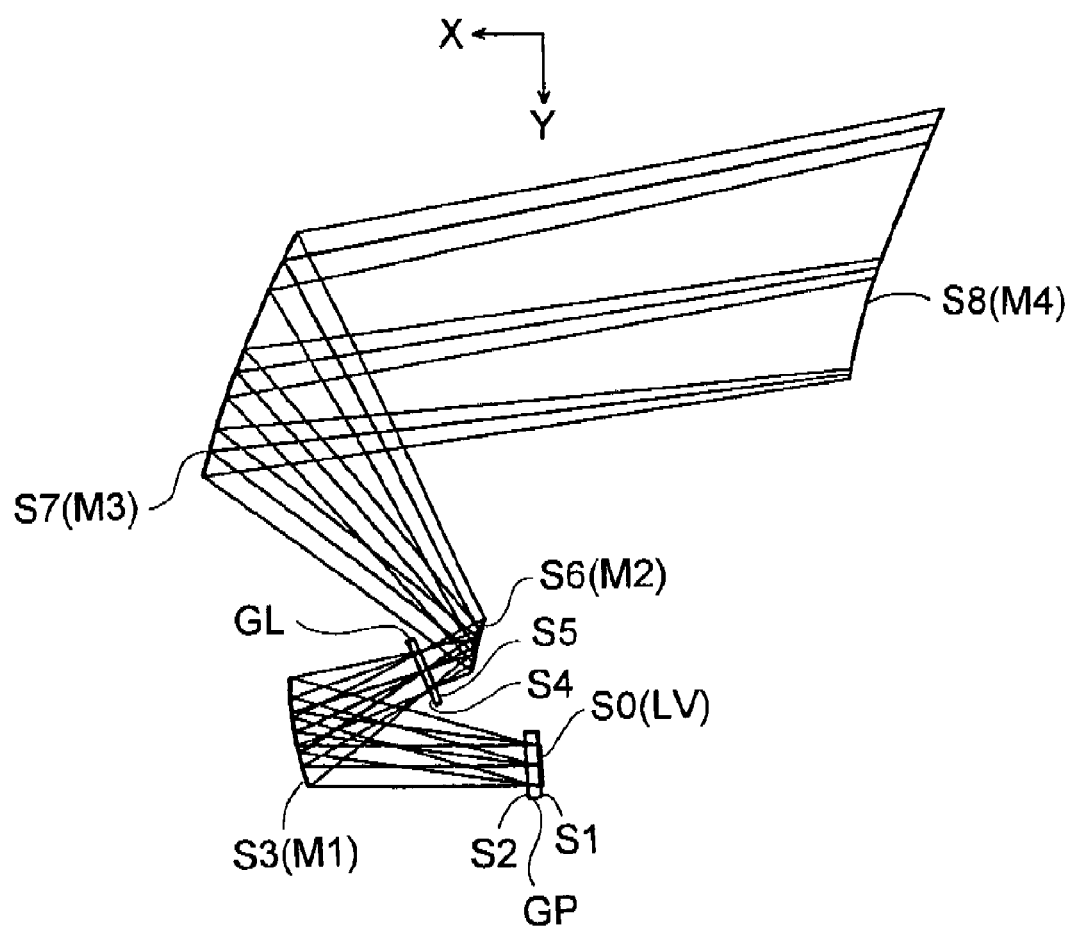
FIG. 3 is an enlarged view of a principal portion of FIG. 1.
Figure 4:
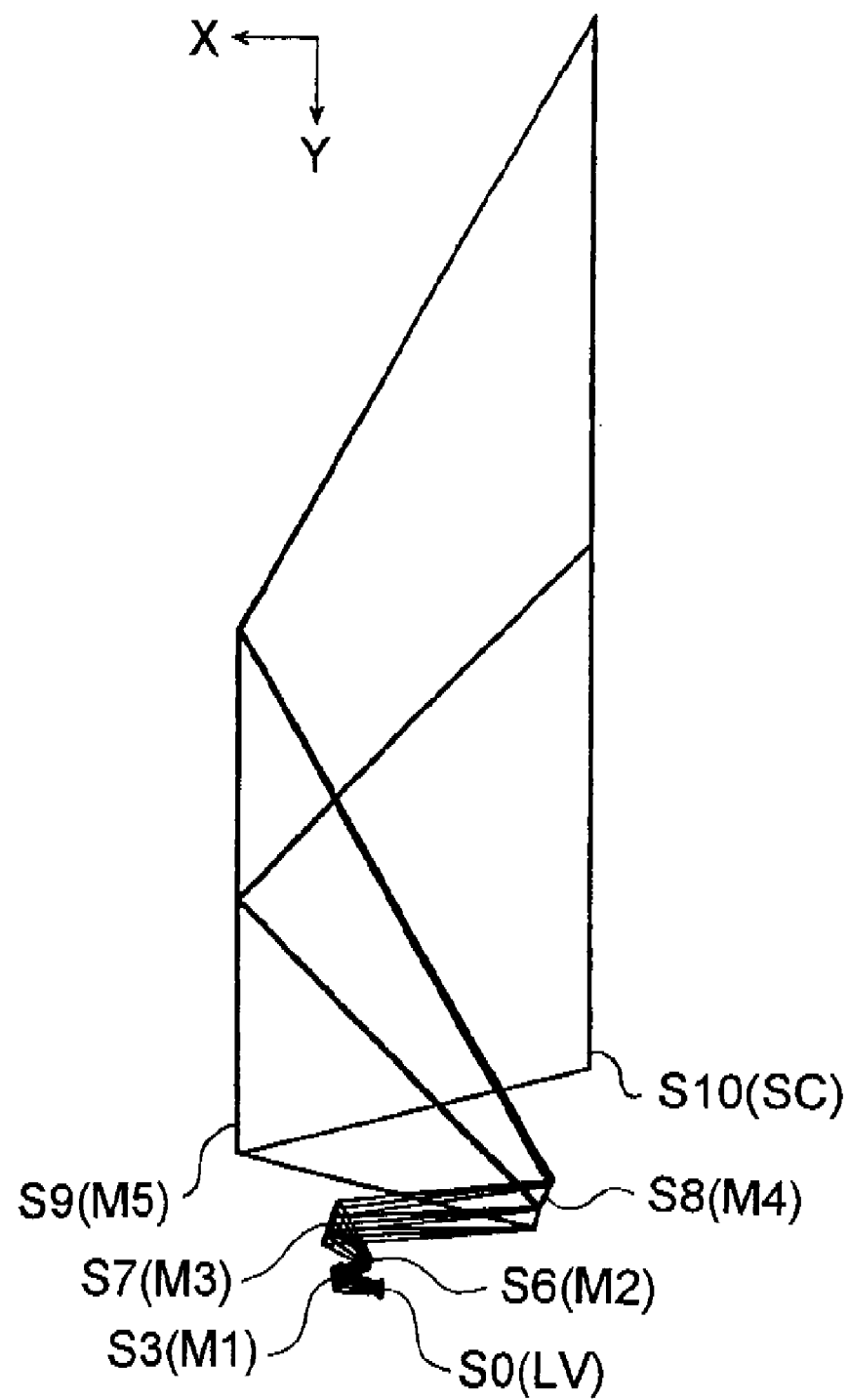
FIG. 4 is an XY-plane sectional view of a second embodiment (Example 2) of the invention, showing the projection optical construction and projection optical path thereof.
Figure 5:
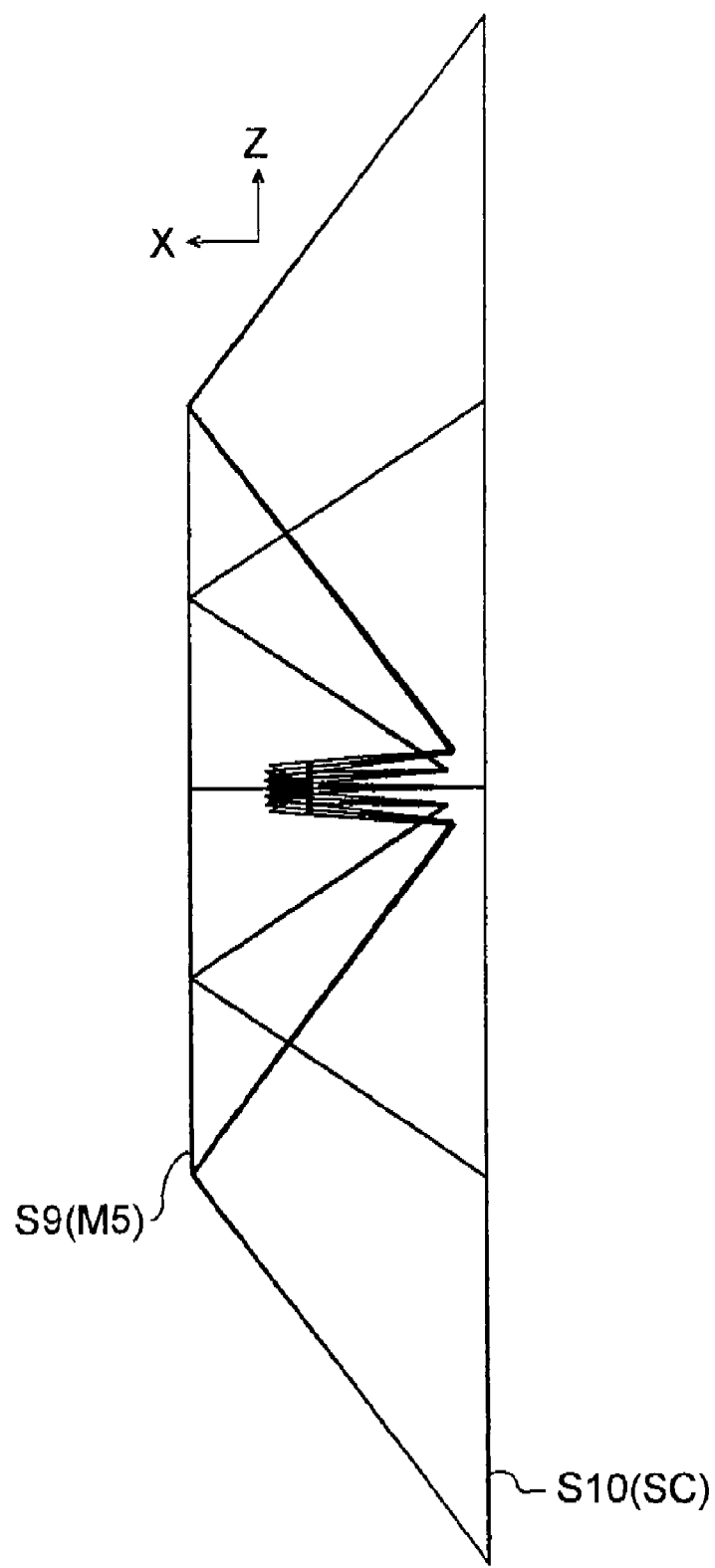
FIG. 5 is an XZ-plane sectional view of the second embodiment (Example 2), showing the projection optical construction and projection optical path thereof.
Figure 6:
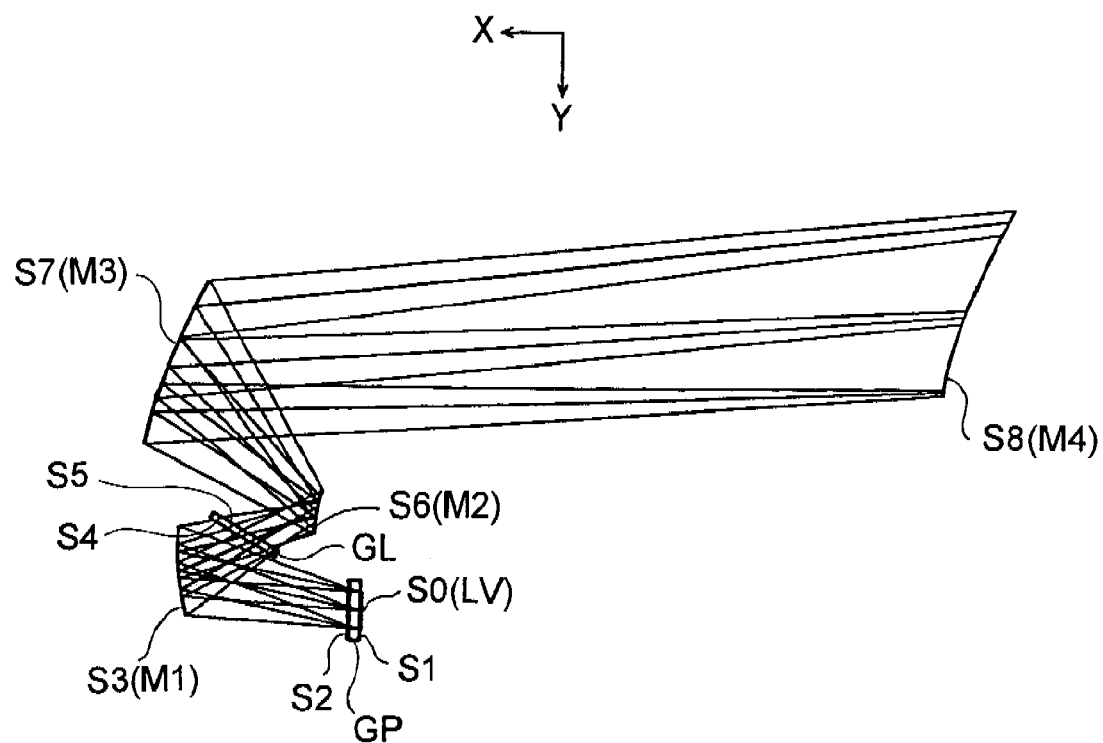
FIG. 6 is an enlarged view of a principal portion of FIG. 4.
Figure 7:
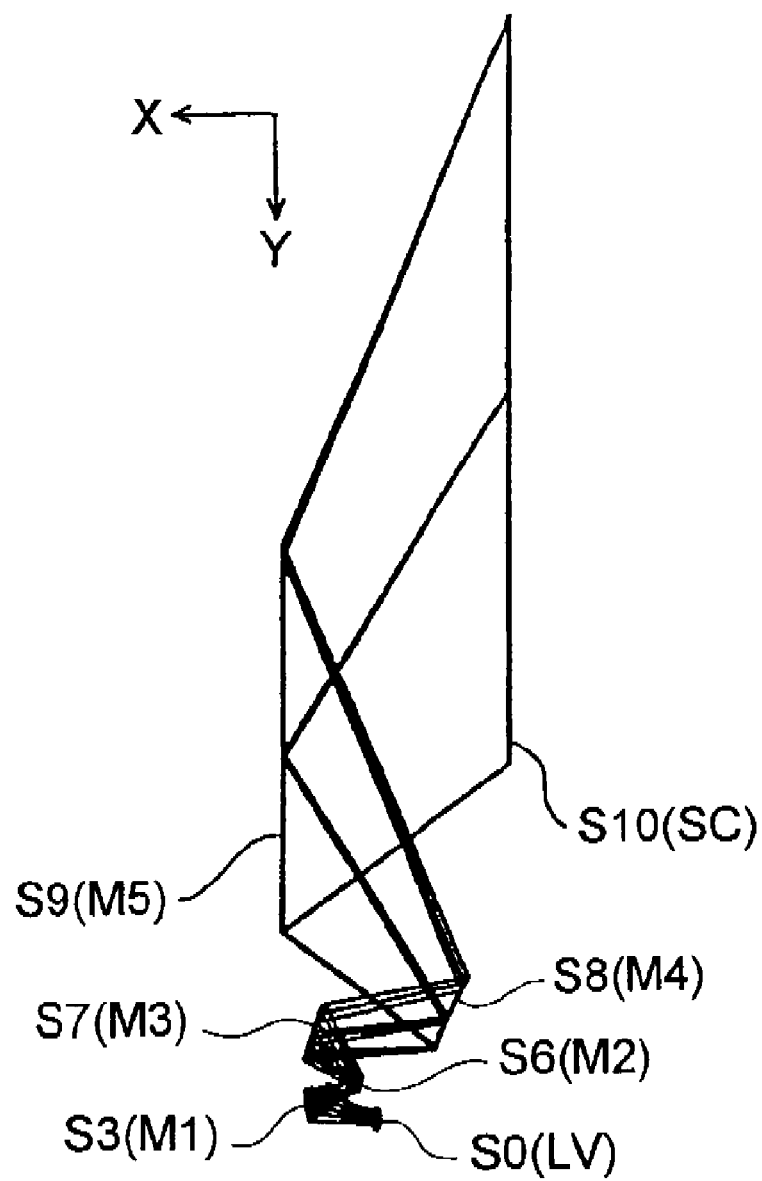
FIG. 7 is an XY-plane sectional view of a third embodiment (Example 3) of the invention, showing the projection optical construction and projection optical path thereof.
Figure 8:
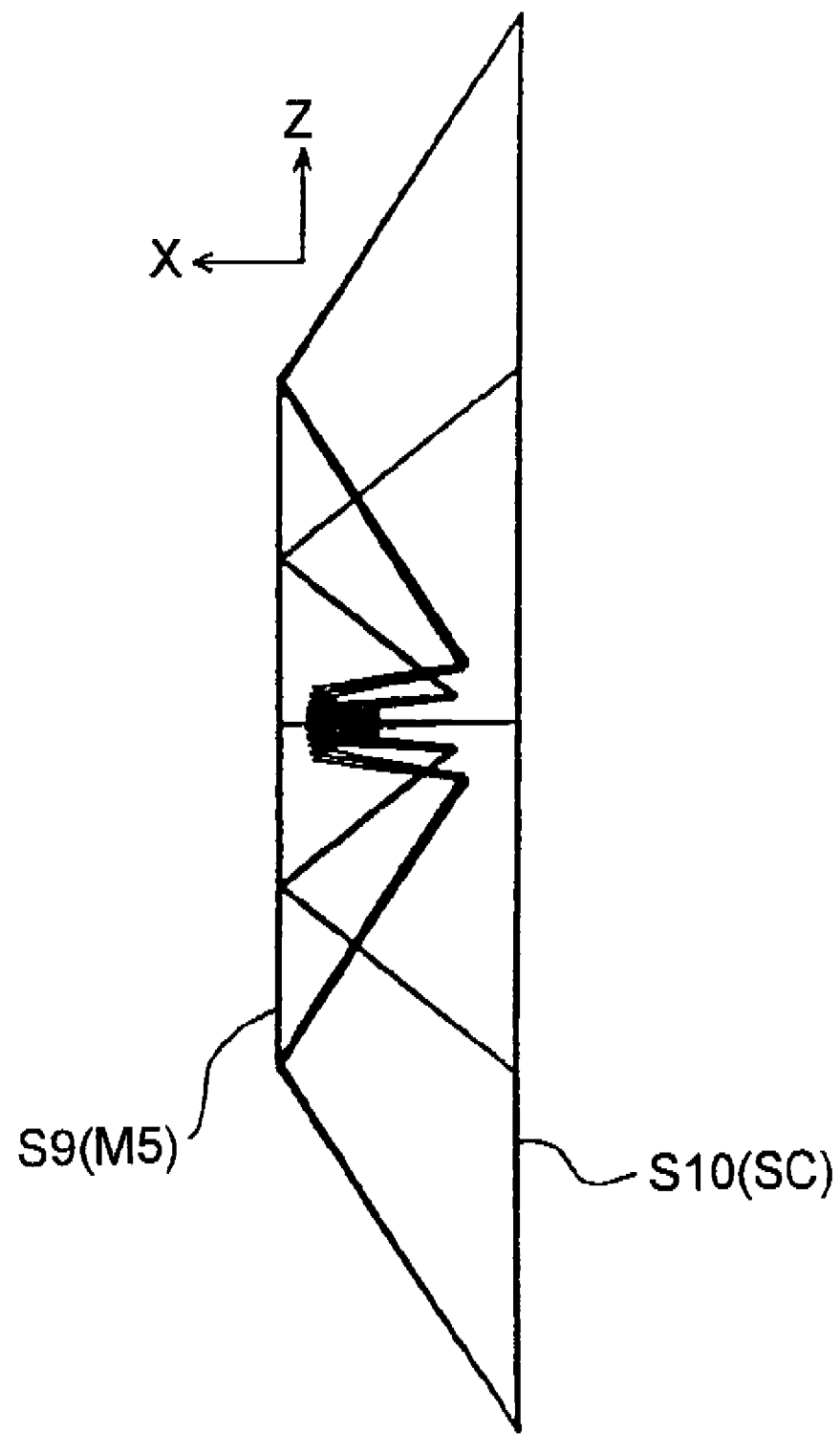
FIG. 8 is an XZ-plane sectional view of the third embodiment (Example 3), showing the projection optical construction and projection optical path thereof.
Figure 9:
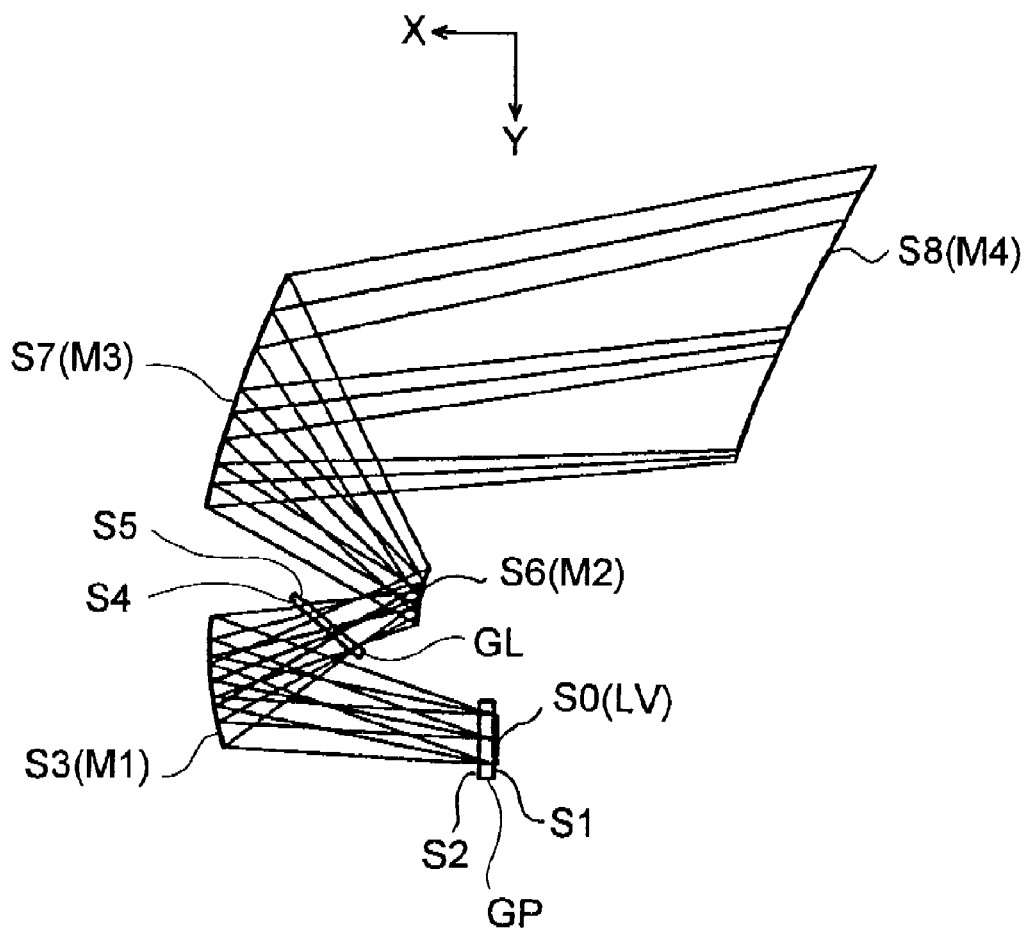
FIG. 9 is an enlarged view of a principal portion of FIG. 7.
Figure 10:
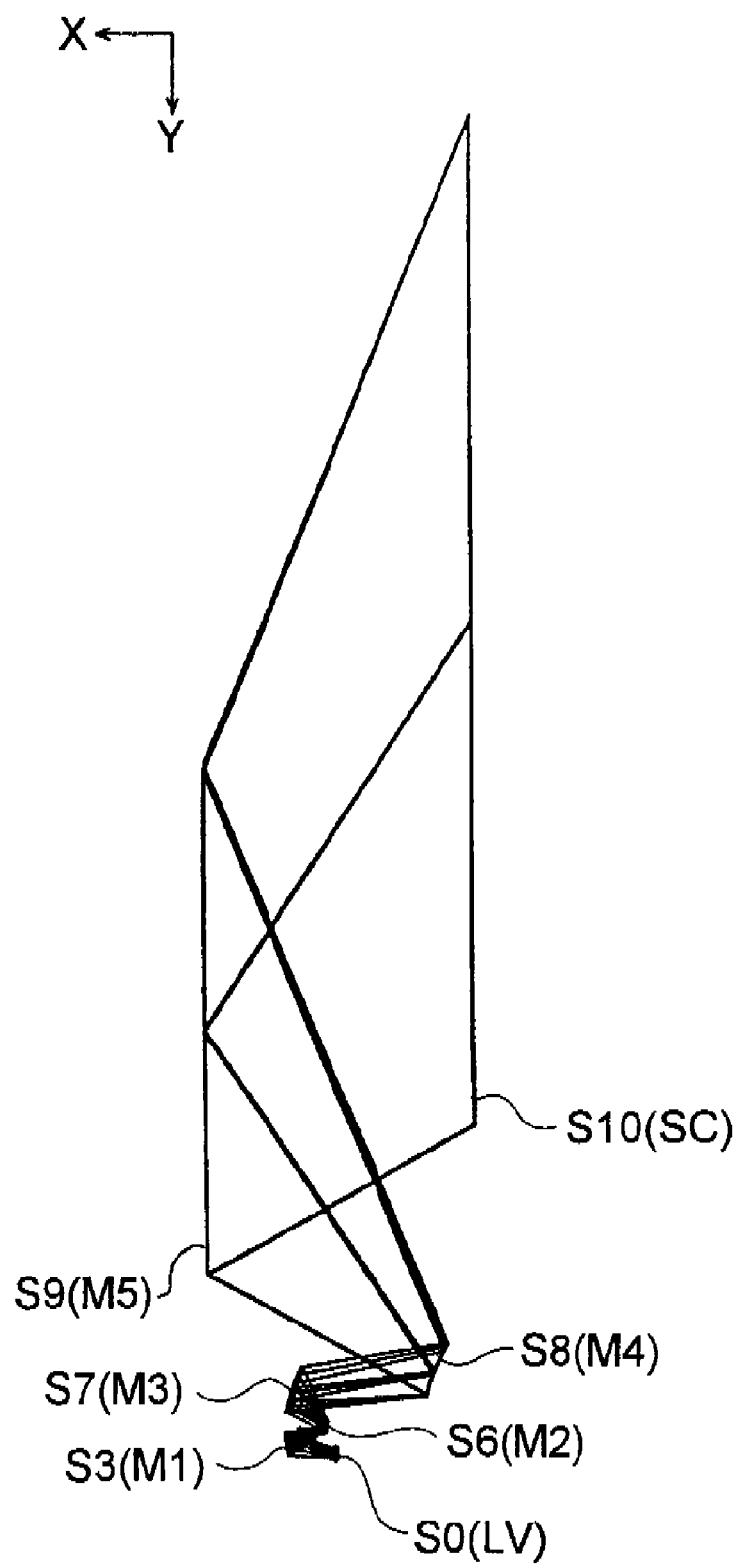
FIG. 10 is an XY-plane sectional view of a fourth embodiment (Example 4) of the invention, showing the projection optical construction and projection optical path thereof.
Figure 11:
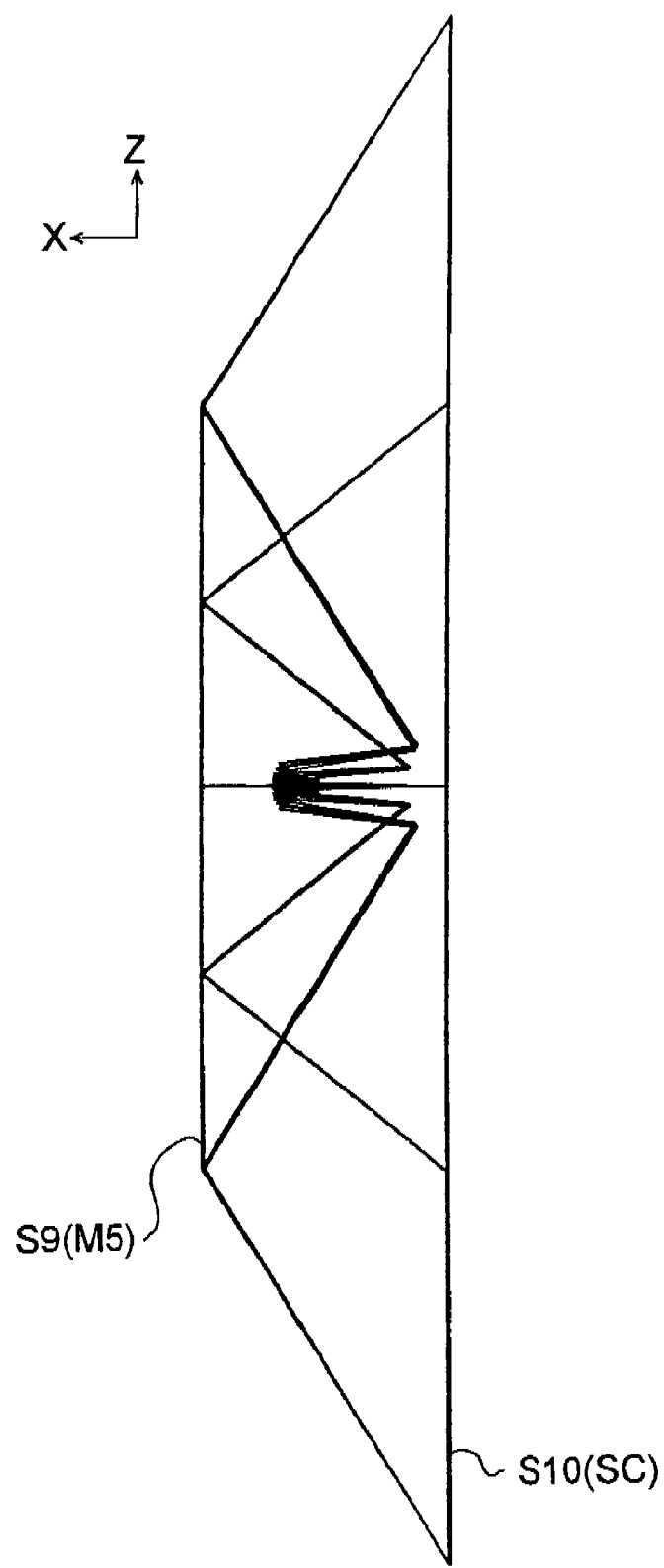
FIG. 11 is an XZ-plane sectional view of the fourth embodiment (Example 4), showing the projection optical construction and projection optical path thereof.
Figure 12:
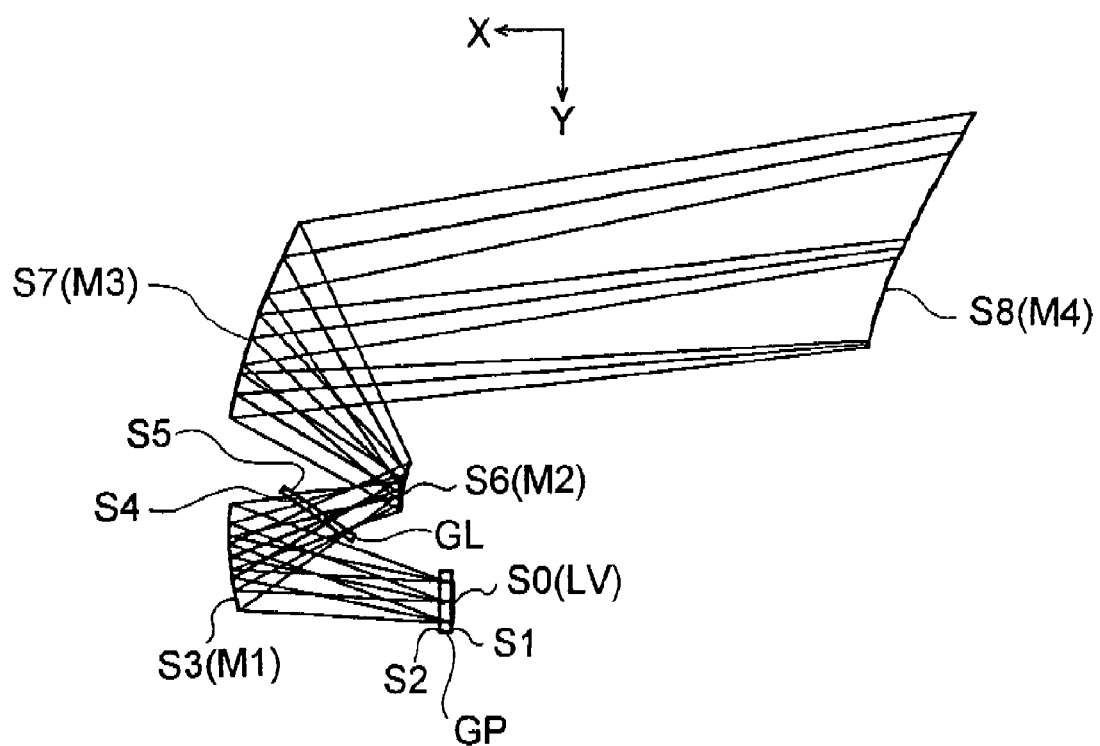
FIG. 12 is an enlarged view of a principal portion of FIG. 10.
Figure 13:
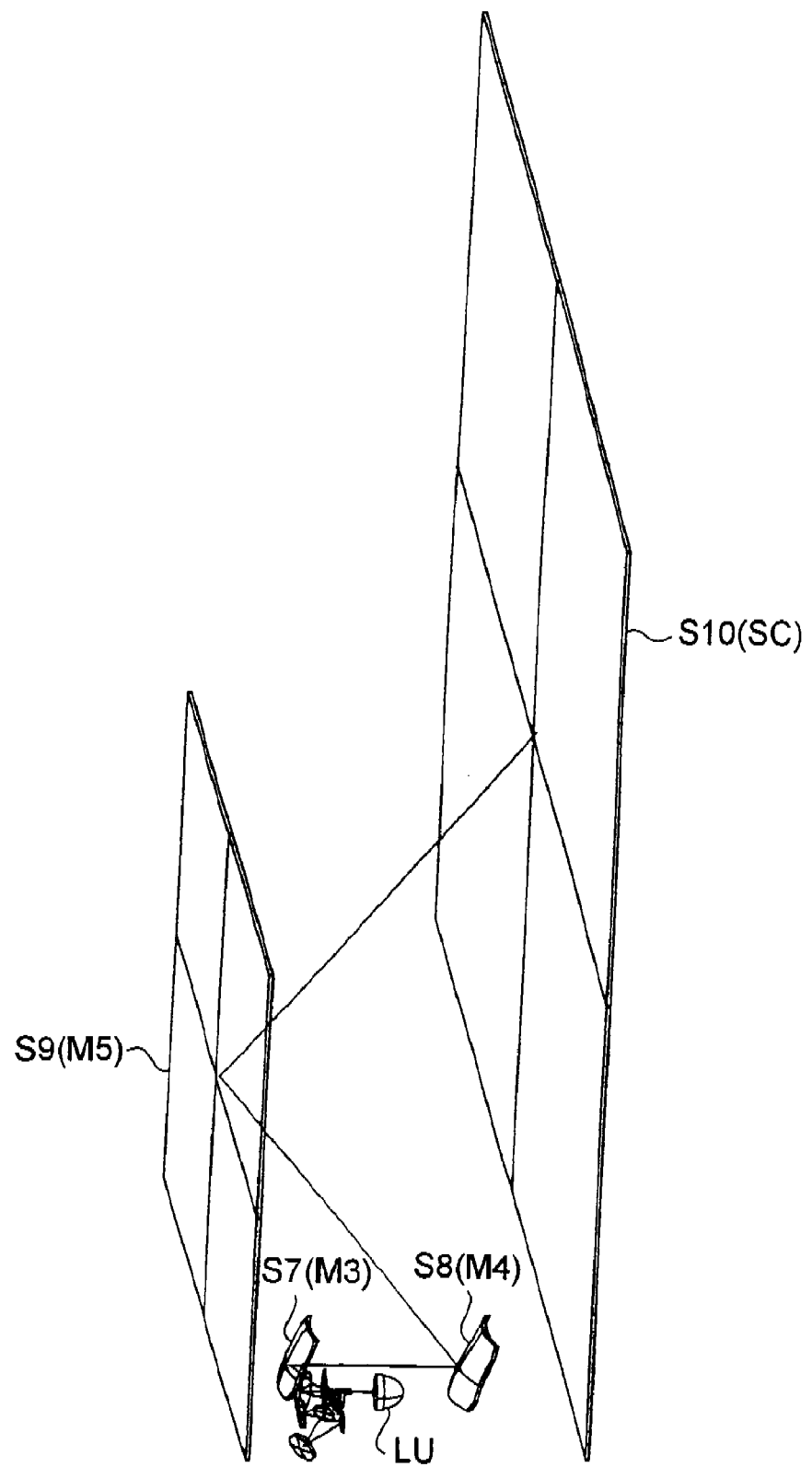
FIG. 13 is a perspective view showing the entire optical construction of an image projection apparatus embodying the invention.
Figure 14:
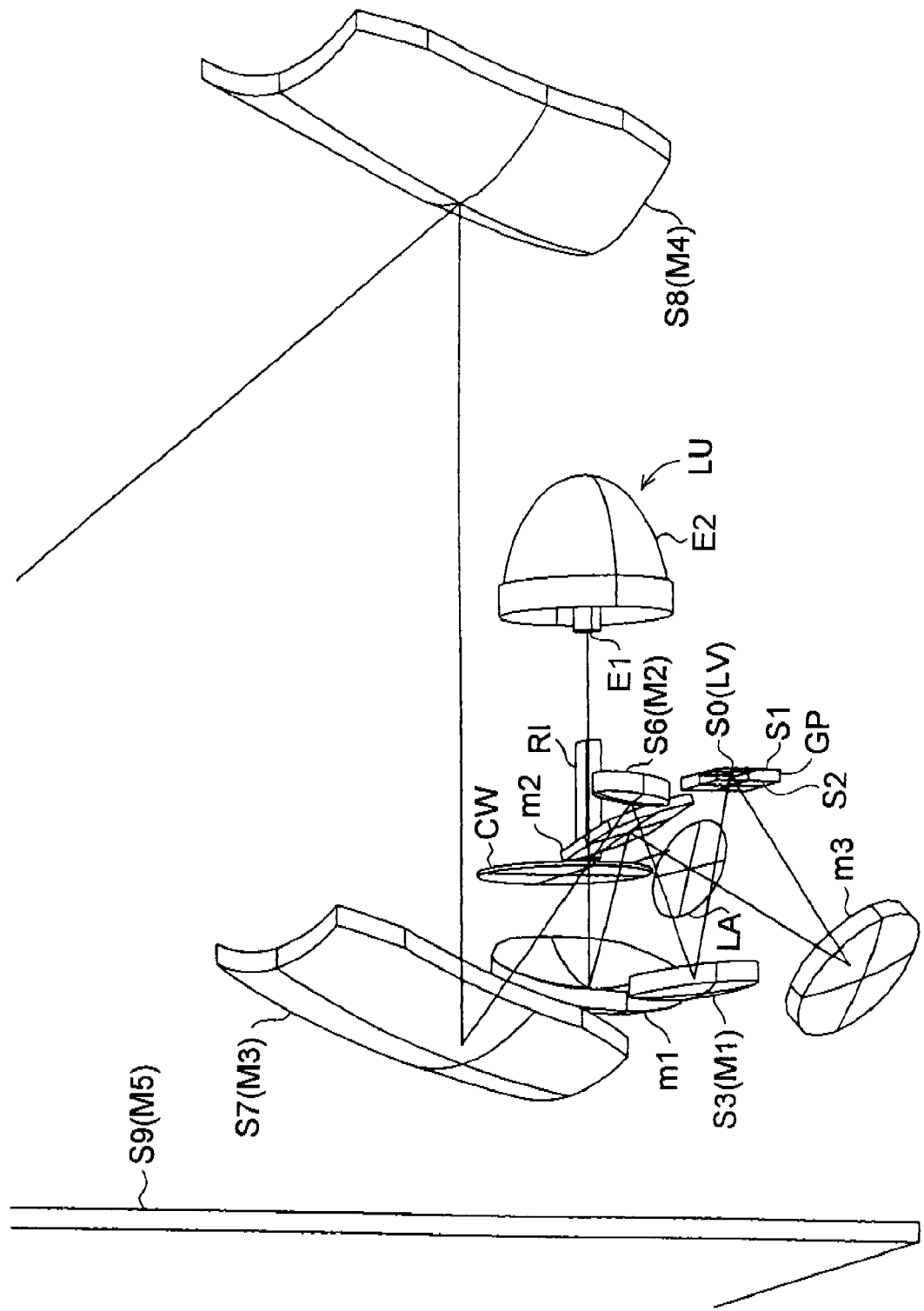
FIG. 14 is an enlarged view of a principal portion of FIG. 13.
Figures 15A, 15B, 15C, 15D, 15E:
FIGS. 15A to 15Y are spot diagrams of Example 1 (at 20° C.)
Figures 15F, 15G, 15H, 15I, 15J:
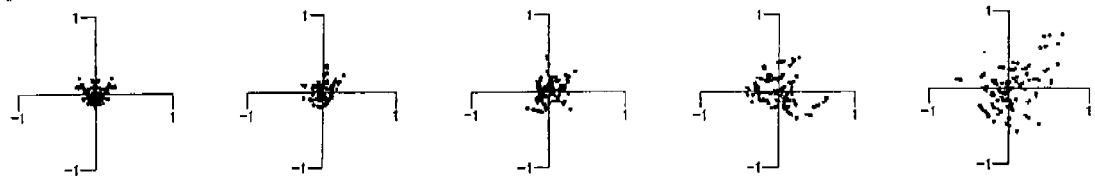
Figures 15K, 15L, 15M, 15N, 15O:
Figures 15P, 15Q, 15R, 15S, 15T:
Figures 15U, 15V, 15W, 15X, 15Y:
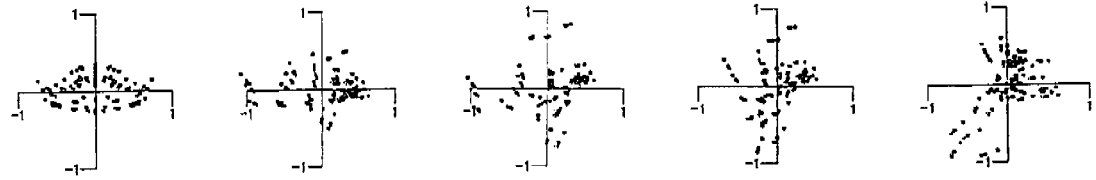
Figures 16A, 16B, 16C, 16D, 16E:
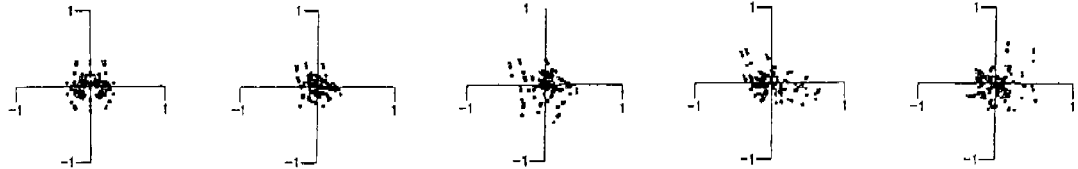
FIGS. 16A to 16Y are spot diagrams of Example 1 (at 50° C.)
Figures 16F, 16G, 16H, 16I, 16J:
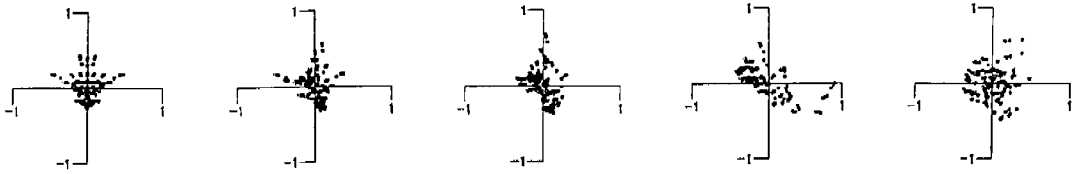
Figures 16K, 16L, 16M, 16N, 16O:
Figures 16P, 16Q, 16R, 16S, 16T:
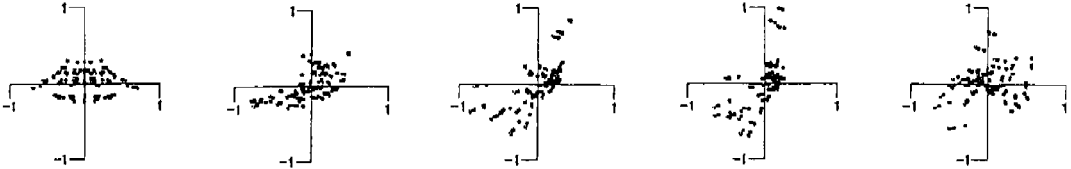
Figures 16U, 16V, 16W, 16X, 16Y:
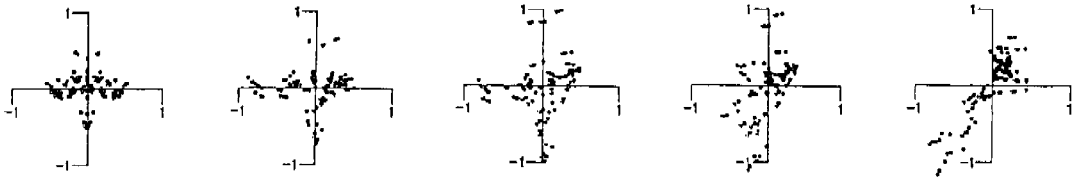
Figures 17A, 17B, 17C, 17D, 17E:
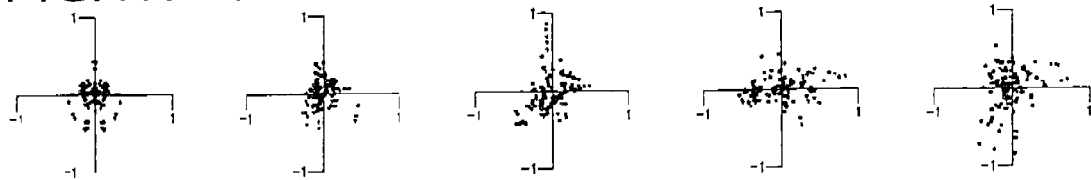
FIGS. 17A to 17Y are spot diagrams of Example 2 (at 20° C.)
Figures 17F, 17G, 17H, 17I, 17J:
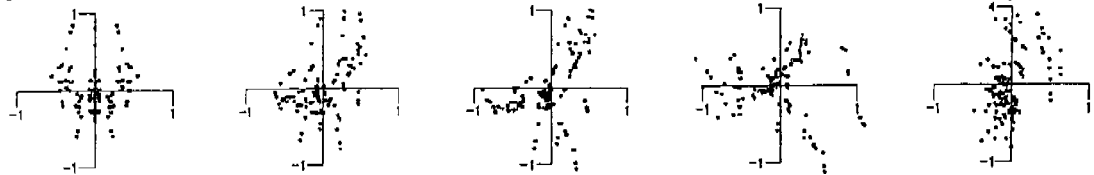
Figures 17K, 17L, 17M, 17N, 17O:
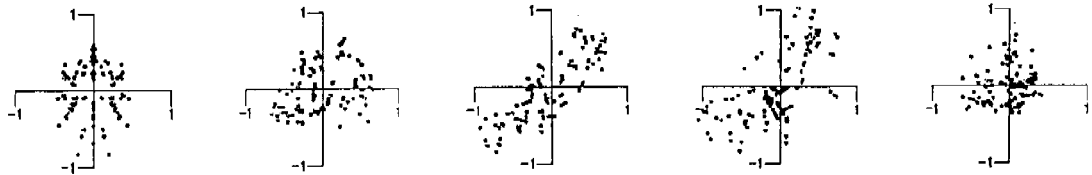
Figures 17P, 17Q, 17R, 17S, 17T:
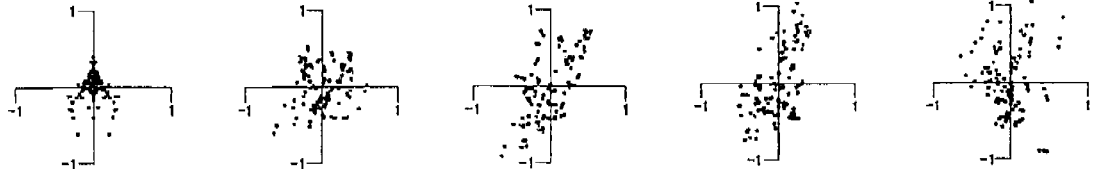
Figures 17U, 17V, 17W, 17X, 17Y:
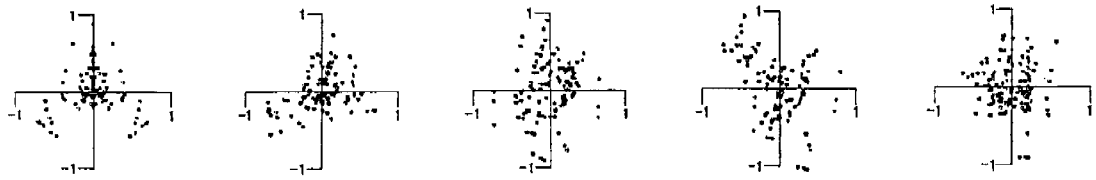
Figures 18A, 18B, 18C, 18D, 18E:
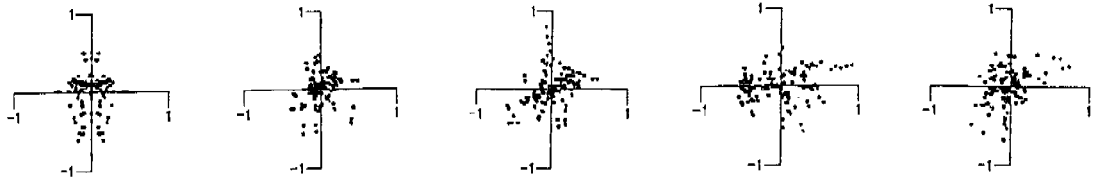
FIGS. 18A to 18Y are spot diagrams of Example 2 (at 50° C.)
Figures 18F, 18G, 18H, 18I, 18J:
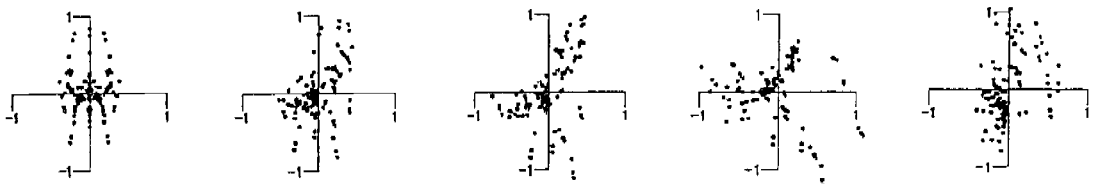
Figures 18K, 18L, 18M, 18N, 18O:
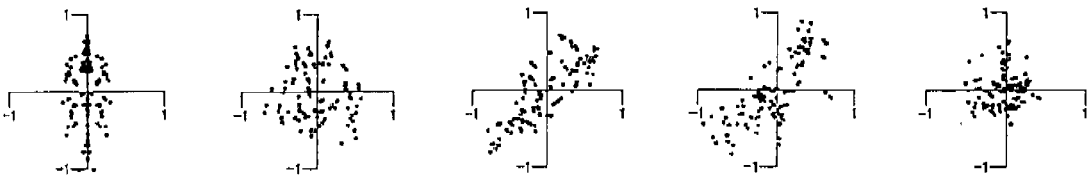
Figures 18P, 18Q, 18R, 18S, 18T:
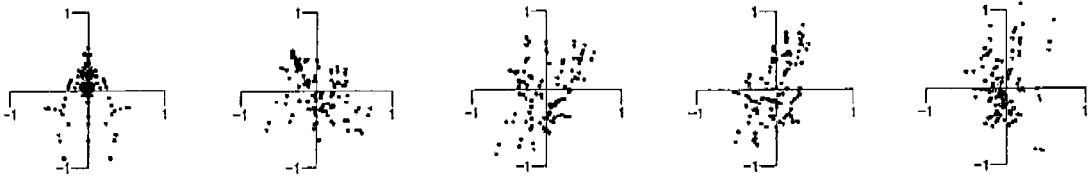
Figures 18U, 18V, 18W, 18X, 18Y:
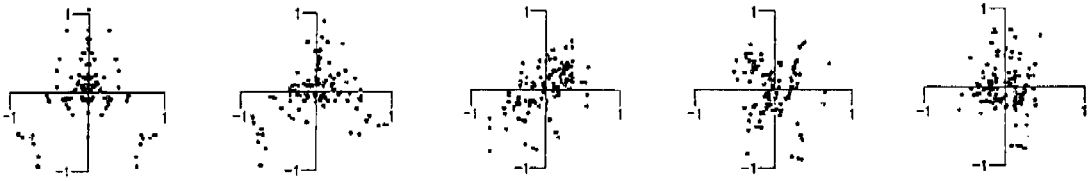
Figures 19A, 19B, 19C, 19D, 19E:
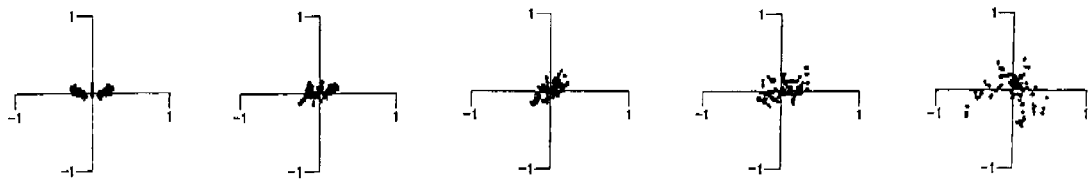
FIGS. 19A to 19Y are spot diagrams of Example 3 (at 20° C.)
Figures 19F, 19G, 19H, 19I, 19J:
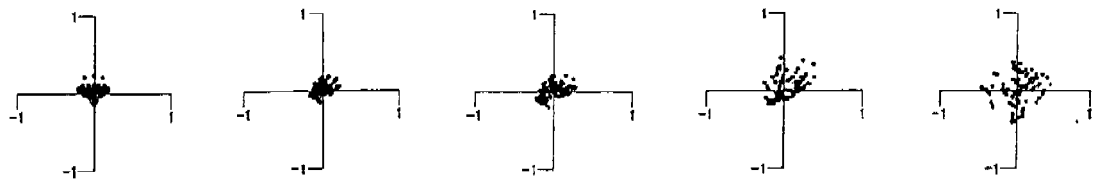
Figures 19K, 19L, 19M, 19N, 19O:
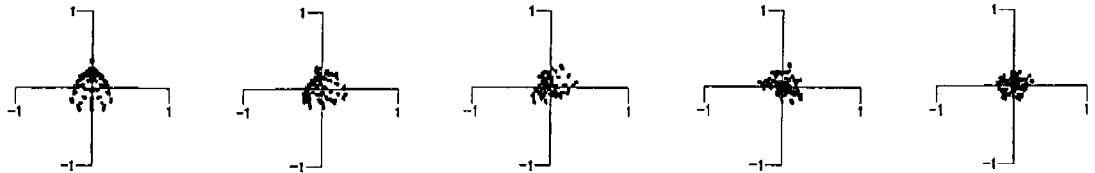
Figures 19P, 19Q, 19R, 19S, 19T:
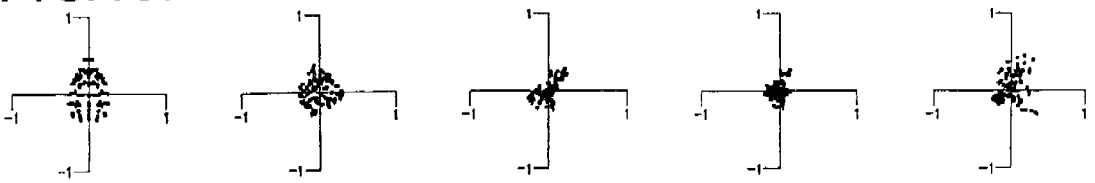
Figures 19U, 19V, 19W, 19X, 19Y:
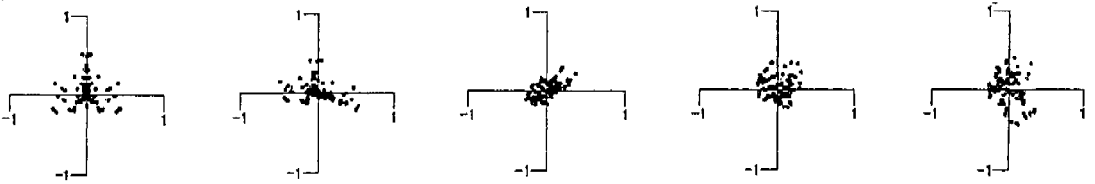
Figures 20A, 20B, 20C, 20D, 20E:
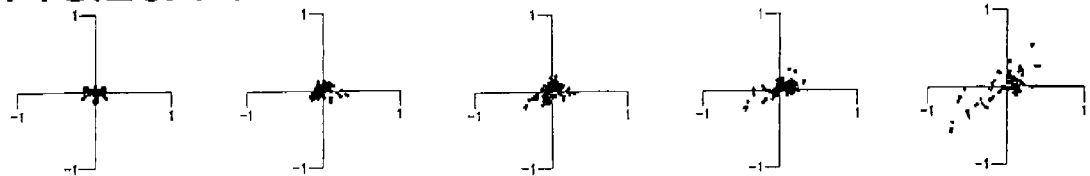
FIGS. 20A to 20Y are spot diagrams of Example 3 (at 50° C.)
Figures 20F, 20G, 20H, 20I, 20J:
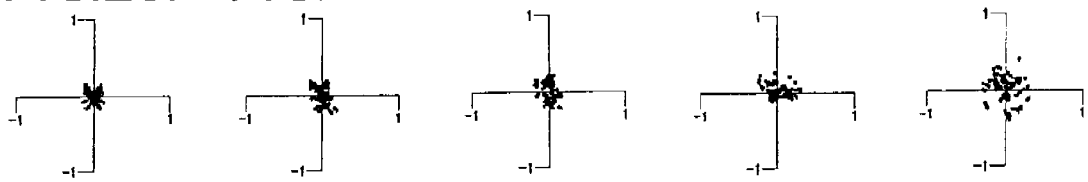
Figures 20K, 20L, 20M, 20N, 20O:
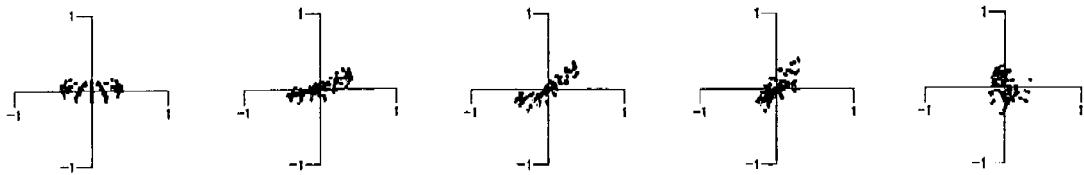
Figures 20P, 20Q, 20R, 20S, 20T:
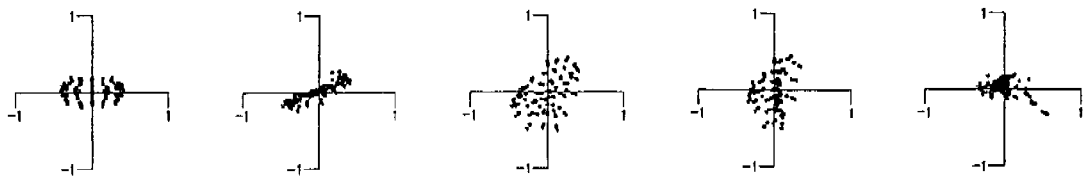
Figures 20U, 20V, 20W, 20X, 20Y:
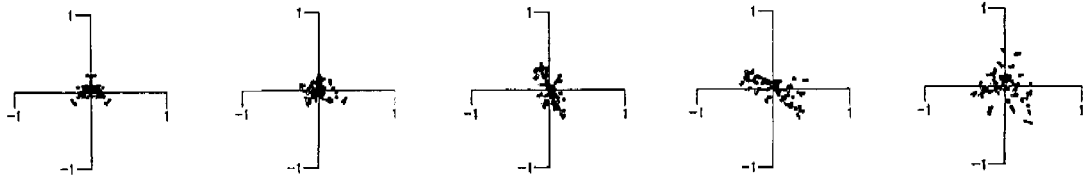
Figures 21A, 21B, 21C, 21D, 21E:
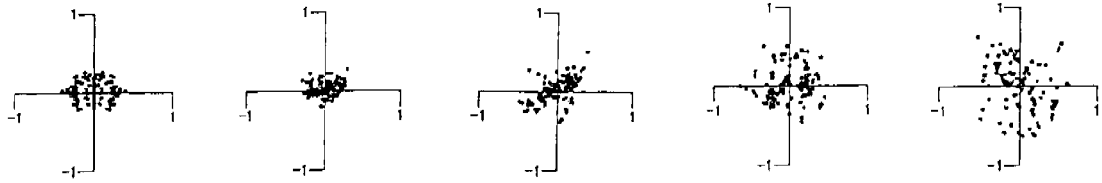
FIGS. 21A to 21Y are spot diagrams of Example 4 (at 20° C.)
Figures 21F, 21G, 21H, 21I, 21J:
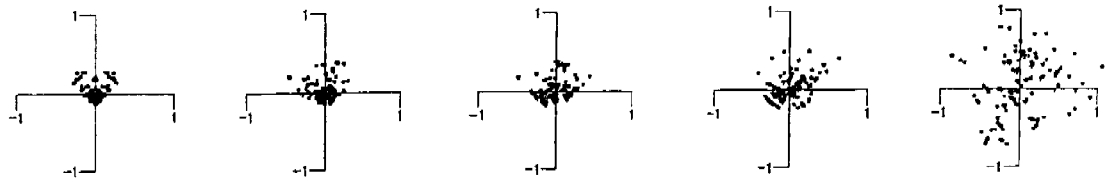
Figures 21K, 21L, 21M, 21N, 21O:
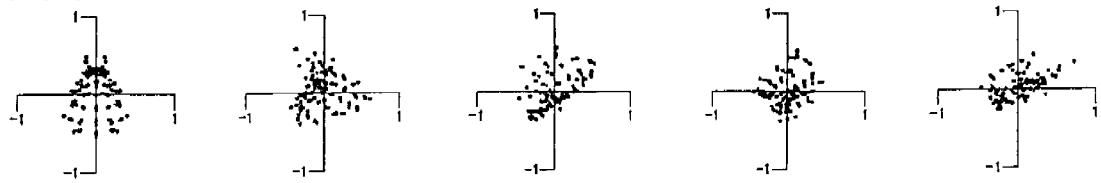
Figures 21P, 21Q, 21R, 21S, 21T:
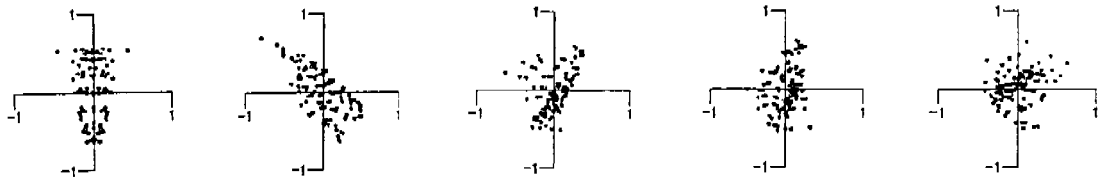
Figures 21U, 21V, 21W, 21X, 21Y:
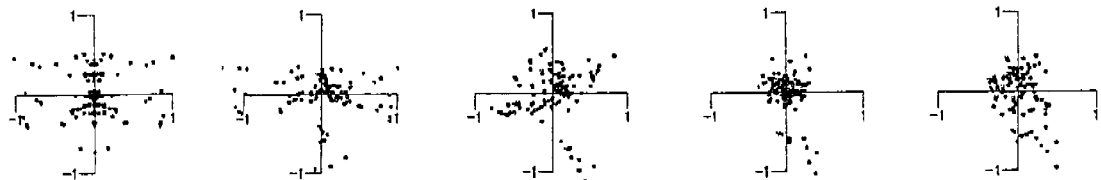
Figures 22A, 22B, 22C, 22D, 22E:
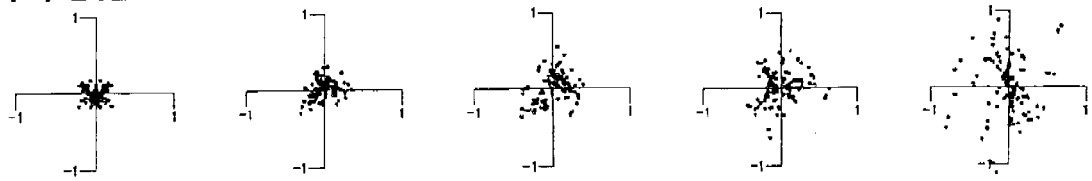
FIGS. 22A to 22Y are spot diagrams of Example 4 (at 50° C.)
Figures 22F, 22G, 22H, 22I, 22J:
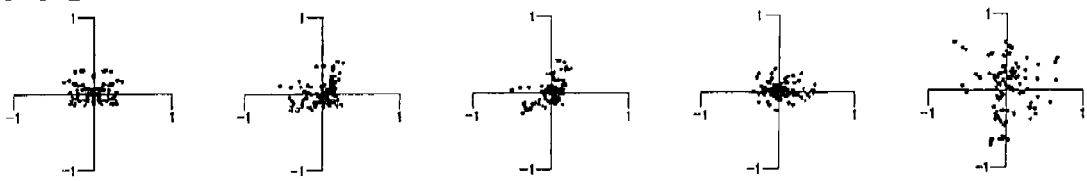
Figures 22K, 22L, 22M, 22N, 22O:
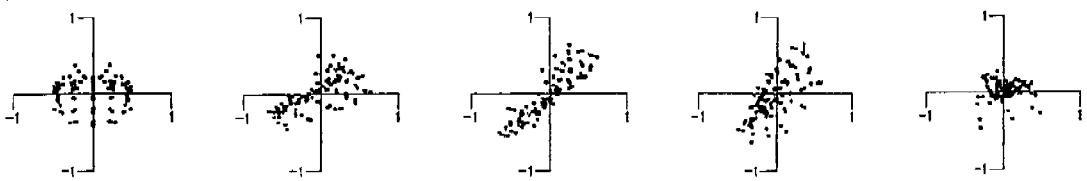
Figures 22P, 22Q, 22R, 22S, 22T:
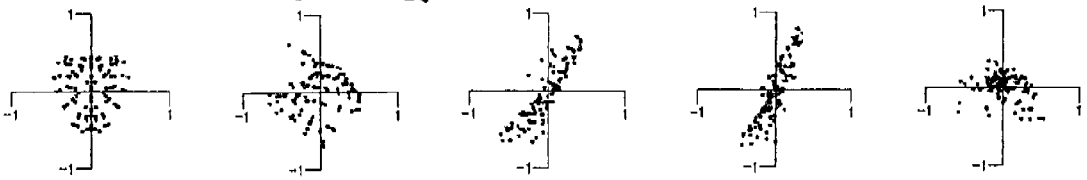
Figures 22U, 22V, 22W, 22X, 22Y:
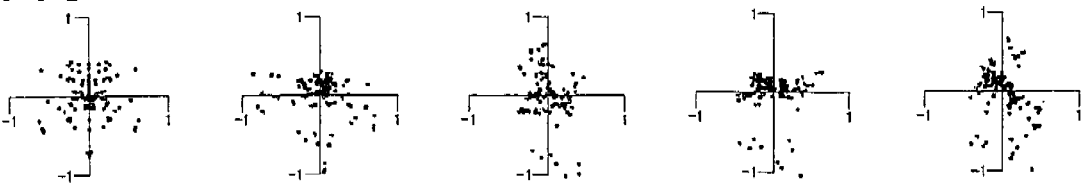

FIG. 13 schematically shows the entire optical construction of an image projection apparatus that is built by combining one of the oblique projection optical systems shown in FIGS. 1 to 12 with an illumination optical system, and FIG. 14 shows a principal portion thereof. In FIGS. 13 and 14, the following reference symbols are additionally used: LU represents a light source unit; E1 represents a light source; E2 represents a reflector; R1 represents a rod integrator; CW represents a color wheel; m1 to m3 represent a first to a third illumination mirror, respectively; and LA represents an illumination optical system aperture stop. Here, the refractive lens GL is omitted from illustration. It should be understood that the optical construction of each of the first to fourth embodiments does not necessarily have to be designed exactly as shown in FIGS. 1 to 14, but may be inverted upside down. That is, designing any of the constructions shown in FIGS. 1 to 14 upside down to suit the actual arrangement (of the apparatus, the optical systems, etc.) causes no problem whatsoever.

The reflector E2, the rod integrator R1, the color wheel CW, and the first to third mirrors m1 to m3 together constitute an illumination optical system. This illumination optical system directs the light from the light source E1 to the image forming device LV, and the image forming device LV then forms an image by modulating the intensity of the light on the image formation surface S0. The first to fifth mirrors M1 to M5 and the refractive lens GL together constitute an oblique projection optical system. This oblique projection optical system projects, while enlarging, the image formed by the image forming device LV onto the screen SC from a direction oblique relative thereto. Now, the construction of each functional part will be described in more detail.

As shown in FIG. 14, the light source unit LU is composed of the light source E1 and the reflector E2. The reflector E2 is an elliptic surface mirror (converging optical system) that converges the light from the light source E1 to form a secondary light source, and is so designed that the light emanating from the light source unit LU is imaged near the entrance end surface of the rod integrator R1. The reflector E2 may be one with a paraboloidal or spherical mirror, in which case it needs to be combined with a condenser lens or the like to constitute a converging optical system for converging the light from the light source E1.

The light that has left the light source unit LU enters the rod integrator R1. The rod integrator R1 is built as a hollow rod formed with four flat-surface mirrors bonded together, and functions as a means for making light intensity uniform. As described above, the rod integrator R1 has the entrance end surface thereof located near the secondary light source. The light that has entered the rod integrator R1 via the entrance end surface thereof is repeatedly reflected on the side surfaces (inner wall surfaces) of the rod integrator R1 and is thereby mixed so that, when the light exits from the rod integrator R1 via the exit end surface thereof, it has a uniform spatial energy distribution. The entrance and exit end surfaces of the rod integrator R1 are given rectangular shapes that are geometrically similar to that of the image forming device LV. The entrance end surface of the rod integrator R1 is conjugate with the illumination optical system aperture stop LA, and the exit end surface of the rod integrator R1 is conjugate with the image formation surface S0 of the image forming device LV. As the result of the mixing mentioned above, a uniform brightness distribution is obtained at the exit end surface, and this permits the image forming device LV to be illuminated efficiently and uniformly. The rod integrator R1 does not necessarily have to be a hollow rod, but may be a glass rod built with a glass member in the shape of a rectangular prism. The rod integrator R1 may have any number of side surfaces other than four, provided that it then suits the shape of the image formation surface S0 of the image forming device LV. Thus, as the rod integrator R1 can be used a hollow columnar member formed with a plurality of reflective mirrors combined together, a glass member in the shape of a polygonal prism, or the like.

Near the exit end surface of the rod integrator R1, a color wheel CW is disposed that changes the color of the light emanating therefrom on a time-division basis to achieve color display. The color wheel CW is composed of color filters that illuminate the image forming device LV by a color sequential method; that is, it changes the color of the light emanating therefrom by rotating the color filters in such a way that one after another of them is located where the illumination light passes. The color wheel CW does not necessarily have to be disposed near the exit end surface of the rod integrator R1, but may be disposed elsewhere to suite the arrangement of the other optical elements etc.; it may be disposed, for example, near the entrance end surface of the rod integrator R1. An UV (ultraviolet rays) and IR (infrared rays) cut filter may additionally be provided to eliminate ultraviolet and infrared rays from the illumination light.

The light that has left the color wheel CW enters the reflection optical system composed of the first to third illumination mirrors m1 to m3. This reflection optical system forms an image of the exit end surface of the rod integrator R1 on the image formation surface S0 of the image forming device LV. This imaging is achieved by the optical powers given to the first and third mirrors m1 and m3. Specifically, the first and third mirrors m1 and m3 each have, as a reflective optical surface, a concave reflective surface, and the second mirror m2 has, as a reflective optical surface, a flat reflective surface. The concave reflective surface of the first mirror m1 permits the secondary light source near the entrance end surface of the rod integrator R1 to re-image to form a tertiary light source near the illumination optical system aperture stop LA. The light from the tertiary light source is directed to the image forming device LV by the concave reflective surface of the third mirror m3.

The glass plate GP disposed near the image formation surface S0 is the cover glass of the image forming device LV. In the first to fourth embodiments, a digital micromirror device is assumed to be used as the image forming device LV. It should be understood, however, that the image forming device LV is not limited to a digital micromirror device, but may be any other kind of non-luminous, reflective (or transmissive) image forming device (for example, a liquid crystal display device) that suits the oblique projection optical system of each embodiment. In a case where a digital micromirror device is used as the image forming device, the light incident thereon is reflected by individual micromirrors, each either in an ON or OFF state (for example, inclined at ±12°), so that the intensity of the light is spatially modulated. As a result, only the light reflected by the micromirrors in the ON state enters the oblique projection optical system composed of the first to fifth projection mirrors M1 to M5 and the refractive lens GL, and the optical power of the concave reflective surface of the third mirror m3 directs the light to the entrance pupil of the oblique projection optical system efficiently. The oblique projection optical system then projects the light onto the screen SC.

In the first to fourth embodiments, the oblique projection optical system includes no aperture stop, and instead a virtual surface is assumed to be present at the entrance pupil. Thus, the beam width of the light emanating from the image forming device LV is restricted by the entrance pupil beforehand before it passes through the oblique projection optical system. In actual use, it is preferable that an aperture stop be built by providing a light shielding member at or near the frame holding the refractive lens GL. In the optical construction of each embodiment, the illumination optical system aperture stop LA shown in FIG. 14 may be shared.

In the first to fourth embodiments, the oblique projection optical system is composed of, from the reduction side thereof, the first mirror M1, the refractive lens GL, the second mirror M2, the third mirror M3, the fourth mirror M4, and the fifth mirror M5. Thus, the construction here is such as to perform enlargement projection from a primary image surface on the reduction side to a secondary image surface on the enlargement side. In this construction, the image formation surface S0 of the image forming device LV, which forms a two-dimensional image by modulating the intensity of light, corresponds to the primary image surface, and the image projection surface S10 on the screen SC corresponds to the secondary image surface. Although the oblique projection optical system of each embodiment is thus given an optical construction suitable for a rear-projection-type image projection apparatus, it can also be used, as an oblique projection optical system that performs reduction projection in an oblique direction from the secondary image surface to the primary image surface, in an image reading apparatus. In that case, the primary image surface corresponds to the photoreceptive surface of a photoreceptive device (for example, a CCD (charge-coupled device)) for reading an image, and the secondary image surface corresponds to the surface of an image (for example, a document) to be read.

As described above, in the first to fourth embodiments, the oblique projection optical system includes, as reflective optical elements, the first to fifth mirrors M1 to M5. The reflective optical surfaces S3, S6, S7, and S8 of the first to fourth mirrors M1 to M4 are curved surfaces, and the reflective optical surface S9 of the fifth mirror M5 is a flat surface parallel to the image projection surface S10. Thus, while the reflective optical surfaces S3, S6, S7, and S8 of the first to fourth mirrors M1 to M4 make the projection light converge or diverge by their optical powers, the reflective optical surface S9 of the fifth mirror M5 simply bends the optical path. The optical power arrangement of the first to fourth mirrors M1 to M4 is such that they have a positive, a negative, a positive, and a negative optical power, respectively. Of these optically powered reflective surfaces S3, S6, S7, and S8, the third and sixth surfaces S3 and S6 in the first to third embodiments and the six surface S6 in the fourth embodiment are eccentric rotation-symmetric optical surfaces, and the other reflective optical surfaces are non-rotation-symmetric free-form curved surfaces. It should be noted that, let the ray that passes through the image center on the image forming device LV, the center of the entrance pupil, and the image center on the screen SC be called the "central principal ray", when an axis of symmetry about which an optically powered optical surface is symmetric is not parallel to the vector of the central principal ray incident on and emergent from that optical surface, this state is called "eccentric".

Now, the reflective optical surfaces S3 and S6 on the first and second mirrors M1 and M2 will be described more specifically. In the first embodiment (FIG. 3 etc.), the third surface S3 is a spherical surface having a positive optical power, and the sixth surface S6 is an rotation-symmetric aspherical surface having a negative optical power. In the second embodiment (FIG. 6 etc.), the third surface S3 is a rotation-symmetric aspherical surface having a positive optical power, and the sixth surface S6 is a spherical surface having a negative optical power. In the third embodiment (FIG. 9 etc.), the third surface S3 is a rotation-symmetric aspherical surface having a positive optical power, and the sixth surface S6 is a rotation-symmetric aspherical surface having a negative optical power. In the fourth embodiment (FIG. 12 etc.), the third surface S3 is a non-rotation-symmetric free-form curved surface having a positive optical power, and the sixth surface S6 is a rotation-symmetric aspherical surface having a negative optical power.

In the first to fourth embodiments, the oblique projection optical system further includes, as a refractive optical element, one refractive lens GL. The refractive lens GL is a free-form curved surface lens that has a free-form curved surface on the entrance-side surface thereof, that is, the fourth surface S4, and that has a flat surface on the exit-side surface thereof, that is, the fifth surface S5. Specifically, the refractive lens surface that the refractive lens GL has as the fourth surface S4 is a non-rotation-symmetric free-form curved surface that is plane-symmetric about only one plane of symmetry (corresponding to the xy-plane of the local coordinate system described later). A refractive lens having a free-form curved surface like the refractive lens GL can be fabricated by a molding process such as glass molding, press molding, or injection molding. The refractive lens GL is preferably formed of, in a case where priority is given to moldability, a material such as plastic with comparatively high flowability and, in a case where temperature variation during actual use needs to be considered, a material such as glass with less temperature-related refractive index variation and a lower thermal expansion coefficient lower than plastic. The latter type of material helps alleviate performance deterioration attributable to temperature variation.

In general, attempting to make an image projection apparatus slim and compact by making an oblique projection optical system wider-angle by the use of a reflective optical surface having an optical power results in degraded image surface quality (for example, increased curvature of field) and increased eccentric aberrations (such as spherical aberration). Using a reflective optical surface having a free-form curved surface, with the complicated surface shape thereof, may help effectively reduce such adverse effects as eccentric aberrations, but, the more the optical surface is optically sensitive, the higher the accuracy required on that surface. This makes the reflective optical surface difficult to produce or otherwise deal with, leading to lower mass producibility and increased cost. That is, the surface shape of a reflective optical surface exhibits increasingly low symmetry but increasingly high flexibility as it varies from spherical to aspherical to free-form curved, resulting in increasingly high aberration correction performance accompanied, disadvantageously, by increased difficulty in production (mold fabrication, molding, etc.), evaluation, adjustment, etc.

In consideration of the above facts, in the first to fourth embodiment, the oblique projection optical system is so constructed that: there is provided at least one reflective optical surface having an optical power; there is provided at least one refractive lens surface; at least one reflective optical surface is an eccentric rotation-symmetric optical surface; and at least one refractive lens surface is a non-rotation-symmetric free-form curved surface that is plane-symmetric about at most one plane of symmetry. Providing at least one refractive lens surface that is a non-rotation-symmetric free-form curved surface that is plane-symmetric about at most one plane of symmetry makes it possible to satisfactorily correct image surface quality and eccentric aberrations. Providing at least one reflective optical surface that is an eccentric rotation-symmetric optical surface makes it possible to reduce the flexibility of the just mentioned reflective optical surface, and thereby to simplify the fabrication, evaluation, adjustment, etc. associated therewith, achieving lower cost.

Adopting an eccentric optical construction as those adopted in the first to fourth embodiments requires the use of highly flexible free-form curved surfaces that make the reflective optical surfaces S3 and S6 on the first and second mirrors M1 and M2, in particular the third surface S3, highly sensitive to surface shape errors. Even then, the provision of the refractive lens GL described above permits the responsibility for aberration correction to be shared by the refractive lens surface S4, which is a non-rotation-symmetric free-form curved surface. Thus, even though rotation-symmetric optical surfaces (that is, rotation-symmetric aspherical or spherical surfaces) are used as the reflective optical surface S3 and S6 of the first and second mirrors M1 and M2, it is possible to lower the required surface accuracy while minimizing the lowering of aberration correction performance. Moreover, even when the refractive lens surface S4 has a weak optical power, it is possible to reduce the flexibility of the third and sixth surfaces S3 and S6 and thereby effectively lower the required surface accuracy. This makes it possible to achieve satisfactory optical performance and simultaneously use optical components that are compact and advantageous in terms of mass producibility and cost. Thus, it is possible to realize a slim, compact, low-cost, large-screen image projection apparatus. Moreover, forming as the fourth surface S4 a non-rotation-symmetric free-form curved surface that is plane-symmetric about only one plane of symmetry (the xy-plane) as in the first to fourth embodiment helps reduce the difficulty in fabrication, evaluation, etc. in comparison with when the surface is not plane-symmetric in any way.

In FIG. 14, the third illumination mirror m3, the image forming device LV, the glass plate GP, and the first projection mirror M1 have optical surfaces (S0 to S3 etc.) located at positions optically conjugate, exactly or substantially, with the image projection surface S10 of the screen SC. As a result, if dust or other foreign matter is present near those optical elements, it affects the image formation performance, contrast, and other behavior of the image projection apparatus. When the apparatus is constructed as shown in FIGS. 13 and 14, entry of dust or other foreign matter is prevented only by the casing of the entire rear projection apparatus, and thus cannot be satisfactorily prevented. Thus, it is preferable to provide a dust-proof housing in which to seal the part whose exposure to dust or other foreign matter is likely to affect image formation performance etc., namely the third illumination mirror m3, the image forming device LV, the glass plate GP, and the first projection mirror M1.

In a case where a dust-proof housing as described above is provided, it needs to have an entrance window and an exit window formed therein so that the illumination light is directed through the entrance window to the third illumination mirror m3 and that the projection light from the first projection mirror M1 is extracted through the exit window. As the entrance window, a cover formed of a transparent member can be disposed in the part of the dust-proof housing corresponding to the position of the illumination optical system aperture stop LA. That is, the member used as the illumination optical system aperture stop LA can be shared as the entrance window. On the other hand, as the exit window, an optical element formed of a transparent member can be disposed between the third and sixth surfaces S3 and S6 so as to be shared as the exit window. A preferred choice as this optical element is the refractive lens GL.

In the first to fourth embodiments, the refractive lens GL has a flat surface as the exit-side surface thereof, that is, the fifth surface S5. It is therefore preferable, also from the viewpoint of protecting the refractive lens surface S4 formed as a free-form curved surface and out of other considerations, to arrange the refractive lens GL with the fifth surface S5 facing outside the dust-proof housing. Thus, by the use of a dust-proof housing provided with the member used as the illumination optical system aperture stop LA and the refractive lens GL, it is possible to seal in the optical elements from the third illumination mirror m3 through the first projection mirror M1 and thereby prevent entry of dust or other foreign matter around the image forming device LV. Moreover, since the member used as the illumination optical system aperture stop LA and the refractive lens GL are then shared as the entrance window and the exit window, respectively, there is no need to use additional optical components. Incidentally, giving the refractive lens GL a flat surface as the refractive surface S5 on the side thereof opposite to the side on which it has the free-form curved surface, that is, using a refractive lens GL having a free-form curved optical surface on one side and a flat optical surface on the other side, is preferable also from the viewpoint of increasing positional accuracy, simplifying lens molding, and out of other considerations.

It is preferable that, as in the first to fourth embodiments, of the optical surfaces having optical powers, the one located closest to the image forming device LV be a reflective optical surface S3 having a positive optical power. If this optical surface is a reflective optical surface having a negative optical power, it makes the light passing therethrough diverge and thus requires unduly large optical surfaces downstream. Larger optical surfaces increase the cost of the optical elements associated therewith, and make the entire oblique projection optical system unduly large. In the first to fourth embodiment, of the optical surfaces having optical powers, the one located closest to the image forming device LV is the third surface S3 having a positive optical power. This helps reduce the size and cost of the first mirror M1, on which the third surface S3 is formed, and of the optical elements downstream, contributing to the size and cost reduction of the entire oblique projection optical system.

An optical system incorporated in an image projection apparatus such as a rear projector is required to stably offer satisfactory performance against temperature variation. With respect to an optical element, like the first mirror M1, that tends to be highly sensitive to surface shape errors, it is also necessary to take into consideration the effect of expansion or contraction of part or the whole of the apparatus resulting from temperature variation. Specifically, in a case where, of the optical surfaces having optical powers, the one located closest to the image forming device LV is a reflective optical surface having a positive optical power, it is preferable that the reflective optical surface having a positive optical power be formed on a mirror and fulfill conditional formula (1) below when part or the whole of the apparatus expands or contracts because of temperature variation.

$$|2\Delta L/\Delta R|<10 \tag{1}$$

where, let the ray that passes through the image center on the image forming device LV, the center of the entrance pupil, and the image center on the screen SC be called the "central principal ray", and let the point at which the central principal ray intersects the just mentioned reflective optical surface having a positive optical power be called the "first reflection center", L represents the distance from the first reflection center to the image center on the image forming device LV;

ΔL represents the variation in the distance L resulting from the temperature variation;

R represents the radius of curvature of the reflective optical surface having a positive optical power as measured near the first reflection center; and ΔR represents the variation in the radius of curvature R resulting from the temperature variation.

Conditional formula (1) defines a preferred conditional range, from the viewpoint of reducing the effect of temperature variation, of the value calculated by dividing the variation ΔL in the distance L resulting from the temperature variation by the variation (ΔR/2) of the focal length of the positively powered reflective optical surface S3 located closest to the image forming device LV. The variation of the focal point of the entire oblique projection optical system resulting from temperature variation does not depend on the variations ΔR and ΔL alone, but even then these variations ΔR and ΔL are parameters that have much effect. If the conditional range defined by conditional formula (1) is disregarded, the entire oblique projection optical system exhibits unduly large variation of the focal point in response to temperature variation, making it impossible to achieve high performance.

It is further preferable that conditional formula (1a) below be fulfilled. Conditional formula (1a) defines, out of the above stated and other considerations, a further preferable conditional range within the conditional range defined by conditional formula (1) above. Thus, fulfilling conditional formula (1a) promises higher performance.

$$|2\Delta L/\Delta R|<5 \tag{1a}$$

It is preferable that conditional formula (2) below be fulfilled.

$$-1.5<R/L<-0.5 \tag{2}$$

where, let the ray that passes through the image center on the image forming device LV, the center of the entrance pupil, and the image center on the screen SC be called the "central principal ray", and let the point at which the central principal ray intersects the reflective optical surface having a positive optical power be called the "first reflection center", L represents the distance from the first reflection center to the image center on the image forming device LV, the distance L always taking a positive value; and R represents the radius of curvature of the reflective optical surface having a positive optical power as measured near the first reflection center, the radius of curvature R taking a negative value when the reflective optical surface is a concave surface exerting a light converging effect.

If the upper limit of conditional formula (2) is disregarded, to avoid interference between the optical path from the image forming device LV to the positively powered reflective optical surface S3 located closest to the image forming device LV and the optical surfaces disposed downstream of that reflective optical surface S3, the central principal ray needs to be bent at an unduly large angle by the reflective optical surface S3. This results in large asymmetric aberrations, and makes it impossible to achieve high performance. If the lower limit of conditional formula (2) is disregarded, the light converging effect exerted by the reflective optical surface S3 is so low that the oblique projection optical system has an unduly large optical length as a whole and requires unduly large optical elements, quite disadvantageously to achieving compactness.

It is preferable that, as in the first to fourth embodiments, there be provided at least three reflective optical surfaces each having an optical power, and that at least one of the first and second reflective optical surfaces S3 and S6 as counted from the image forming device LV side be an eccentric rotation-symmetric optical surface. It is further preferable that the first and second reflective optical surfaces S3 and S6 as counted from the image forming device LV side be both eccentric rotation-symmetric optical surfaces. In a case where an oblique projection optical system is made wider-angle by the use of three or more reflective optical surfaces having optical powers, at least one of the first and second reflective optical surfaces S3 and S6 as counted from the image forming device LV side is given a strong optical power and is thus highly sensitive to errors. By adopting an eccentric rotation-symmetric optical surface, it is possible to reduce the flexibility of those reflective optical surfaces S3 and S6 and thereby lower their sensitivity to errors. In this way, it is possible, while achieving satisfactory optical image surface quality, to reduce the flexibility of a surface shape highly sensitive to errors in the surface shape and thereby reduce cost.

Regarding the arrangement of the refractive lens GL having a free-form curved surface, it is preferable that, as in the first to fourth embodiments, the refractive lens GL be disposed in the optical path on the screen SC side of the reflective optical surface S3 having a positive optical power, and it is further preferable that the refractive lens GL be disposed in the optical path between the first and second mirrors M1 and M2. This arrangement of the refractive lens GL has the advantage that, in a case where a reflective light modulation device (such as a digital micromirror device), interference with the optical path can easily be avoided. Moreover, as described previously, it is also possible to share the holding frame of the refractive lens GL as an aperture stop to restrict the beam diameter. Moreover, reflection on the third surface S3 having a positive optical power narrows the beam diameter. This helps reduce the size of the refractive lens GL located in the optical path on the screen SC side of the reflective optical surface S3. Incidentally, it is difficult to arrange the refractive lens GL in the optical path on the image forming device LV side of the reflective optical surface S3, because doing so makes interference with the illumination or projection optical path inevitable, and arranging the refractive lens GL obliquely causes aberrations (such as astigmatism).

It is preferable that the refractive lens surface S4 formed as a free-form curved surface fulfill conditional formula (3) below, and it is further preferable that it fulfill conditional formula (3a) below.

$$10<|1/(\rho \cdot Lm)| \quad (3)$$

$$50<|1/(\rho \cdot Lm)| \quad (3a)$$

where

ρ represents the curvature of the free-form curved surface forming the refractive lens surface S4 (here, let the ray that passes through the image center on the image forming device LV, the center of the entrance pupil, and the image center on the screen SC be called the "central principal ray", the curvature ρ is defined on the section of the free-form curved surface along the plane including the vector, normal to the free-form curved surface, from the point P where the central principal ray intersects the free-form curved surface to an arbitrary point P' (including the case where $1/\rho=\infty$)); and Lm represents the maximum image dimension on the image forming device LV.

Disregarding conditional formula (3) means giving the refractive lens GL having the free-form curved surface a strong optical power. Thus, if conditional formula (3) is disregarded, image surface quality degrades with temperature variation, and sensitivity to eccentric errors is high. This makes it impossible to obtain high performance. Thus, the greater the value of $|1/(\rho \cdot Lm)|$, the better, and, for higher performance, it is preferable that conditional formula (3a) be fulfilled. It is particularly preferable that $|1/(\rho \cdot Lm)|$ equal its theoretical upper limit, namely infinity $\infty$.

A reflective optical surface having an optical power, like the reflective optical surfaces S3, S6, S7, and S8 of the first to fourth mirrors M1 to M4, is optically highly sensitive. Thus, such a reflective optical surface tolerates only small errors in its surface shape obtained when it is molded by injection molding or press molding, and its fabrication is difficult. Errors that occur in the surface shape of a reflective optical surface when it is molded may be reduced by correcting the shape of the mold used for its molding. This, however, requires high accuracy in the correction of the mold. Moreover, the larger the reflective optical surface, the more difficult it is to form. Thus, preferably, errors in the surface shape of a reflective optical surface molded are measured or evaluated, and the refractive lens GL is designed to have such a free-form curved surface as to cancel the aberrations resulting therefrom. This makes it possible to correct aberrations with a refractive optical surface, which is optically relatively insensitive, and makes it easy to enhance the overall optical performance.

It is preferable that a reflective optical surface having an optical power as mentioned above be given a rotation-symmetric shape, because doing so make it easy to form. In this case, the mold used to mold the reflective optical surface by injection molding or press molding has a rotation-symmetric surface shape, but the errors that occur in the surface shape of the reflective optical surface when it is molded are not always rotation-symmetric, but contains non-rotation-symmetric surface shape errors. To correct non-rotation-symmetric surface shape errors, the mold needs to be processed by a processing method involving non-rotation-symmetric movement, hence by a processing method different from one used to process the mold by rotation alone for the correction of rotation-symmetric errors. Thus, quite inconveniently, it is necessary to use two processing methods. Moreover, a processing method involving non-rotation-symmetric movement is more difficult to control and more difficult to achieve high accuracy than a processing method involving rotation-symmetric movement. For these reasons, preferably, aberrations resulting from non-rotation-symmetric surface shape errors that occurs when a rotation-symmetric reflective optical surface is molded are corrected by designing the refractive lens GL to have such a free-form curved surface as to cancel those aberrations, by using the results of measurement or estimation of the surface shape after molding. This makes it possible to correct aberrations with a refractive optical surface, which is optically relatively insensitive, and makes it easy to enhance the overall optical performance. Moreover, advantageously, it is possible to limit the mold processing movement involved in the molding of the rotation-symmetric reflective optical surface to rotation-symmetric movement. Rotation-symmetric surface shape errors can be corrected by correcting, by a processing method involving rotation-symmetric movement, the mold used to mold the rotation-symmetric reflective optical surface, but, with optical sensitivity taken into consideration, those errors may also be corrected by appropriately designing the refractive lens GL having the free-form curved surface.

In each of the first to fourth embodiments, there are provided four reflective optical surfaces each having an optical power. Here, surface shape errors on two or more reflective optical surfaces may be measured or estimated so that the refractive lens GL is designed to have such a free-form curved surface as to cancel aberrations that are supposed to result therefrom. This permits the refractive lens GL to compensate for molding errors on two or more reflective optical surfaces, and thus makes it possible to efficiently achieve high performance.

It should be understood that the first to fourth embodiments described above include constructions (i) to (vii) described below. With these constructions, it is possible to realize a slim, wide-angle oblique projection optical system composed of compact optical components that, despite offering satisfactory optical performance, is advantageous in terms of mass producibility and cost. Then, by incorporating it into a rear-projection-type image projection apparatus, it is possible to make the apparatus slim, compact, large-screen, high-performance, and low-cost.

(i) An oblique projection optical system for performing enlargement projection in an oblique direction from a primary image surface on a reduction side to a secondary image surface on an enlargement side, the oblique projection optical system comprising at least one reflective optical surface having an optical power and at least one refractive lens surface, wherein at least one reflective optical surface is an eccentric rotation-symmetric optical surface and at least one refractive lens surface is a non-rotation-symmetric free-form curved surface that is plane-symmetric about at most one plane of symmetry.

(ii) An oblique projection optical system as described at (i) above, wherein, of all optical surfaces having optical powers, one located closest to the primary image surface is a reflective optical surface having a positive optical power.

(iii) An oblique projection optical system as described at (ii) above, wherein the reflective optical surface having the positive optical power is formed on a mirror and fulfils at least one of conditional formulae (1), (1a), and (2) noted previously when a part or whole of the apparatus expands or contracts because of temperature variations.

(iv) An oblique projection optical system as described at one of (i), (ii), and (iii) above, wherein there are provided at least three reflective optical surfaces each having an optical power, and at least one of the first and second reflective optical surfaces as counted from a primary image surface side is the eccentric rotation-symmetric optical surface.

(v) An oblique projection optical system as described at one of (i), (ii), (iii), and (iv) above, wherein the refractive lens surface formed as the free-form curved surface fulfills conditional formula (3) or (3a) noted previously.

(vi) An oblique projection optical system as described at one of (ii), (iii), (iv), and (v) above, wherein the refractive lens surface is located in the optical path on a secondary image side of the reflective optical surface having the positive optical power.

(vii) An oblique projection optical system as described at one of (i), (ii), (iii), (iv), (v), and (vi) above, wherein a lens that has the free-form curved surface formed as the refractive lens surface at one side thereof has a flat surface formed as a refractive lens surface at the other side thereof.

According to the thus far described aspects of the present invention, the provision of at least one refractive lens surface that is a non-rotation-symmetric free-form curved surface plane-symmetric about at most one plane of symmetry permits satisfactory correction of image surface quality and eccentric aberrations. Moreover, since at least one reflective optical surface is an eccentric rotation-symmetric optical surface, it is possible to reduce the flexibility of the reflective optical surface, simplify the fabrication, evaluation, adjustment, etc. thereof, and achieve lower cost. Thus, it is possible to realize a slim, large-screen image projection apparatus composed of compact optical components that, despite offering satisfactory optical performance, is advantageous in terms of mass producibility and cost.

Using a positively powered reflective optical surface as, of all the optically powered optical surfaces, the one located closest to the image forming device helps reduce the size and cost of optical elements and thereby reduce the size and cost of the oblique projection optical system as a whole. Fulfilling conditional formula (1) or (3) helps achieve enhanced optical performance by effectively reducing the effect of temperature variation, the sensitivity to eccentric errors, etc. Using an eccentric rotation-symmetric optical surface as at least one of, of all the optically powered reflective optical surfaces, the first and second ones as counted from the image forming device side makes it possible to achieve satisfactory optical image surface quality and simultaneously reduce the flexibility of a surface shape highly sensitive to errors and thereby achieve lower cost.

Fifth to Eleventh Embodiments

FIGS. 24 to 29 and 38 show the optical construction (optical arrangement, projection optical path, etc.) along the entire projection optical path from the image formation surface (panel display surface) So to the image projection surface (screen surface) Si in a fifth to an eleventh embodiment, respectively, of the invention, as viewed in an optical section along the longer sides of the image on the image formation surface So. That is, in the rectangular coordinate system (x, y, z) established so that the x-axis runs normal to the image formation surface So, that the y-axis runs along the shorter sides of the image formation surface So, and that the z-axis runs along the longer sides of the image formation surface So, FIGS. 24 to 29 and 38 show the optical construction along the entire projection optical path in the fifth to eleventh embodiment, respectively, as viewed on the xy-section. In FIGS. 24 to 29 and 38, an optical surface marked with an asterisk "*" is a rotation-symmetric aspherical surface, and an optical surface marked with a dollar sign "$" is a non-rotation-symmetric aspherical surface (a so-called free-form curved surface).

In the fifth to eleventh embodiments, the oblique projection optical system is designed to project, while enlarging, an image on an image formation surface So obliquely onto an image projection surface Si, and thus for use in an image projection apparatus. Accordingly, the image formation surface So corresponds to the image formation surface of an image forming device (light valve, or display device) that forms a two-dimensional image by modulating the intensity of light or otherwise, and the image projection surface Si corresponds to the image projection surface on a screen. Near the image formation surface So, the cover glass CG of the image forming device is disposed. In the fifth to eleventh embodiments, a digital micromirror device is assumed to be used as the image forming device. It should be understood, however, that the image forming device is not limited to a digital micromirror device, but may be any other kind of non-luminous, reflective (or transmissive) image forming device (for example, a liquid crystal display device) that suits the oblique projection optical system of each embodiment. In a case where a digital micromirror device is used as the image forming device, the light incident thereon is reflected by individual micromirrors, each either in an ON or OFF state (for example, inclined at ±12°), so that the intensity of the light is spatially modulated. As a result, only the light reflected by the micromirrors in the ON state enters the oblique projection optical system so as to be projected onto the image projection surface Si. As the image forming device above, a self-luminous image forming device may be used. When a self-luminous image forming device is used as the image forming device, there is no need to provide a light source and the like for illumination, and therefore it is possible to make the optical construction more lightweight and compact.

Figure 36:
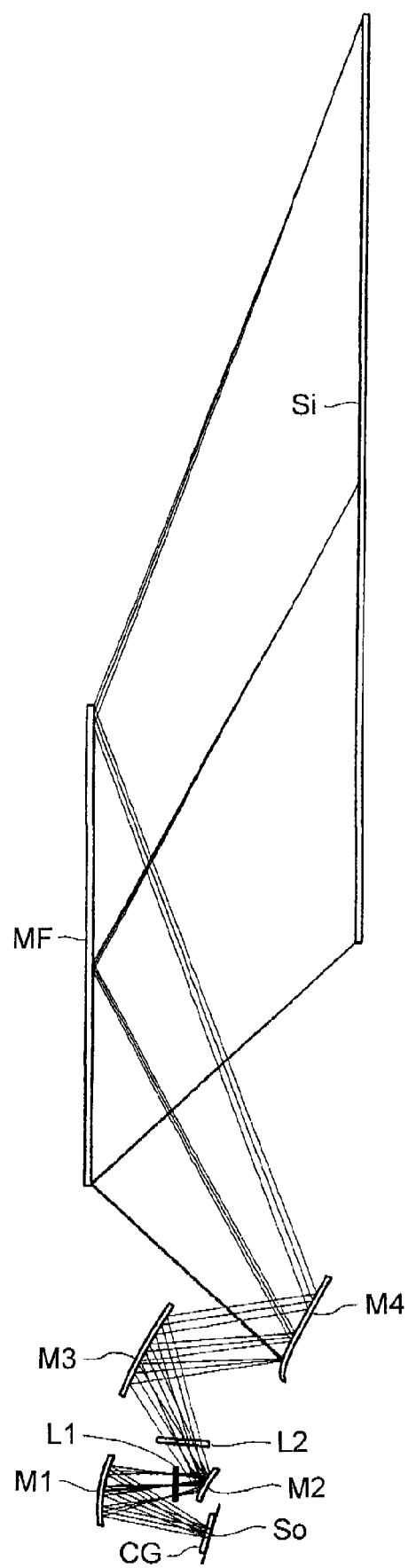
FIG. 36 is an optical path diagram showing an example of an optical construction in which the optical path is bent once with a flat-surface mirror.
Figure 37:
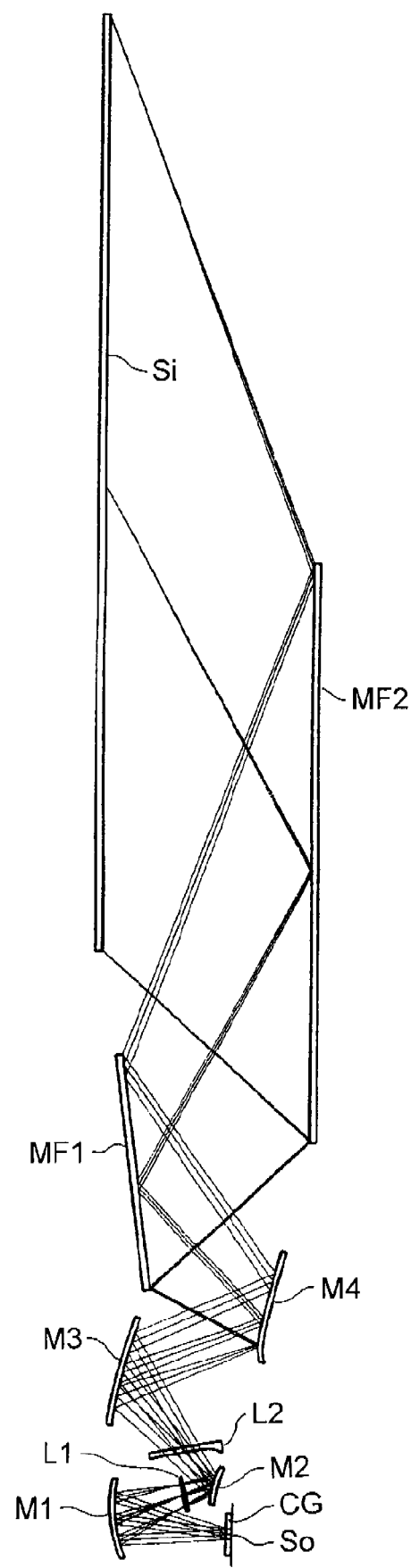
FIG. 37 is an optical path diagram showing an example of an optical construction in which the optical path is bent twice with flat-surface mirrors.
Figure 38:
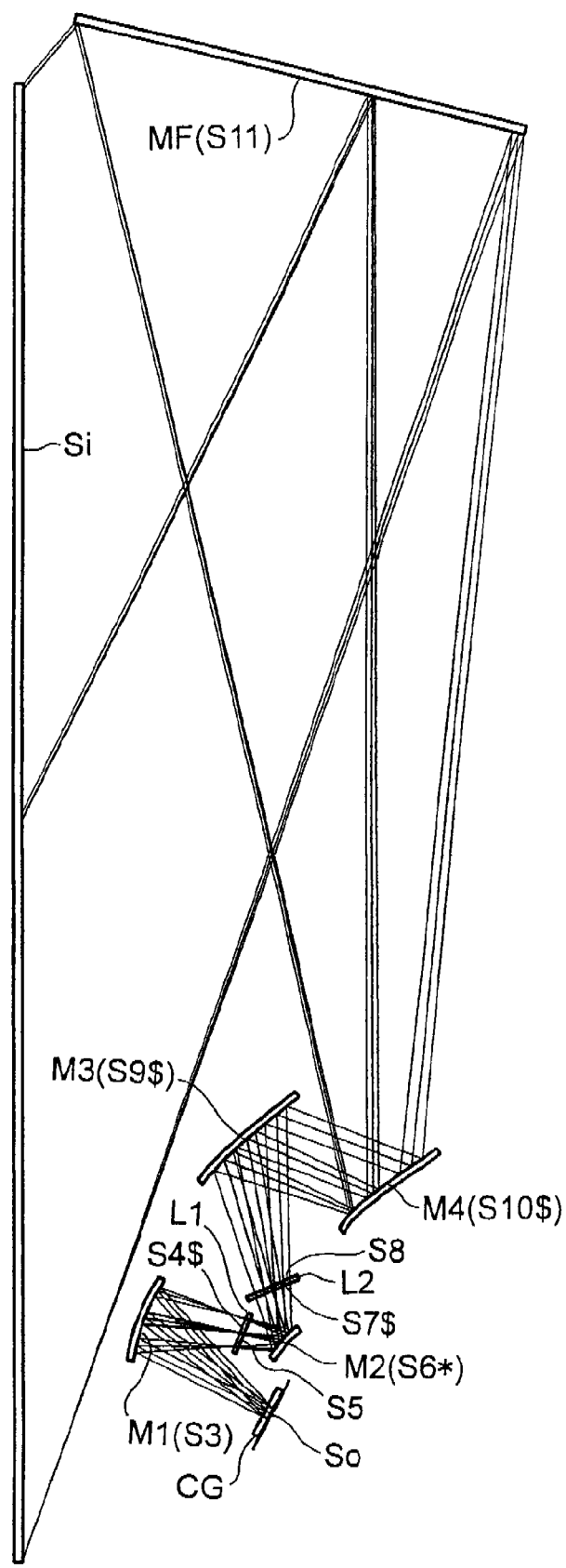
FIG. 38 is an optical path diagram showing the optical construction of an eleventh embodiment (Example 11) of the invention.
Figures 39A, 39B, 39C, 39D, 39E:
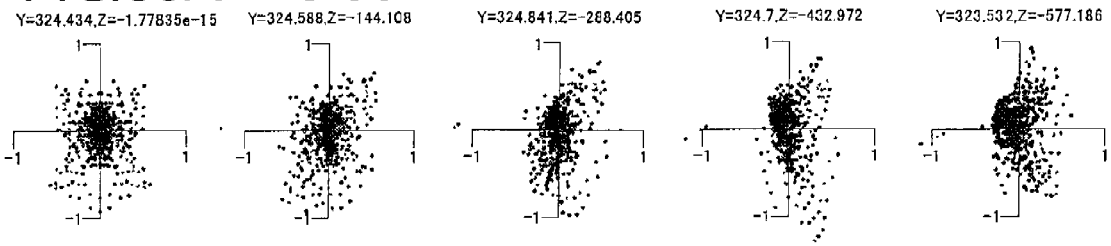
FIGS. 39A to 39Y are spot diagrams of Example 11.
Figures 39F, 39G, 39H, 39I, 39J:
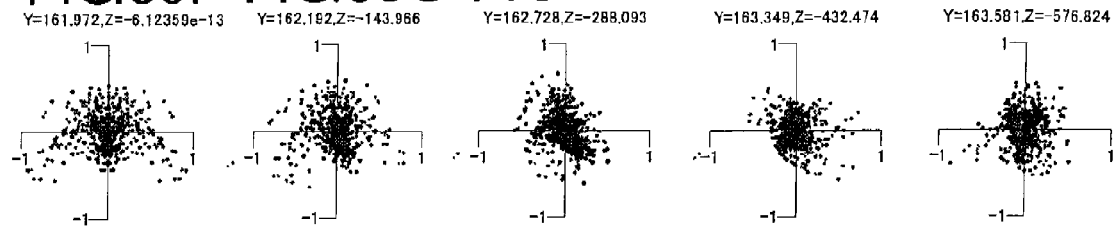
Figures 39K, 39L, 39M, 39N, 39O:
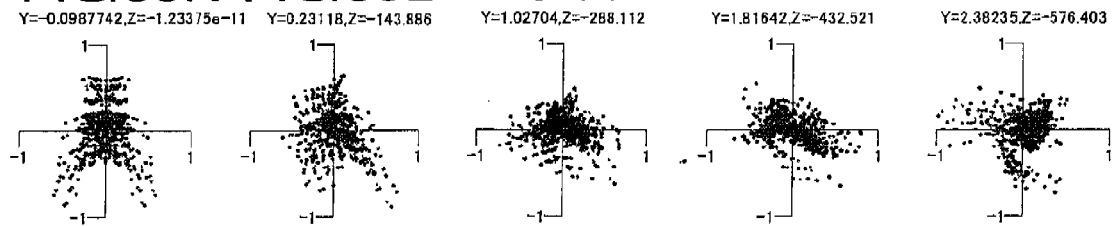
Figures 39P, 39Q, 39R, 39S, 39T:
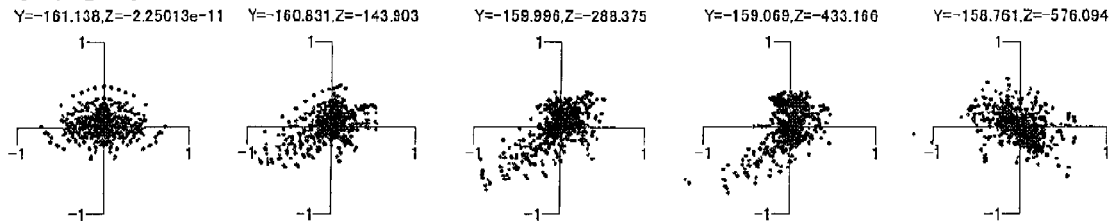
Figures 39U, 39V, 39W, 39X, 39Y:
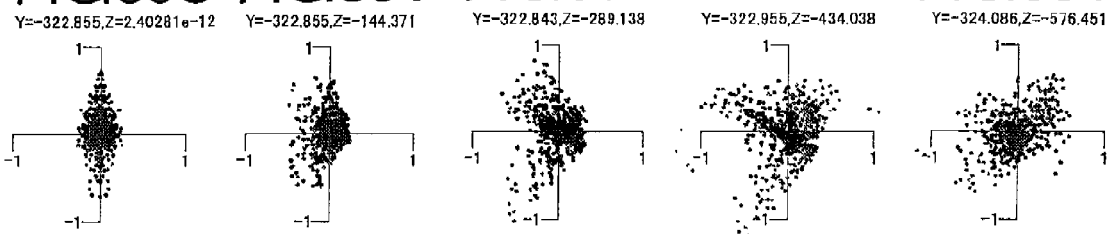

It should be understood that the optical construction of each of the fifth to eleventh embodiments does not necessarily have to be designed exactly as shown in FIGS. 24 to 29 and 38, but may be inverted upside down. That is, designing any of the constructions shown in FIGS. 24 to 29 and 38 upside down to suit the actual apparatus arrangement, optical system arrangement, etc. causes no problem whatsoever. In the fifth to ninth and eleventh embodiments, the optical path is bent with a flat-surface mirror MF disposed at the ceiling so that an image is projected onto the image projection surface Si. The bending of the optical path with a flat-surface mirror may be achieved in any other manner. For example, it is alternatively possible to adopt, for example, a construction as shown in FIG. 36 in which the optical path is bent once with a flat-surface mirror MF, or a construction as shown in FIG. 37 in which the optical path is bent twice with flat-surface mirrors MF1 and MF2. That is, in the oblique projection optical system of any of the fifth to eleventh embodiments, it is possible to adopt a construction in which the optical path is bent back and forth, from side to side, or otherwise as shown in FIGS. 36 and 37.

In the fifth to eleventh embodiments, the oblique projection optical system is optically so constructed as to perform enlargement projection obliquely from an image formation surface So on the reduction side to an image projection surface Si on the enlargement side so as to be suitable for use in a rear-projection-type image projection apparatus (rear projector). The oblique projection optical system, however, may also be used, in an image reading apparatus, as an oblique projection optical system that performs reduction projection obliquely from the image projection surface Si side to the image formation surface So side. In that case, the image formation surface So corresponds to the photoreceptive surface of a photoreceptive device (for example, a CCD (charge-coupled device) for reading an image, and the image projection surface Si corresponds to the surface of an image (for example, a document) to be read. In the fifth to eleventh embodiments, the reflective surface that light passes immediately before reaching the image projection surface Si on the enlargement side is a flat reflective surface. The flat-surface mirror MF on which this reflective surface is formed may be removed, and a screen may be placed at the resulting new position of the image projection surface Si (that is, the mirror image position of the image projection surface Si with respect to the flat reflective surface). This makes the oblique projection optical system usable in a front-projection-type image projection apparatus (front projector). Even with this construction, the oblique projection optical system can be used as a reduction optical system.

In the fifth to eleventh embodiments, both a reflective optical element and a transmissive optical element are used. Used as reflective optical elements are a curved-surface mirror having a curved reflective surface and a flat-surface mirror having a flat reflective surface. A reflective optical element used is not limited to a mirror, but may be a kind of prism having a curved or flat reflective surface. Moreover, one or more reflective optical elements each having a plurality of reflective surfaces may be used, and an optical element having a reflective surface, refractive surface, or diffractive surface, or a combination thereof may be used. Used as a transmissive optical element is a refractive lens having a curved refractive surface. A transmissive optical element used is not limited to a refractive lens that deflects the light incident thereon by refraction (that is, one that deflects light at the interface between two media having different refractive indices), but may be a diffractive lens that deflects the light incident thereon by diffraction, or a refractive/diffractive hybrid lens that deflects the light incident thereon by the combined effect of diffraction and refraction, or a gradient-index lens that deflects the light incident thereon through varying refractive indices distributed within a medium. Now, the optical construction of each of the fifth to eleventh embodiments will be described in more detail.

In the fifth embodiment (FIG. 24), along the projection optical path from the image formation surface S0 to the image projection surface Si, there are arranged the following optical elements in the order they are named: a cover glass CG; a first curved-surface mirror M1 having a curved reflective surface S3 that is a spherical surface; a substantially non-power rotation-symmetric aspherical surface lens L1 whose reduction-side surface S4 is a rotation-symmetric aspherical surface and whose enlargement-side surface S5 is a flat surface; a second curved-surface mirror M2 having a curved reflective surface S6 that is a rotation-symmetric aspherical surface; a substantially non-power non-rotation-symmetric free-form curved surface lens L2 whose reduction-side surface S7 is a non-rotation-symmetric free-form curved surface and whose enlargement-side surface S8 is a flat surface; a third curved-surface mirror M3 having a curved reflective surface S9 that is a non-rotation-symmetric free-form curved surface; a fourth curved-surface mirror M4 having a curved reflective surface S10 that is a non-rotation-symmetric free-form curved surface; and a flat-surface mirror MF having a flat reflective surface S11 for bending the optical path.

In the sixth embodiment (FIG. 25), along the projection optical path from the image formation surface S0 to the image projection surface Si, there are arranged the following optical elements in the order they are named: a cover glass CG; a first curved-surface mirror M1 having a curved reflective surface S3 that is a spherical surface; a substantially non-power non-rotation-symmetric free-form curved surface lens L1 whose reduction-side surface S4 is a non-rotation-symmetric free-form curved surface and whose enlargement-side surface S5 is a flat surface; a second curved-surface mirror M2 having a curved reflective surface S6 that is a spherical surface; a substantially non-power non-rotation-symmetric free-form curved surface lens L2 whose reduction-side surface S7 is a non-rotation-symmetric free-form curved surface and whose enlargement-side surface S8 is a flat surface; a third curved-surface mirror M3 having a curved reflective surface S9 that is a non-rotation-symmetric free-form curved surface; a fourth curved-surface mirror M4 having a curved reflective surface S10 that is a non-rotation-symmetric free-form curved surface; and a flat-surface mirror MF having a flat reflective surface S11 for bending the optical path.

In the seventh embodiment (FIG. 26), along the projection optical path from the image formation surface S0 to the image projection surface Si, there are arranged the following optical elements in the order they are named: a cover glass CG; a first curved-surface mirror M1 having a curved reflective surface S3 that is a spherical surface; a second curved-surface mirror M2 having a curved reflective surface S4 that is a spherical surface; a substantially non-power non-rotation-symmetric free-form curved surface lens L1 whose reduction-side surface S5 is a non-rotation-symmetric free-form curved surface and whose enlargement-side surface S6 is a flat surface; a substantially non-power non-rotation-symmetric free-form curved surface lens L2 whose reduction-side surface S7 is a non-rotation-symmetric free-form curved surface and whose enlargement-side surface S8 is a flat surface; a third curved-surface mirror M3 having a curved reflective surface S9 that is a non-rotation-symmetric free-form curved surface; a fourth curved-surface mirror M4 having a curved reflective surface S10 that is a non-rotation-symmetric free-form curved surface; and a flat-surface mirror MF having a flat reflective surface S11 for bending the optical path.

In the eighth embodiment (FIG. 27), along the projection optical path from the image formation surface S0 to the image projection surface Si, there are arranged the following optical elements in the order they are named: a cover glass CG; a first curved-surface mirror M1 having a curved reflective surface S3 that is a spherical surface; a second curved-surface mirror M2 having a curved reflective surface S4 that is a spherical surface; a substantially non-power non-rotation-symmetric free-form curved surface lens L1 whose reduction-side and enlargement-side surfaces S5 and S6 are both non-rotation-symmetric free-form curved surfaces; a third curved-surface mirror M3 having a curved reflective surface S7 that is a non-rotation-symmetric free-form curved surface; a fourth curved-surface mirror M4 having a curved reflective surface S8 that is a non-rotation-symmetric free-form curved surface; and a flat-surface mirror MF having a flat reflective surface S9 for bending the optical path.

In the ninth embodiment (FIG. 28), along the projection optical path from the image formation surface S0 to the image projection surface Si, there are arranged the following optical elements in the order they are named: a cover glass CG; a substantially non-power non-rotation-symmetric free-form curved surface lens L1 whose reduction-side surface S3 is a non-rotation-symmetric free-form curved surface and whose enlargement-side surface S4 is a flat surface; a first curved-surface mirror M1 having a curved reflective surface S5 that is a spherical surface; a substantially non-power non-rotation-symmetric free-form curved surface lens L2 whose reduction-side surface S6 is a non-rotation-symmetric free-form curved surface and whose enlargement-side surface S7 is a flat surface; a second curved-surface mirror M2 having a curved reflective surface S8 that is a spherical surface; a third curved-surface mirror M3 having a curved reflective surface S9 that is a non-rotation-symmetric free-form curved surface; a fourth curved-surface mirror M4 having a curved reflective surface S10 that is a non-rotation-symmetric free-form curved surface; and a flat-surface mirror MF having a flat reflective surface S11 for bending the optical path.

In the tenth embodiment (FIG. 29), along the projection optical path from the image formation surface S0 to the image projection surface Si, there are arranged the following optical elements in the order they are named: a cover glass CG; a first curved-surface mirror M1 having a curved reflective surface S3 that is a spherical surface; a substantially non-power non-rotation-symmetric free-form curved surface lens L1 whose reduction-side surface S4 is a non-rotation-symmetric free-form curved surface and whose enlargement-side surface S5 is a flat surface; a second curved-surface mirror M2 having a curved reflective surface S6 that is a spherical surface; a substantially non-power non-rotation-symmetric free-form curved surface L2 whose reduction-side surface S7 is a non-rotation-symmetric free-form curved surface and whose enlargement-side surface S8 is a flat surface; a third curved-surface mirror M3 having a curved reflective surface S9 that is a non-rotation-symmetric free-form curved surface; a fourth curved-surface mirror M4 having a curved reflective surface S10 that is a non-rotation-symmetric free-form curved surface; and a flat-surface mirror MF having a flat reflective surface S11 for bending the optical path.

In the eleventh embodiment (FIG. 38), along the projection optical path from the image formation surface S0 to the image projection surface Si, there are arranged the following optical elements in the order they are named: a cover glass CG; a first curved-surface mirror M1 having a curved reflective surface S3 that is a spherical surface; a substantially non-power non-rotation-symmetric free-form curved surface lens L1 whose reduction-side surface S4 is a non-rotation-symmetric free-form curved surface and whose enlargement-side surface S5 is a flat surface; a second curved-surface mirror M2 having a curved reflective surface S6 that is a rotation-symmetric aspherical surface; a substantially non-power non-rotation-symmetric free-form curved surface lens L2 whose reduction-side surface S7 is a non-rotation-symmetric free-form curved surface and whose enlargement-side surface S8 is a flat surface; a third curved-surface mirror M3 having a curved reflective surface S9 that is a non-rotation-symmetric free-form curved surface; a fourth curved-surface mirror M4 having a curved reflective surface S10 that is a non-rotation-symmetric free-form curved surface; and a flat-surface mirror MF having a flat reflective surface S11 for bending the optical path.

In the fifth to eleventh embodiments, refractive surfaces (lenses L1 and L2) having a rotation-symmetric aspherical shape or non-rotation-symmetric free-form curved shape are used for aberration correction. A transmissive optical element having a refractive surface has a comparatively low refractive index, and is therefore generally less sensitive to errors than a reflective optical element. Thus, a transmissive optical element is easier to fabricate and adjust. Accordingly, making a refractive optical element, as well as an optically powered reflective optical element, responsible for aberration correction helps facilitate fabrication and reduce cost. To obtain these advantages, it is preferable that there be provided at least one transmissive optical element that is capable of aberration correction. Moreover, by giving the transmissive optical element a rotation-symmetric aspherical shape or non-rotation-symmetric free-form curved shape, it is possible to achieve more effective aberration correction while keeping sensitivity to errors low and, by making the transmissive optical element substantially non-power, it is possible to further reduce sensitivity to error. In a wide-angle eccentric optical system like those of the fifth to eleventh embodiments, it is possible to obtain still better optical performance by correcting non-rotation-symmetric aberration. Accordingly, it is preferable that the transmissive optical element have, as an aberration correction refractive surface, at least one refractive surface that is a non-rotation-symmetric free-form curved surface.

To achieve high performance while achieving a proper balance thereof with a wide angle, compactness, etc., it is important to effectively arrange optical surfaces for aberration correction. From this viewpoint, in a projection optical system that projects an image on an image formation surface obliquely onto an image projection surface, it is preferable that there be provided a plurality of curved reflection surfaces and at least one aberration correction refractive surface, that at least one aberration correction refractive surface fulfill one of conditional formulae (4a) and (4b) below, and that the most enlargement-side curved optical surface is a reflective surface.

$$0 < Lr/La < 0.8 \tag{4a}$$

$$1.1 < Lr/La < 2 \tag{4b}$$

where, let the ray traveling from the image center on the image formation surface through the center of the pupil to the image center on the image projection surface be called the "reference ray" ("central principal ray"), La represents the distance from the image formation surface to the pupil along the reference ray; and Lr represents the distance from the image formation surface to the aberration correction refractive surface along the reference ray.

Conditional formulae (4a) and (4b) define the conditional ranges that should preferably be fulfilled with respect to the arrangement of an aberration correction refractive surface (the position of the pupil used as the reference here corresponds to where the principal rays are converged). An aberration correction refractive surface that fulfills neither of these conditional formula may be present within the projection optical system. To alleviate distortion, curvature of field, and astigmatism, which tend to be notably large in a wide-angle optical system, however, it is preferable that there be provided at least one aberration correction refractive surface that fulfills either of conditional formulae (4a) and (4b). Specifically, it is preferable that an aberration correction refractive surface be disposed where, on a plane perpendicular to the reference ray (the ray traveling from the image center on the image formation surface through the center of the pupil to the image center on the image projection surface), the principal rays of rays from different image heights diverge. By the use of an aberration correction refractive surface that fulfills either of conditional formulae (4a) and (4b), it is possible to appropriately correct distortion, curvature of field, and astigmatism, and it is possible to reduce the size of the last optical component (that is, the most enlargement-side optical component having a curved surface), which otherwise needs to be made larger to correct aberrations occurring when a wider angle is attempted. This is effective in reducing the cost of the optical components, and simultaneously permits the projection optical system as a whole to be made compact. Moreover, using a reflective surface as the most enlargement-side curved optical surface makes it easy to achieve a wide angle.

If the upper limit of conditional formula (4a) or the lower limit of conditional formula (4b) is disregarded, the effect of correcting the distortion, curvature of field, and astigmatism resulting from a wide angle is so little that it is impossible to reduce the size of the last optical component. Disregarding the upper limit of conditional formula (4b) is disadvantageous to effective aberration correction through the entire projection optical system, and also makes the diameter of a transmissive optical element having an aberration correction refractive surface unduly large, disadvantageously in terms of processing and cost.

In a projection optical system that projects, while enlarging, an image on an image formation surface obliquely onto an image projection surface, it is further preferable that there by provided a plurality of curved reflective surfaces (including at least one convex reflective surface) and at least one aberration correction refractive surface, that at least one aberration correction refractive surface fulfill conditional formula (4b) noted above and be located in the optical path on the enlargement side of the first convex reflective surface as counted from the reduction side, and that the most enlargement-side curved optical surface be a reflective surface. This will be described in more detail below.

Increasing the number or size of optical surfaces located away from a pupil (that is, located where the principal rays of rays emanating from different image heights diverge) makes it easier to correct distortion, curvature of field, and astigmatism, which tend to be notably large in a wide-angle eccentric optical system. Doing so, however, makes an optical unit built with a projection optical system larger, and is therefore disadvantageous to making an image projection apparatus compact and slim. It is also disadvantageous in terms of processing and cost. To correct distortion, curvature of field, and astigmatism without making an optical unit larger, it is preferable that there be provided at least one aberration correction refractive surface at a position a certain distance or more away from a pupil, that is, to the reduction or enlargement side of the pupil along the optical path.

To secure a space for arranging and holding an optical element having an aberration correction refractive surface in the optical path on the reduction side of the pupil along the optical path, it is necessary to increase the eccentricity of the projection optical system. This produces astigmatism, which thus needs to be corrected, quite inefficiently, with another optical surface. By contrast, a comparatively ample space is available in the optical path on the enlargement side of the pupil along the optical path, and therefore it is possible to dispose an aberration correction refractive surface easily without newly securing a space. Moreover, since the principal rays of rays emanating from different image heights diverge as a result of being reflected on a convex reflective surface, it is preferable that an aberration correction refractive surface be disposed a certain distance away from the pupil and on the enlargement side of a convex reflective surface. Furthermore, since the rays after being reflected on the convex reflective surface gradually diverge, disposing the aberration correction refractive surface at a position not too far away from the pupil along the optical path helps reduce the diameter of the aberration correction refractive surface.

Out of the above considerations, it is preferable that there be provided at least one aberration correction refractive surface that fulfills conditional formula (4b) and that is located in the optical path on the enlargement side of the first convex reflective surface as counted from the reduction side. By the use of such an aberration correction refractive surface, it is possible to properly correct distortion, curvature of field, and astigmatism. Moreover, it is also possible to reduce the size of an optical surface (in particular, one located on an enlargement side) that needs to be made large to correct aberrations occurring when a wide angle is attempted. This permits the optical unit to be made compact, and hence permits the image projection apparatus to be made compact and slim, and is advantageous also in terms of the cost of the optical components. Moreover, by using a reflective surface as the most enlargement-side curved optical surface, it is possible to achieve a wide angle easily.

If the lower limit of conditional formula (4b) is disregarded, as described above, it is necessary to increase eccentricity to secure a space, and astigmatism results. To correct this astigmatism, other optical surfaces need to bear an extra burden, making it impossible to reduce the size of optical surfaces. By contrast, if the upper limit of conditional formula (4b) is disregarded, the effect of correcting curvature of field and astigmatism lessens, resulting in an improper balance of aberrations and making it impossible to achieve high performance. Moreover, disadvantageously in terms of processing and cost, the aberration correction refractive surface has an unduly large diameter.

It is further preferable that conditional formula (4c) below be fulfilled.

$$1.2<Lr/La<1.6 \qquad (4c)$$

Conditional formula (4c) defines, within the conditional range defined by conditional formula (4b) noted above, a conditional range further preferable in terms of aberration correction, optical unit compactness, and cost.

In the fifth and eleventh embodiments, the first curved-surface mirror M1 has a spherical shape, and, in the sixth to tenth embodiments, the first and second curved-surface mirrors M1 and M2 each have a spherical shape. In this way, it is preferable that, of the plurality of curved reflective surfaces provided in the projection optical system, at least one of the first and second curved reflective surfaces as counted from the reduction side have a spherical shape. In a projection optical system including a plurality of curved reflective surfaces, the first and second curved reflective surfaces are highly sensitive. Thus, by giving one or both of the first and second curved reflective surfaces a spherical shape, which require high surface accuracy, it is possible to process them with high surface accuracy by polishing. Moreover, such surfaces can be built in by being supported with a spherical member, and thus it is also possible to minimize assembly errors. Moreover, such surfaces can be formed not with resin but with glass, which has a lower linear thermal expansion coefficient, and thus it is possible to alleviate the deviation of focus resulting from temperature variation.

In a case where, of the plurality of curved reflective surfaces provided in a projection optical system, at least one of the first and second curved reflective surfaces has a spherical shape as described above, it is preferable that at least one of the third and fourth curved reflective surfaces as counted from the reduction side have a non-rotation-symmetric free-form curved shape. Giving at least one of the first and second curved reflective surfaces a spherical shape offers the above mentioned advantages, and in addition using a non-rotation-symmetric free-form curved surface as the third and fourth curved reflective surfaces, which are comparatively insensitive to errors, enables the projection optical system to offer a wider angle and higher performance by the use of small reflective surfaces or a small number of reflective surfaces. In this way, it is possible to make the optical unit and the image projection apparatus more compact and slimmer.

It is preferable that, as in the sixth to tenth embodiments, of the plurality of curved reflective surfaces, the first and second curved reflective surfaces have spherical shapes and that at least one curved reflective surface other than the first and second curved reflective surfaces have a free-form curved shape. Giving the first and second curved reflective surfaces spherical shapes makes it easy to process and build in the first and second curved reflective surfaces, which require high surface accuracy, and giving at least one curved reflective surface other than the first and second curved reflective surfaces a non-rotation-symmetric free-form curved shape effectively enables the projection optical system to offer a wide angle and high performance.

In the fifth to eleventh embodiments, curved reflective surfaces (the first to fourth curved-surface mirrors M1 to M4) having a rotation-symmetric aspherical shape or non-rotation-symmetric free-form curved shape are used for aberration correction. As described previously, effectively arranging optical surfaces for aberration correction is important to achieve high performance while achieving a proper balance thereof with a wide angle, compactness, etc., and it is preferable that a reduction-side optical surface, which requires high surface accuracy, be given a spherical shape. Accordingly, in a projection optical system that projects an image on an image formation surface obliquely onto an image projection surface, it is preferable that there be provided a plurality of curved reflective surfaces and a plurality of aberration correction refractive surfaces, that, of the plurality of curved reflective surfaces, the first and second curved reflective surfaces as counted from the reduction side have spherical shapes, and that at least one curved reflective surface other than the first and second curved reflective surfaces have a non-rotation-symmetric free-form curved shape. Using a plurality of curved reflective surfaces and a plurality of aberration correction refractive surfaces in this way helps more effectively obtain the above mentioned advantages.

It is preferable that there be provided an aberration correction refractive surface as described above, and in addition that there be provided at least one transmissive optical element that fulfills conditional formula (5) below.

$$d\text{max}/d\text{min} < 1.5 \tag{5}$$

where, in the direction along an arbitrary ray that passes through the transmissive optical element, dmax represents the maximum distance from the reduction-side surface to the enlargement-side surface of the transmissive optical element; and dmax represents the minimum distance from the reduction-side surface to the enlargement-side surface of the transmissive optical element.

Conditional formula (5) defines a conditional range that should preferably be fulfilled with respect to the thickness of a transmissive optical element that has an aberration correction refractive surface as described above. Fulfilling conditional formula (5) means that the transmissive optical element having the aberration correction refractive surface is substantially non-power. Since a reflective surface does not produce chromatic aberrations, it is preferable that an optical power be given to a reflective mirror. Giving optical powers to reflective mirrors alone makes it possible to minimize chromatic aberrations. Also from the viewpoints of sensitivity to surface errors, sensitivity to eccentricity, and temperature-related characteristics, it is preferable that a transmissive optical element having an aberration correction refractive surface be substantially non-power. This makes it easy to process and build in the transmissive optical element. When the upper limit of conditional formula (5) is disregarded, the transmissive optical element has a sharp curvature and hence a strong optical power. This makes the transmissive optical element highly sensitive and hence difficult to fabricate and build in.

It is preferable that at least one aberration correction refractive surface as described above fulfill conditional formula (6) below.

$$5 < \theta < 50 \tag{6}$$

where, let the ray traveling from the image center on the image formation surface through the center of the pupil to the image center on the image projection surface be called the "reference ray", θ represents the angle (°) between the reference ray and a line normal to the aberration correction refractive surface as measured at the point at which the reference ray intersects the aberration correction refractive surface.

Conditional formula (6) defines a conditional range that should preferably be fulfilled with respect to the angle of incidence of the reference ray relative to an aberration correction refractive surface as described above. Disposing a slanted parallel plate in an optical path produces astigmatism. This effect can be exploited to correct astigmatism that occurs when a wider angle is attempted. By using an aberration correction refractive surface that fulfills conditional formula (6), it is possible to obtain a similar effect without using an extra optical element. For example, in a case where, as in Examples 5 to 11 presented later, an optical element having a thickness of about 2 mm and a refractive index of about 1.53 is used, when the optical element is inclined at 5°, astigmatism varies by about 0.02 mm on the reduction side.

It is preferable that, as in the fifth to eleventh embodiments, there be provided at least four curved reflective surfaces. Providing at least four curved reflective surfaces in a projection optical system makes it possible to achieve satisfactory optical performance when it is used as a wide-angle oblique projection optical system. Providing three or less curved reflective surfaces makes it extremely difficult, both in terms of design and fabrication, to obtain optical performance required in a projection optical system. On the other hand, the smaller the number of optical surfaces, the more preferable in terms of cost, and in addition, the larger the number of optical surfaces, the more disadvantageous they are to the arrangement of the optical element inside the housing. Thus, it is further preferable that there be provided four curved reflective surfaces.

It is preferable that there be provided at least four curved reflective surfaces, and that the third and fourth curved reflective surfaces as counted from the reduction side fulfill conditional formula (7) below.

$$0.8 < H4/H3 < 2 \quad (7)$$

where

H3 represents the linear distance from the upper limit point to the lower limit point of the effective area of the third curved reflective surface, as measured on the plane including the paths along which the reference ray is incident on and emergent from the third curved reflective surface; and H4 represents the linear distance from the upper limit point to the lower limit point of the effective area of the fourth curved reflective surface, as measured on the plane including paths along which the reference ray is incident on and emergent from the fourth curved reflective surface.

To efficiently reduce distortion, curvature of field, and astigmatism, which tend to be notably large in a wide-angle eccentric optical system, while making the optical unit and the image projection apparatus compact and slim, facilitating processing and assembly, and reducing cost, it is preferable that conditional formula (7) be fulfilled. If the fourth curved reflective surface has so small an effective area as to disregard the lower limit of conditional formula (7), it is difficult to correct distortion resulting from a wide angle. If the third curved reflective surface has so large an effective area as to disregard the lower limit of conditional formula (7), it is difficult to bend the optical path, disadvantageously to making the optical unit compact and hence making the image projection apparatus compact and slim. Moreover, the third curved reflective surface then has so strong a positive optical power as to be highly sensitive to errors. This makes the third curved reflective surface difficult to build in. Giving the fourth curved reflective surface so large an effective area as to disregard the upper limit of conditional formula (7) is disadvantageous to making the optical unit compact and hence making the image projection apparatus compact and slim, also disadvantageously in terms of processing and cost. Giving the third curved reflective surface so small an effective area as to disregard the upper limit of conditional formula (7) makes it difficult to correct distortion, curvature of field, and astigmatism. Moreover, the third curved reflective surface then has so strong a negative optical power as to be highly sensitive to errors. This makes the third curved reflective surface difficult to build in.

It is preferable that, as in the fifth embodiment, of the plurality of curved reflective surfaces provided in the projection optical system, the first curved reflective surface has a concave shape toward the side from which light is incident, that the second curved reflective surface has a convex shape toward the side from which light is incident, and that the third curved reflective surface has a concave shape toward the side from which light is incident. Giving the first to third curved reflective surfaces the just described surface shapes results in a positive-negative-positive optical power arrangement from the reduction side. This enables the projection optical system to offer a wide angle and high performance, and simultaneously helps reduce the size of the four curved reflective surface. Thus, it is possible to make the optical unit and the image projection apparatus compact, slim, and low-cost.

As will be understood from the foregoing, the fifth to eleventh embodiments described above and the practical examples thereof presented later include constructions #1 to #8 described below. With these constructions, it is possible to effectively arrange aberration correction refractive surfaces and curved reflective surfaces in a projection optical system and thereby realize a large-screen projection optical system composed of compact optical components that, despite offering satisfactory optical performance, is advantageous in terms of mass producibility and cost. Then, by incorporating a projection optical system having one of these constructions into an image projection apparatus such as a rear projector or front projector, it is possible to make the apparatus slim, lightweight, compact, low-cost, high-performance, versatile, and otherwise enhance it.

(#1) A projection optical system for projecting, while enlarging, an image on an image formation surface obliquely onto an image projection surface (that is, a screen surface), the projection optical system comprising a plurality of curved reflective surfaces and at least one aberration correction refractive surface, wherein at least one aberration correction refractive surface fulfills one of conditional formulae (4a) and (4b) noted previously, and the most enlargement-side curved optical surface is a reflective surface.

(#2) A projection optical system as described at (#1) above, wherein, of the plurality of curved reflective surfaces, at least one of the first and second curved reflective surfaces as counted from the reduction side has a spherical shape.

(#3) A projection optical system as described at (#1) above, wherein, of the plurality of curved reflective surfaces, at least the first and second curved reflective surfaces as counted from the reduction side each have a spherical shape, and at least one curved reflective surface other than the first and second curved reflective surfaces has a non-rotation-symmetric free-form curved shape.

(#4) A projection optical system for projecting, while enlarging, an image on an image formation surface obliquely onto an image projection surface, the projection optical system comprising a plurality of curved reflective surfaces and a plurality of aberration correction refractive surfaces, wherein, of the plurality of curved reflective surfaces, the first and second curved reflective surfaces as counted from the reduction side each have a spherical shape, and at least one curved reflective surface other than the first and second curved reflective surfaces has a non-rotation-symmetric free-form curved shape.

(#5) A projection optical system as described at one of (#1) to (#4) above, wherein the projection optical system comprises at least one transmissive optical element that has one of the aberration correction refractive surfaces and that fulfils conditional formula (5) noted previously.

(#6) A projection optical system as described at one of (#1) to (#5) above, wherein at least one of the aberration correction refractive surfaces fulfills conditional formula (6) noted previously.

(#7) A projection optical system as described at one of (#1) to (#6) above, wherein there are provided at least four of the curved reflective surfaces.

(#8) An image projection apparatus comprising a projection optical system as described at one of (#1) to (#7) above According to the further described aspects of the present invention, it is possible to effectively arrange aberration correction refractive surfaces and curved reflective surfaces in a projection optical system and thereby realize a large-screen projection optical system composed of compact optical components that, despite offering satisfactory optical performance, is advantageous in terms of mass producibility and cost. Then, by incorporating a projection optical system according to the invention into an image projection apparatus such as a rear projector or front projector, it is possible to make the apparatus slim, lightweight, compact, low-cost, high-performance, versatile, and otherwise enhance it.

EXAMPLES 1 to 4

Hereinafter, practical examples of oblique projection optical systems used in image projection apparatuses embodying the present invention will be presented with reference to their construction data and other data.

Examples 1 to 4 presented below are numerical examples of oblique projection optical systems corresponding to the first to fourth embodiments, respectively, described previously. Thus, the optical construction diagrams (FIGS. 1 to 3, FIGS. 4 to 6, FIGS. 7 to 9, and FIGS. 10 to 12) showing the first to fourth embodiments also show the optical arrangement, projection optical path, and other features of Examples 1 to 4, respectively.

In the construction data of each example, the following conventions are used. Si (i=0, 1, 2, 3, . . . ) represents the i-th surface as counted from the reduction side within the system starting with the image formation surface S0 (corresponding to the object surface in enlargement projection) on the image forming device LV and ending with the image projection surface S10 (corresponding to the image surface in enlargement projection) on the screen SC. How each optical element is arranged is represented by the coordinates (X, Y, Z) (mm), as measured in a global rectangular coordinate system (X, Y, Z), of the origin (o) and the coordinate axis vectors (vx, vy, vz) of the local rectangular coordinate system (x, y, z) established with its origin (o) located at the vertex of the optical surface Si of the optical element. The global rectangular coordinate system (X, Y, Z) is an absolute coordinate system that coincides with the local rectangular coordinate system (x, y, z) established for the image formation surface S0.

In Examples 1 to 4, the position and the effective radius of the entrance pupil are as follows:
o: (100000, −20000, 0)
vx: (1, 0, 0)
vy: (0, 1, 0)
vz: (0, 0, 1)
Effective Radius=14491.5 (mm)

The surface shape of each optical element is represented by the curvature (C0, mm$^{-1}$) etc. of the optical surface Si of the optical element. The surface shape of a rotation-symmetric aspherical surface is defined by formula (AS1) below within the local rectangular coordinate system (x, y, z) having its origin (o) at the vertex of the surface. On the other hand, the surface shape of a free-form curved surface (non-rotation-symmetric expanded aspherical surface) is defined by formula (FS1) below within the local rectangular coordinate system (x, y, z) having its origin (o) at the vertex of the surface. Listed together with the construction data are rotation-symmetric aspherical surface data, free-form curved surface data, and other data (no zero value is shown unless necessary). Also listed are the refractive index N for the d-line of the medium located on the entrance side of each optical surface Si, the refractive index N' for the d-line of the medium located on the exit side thereof, and the Abbe number vd of the optical material.

$$x = (C0 \cdot h^2)/(1 + \sqrt{1 - \varepsilon \cdot C0^2 \cdot h^2}) + \sum (A(i) \cdot h^i) \quad \text{(AS1)}$$

$$x = (C0 \cdot h^2)/(1 + \sqrt{1 - \varepsilon \cdot C0^2 \cdot h^2}) + \sum (B(j, k) \cdot y^j \cdot z^k) \quad \text{(FS1)}$$

wherein
x represents the displacement (with respect to the vertex) from the reference surface as measured in the x-axis direction at the height h;
h represents the height in a direction perpendicular to the x-axis ($h^2=y^2+z^2$);
C0 represents the curvature at the vertex (a positive or negative sign added with respect to the x-axis, a positive sign added when the center of the curvature lies in the positive direction on the vector vx);
ε represents the quadric surface parameter;
A(i) represents the aspherical surface coefficient of order i; and
B(j,k) represents the free-form curved surface coefficient of order j with respect to y and order k with respect to z.

CONSTRUCTION DATA OF EXAMPLE 1

Surface S0 (Image Formation Surface on Image Forming Device LV
Image Size (mm, Rectangular): 9.962 (Y-Direction)×17.71 (Z-Direction)
o: (0, 0, 0)
vx: (1, 0, 0)
vy: (0, 1, 0)
vz: (0, 0, 1)
N=N'=1
C0=0.000000
Surface S1 (Entrance-side Surface of Glass Plate GP)
o: (0.47, 0, 0)
vx: (1, 0, 0)
vy: (0, 1, 0)
vz: (0, 0, 1)
N=1, N'=1.5168 (vd=64.2)
C0=0.000000
Surface S2 (Exit-side Surface of Glass Plate GP)
o: (3.47, 0, 0)
vx: (1, 0, 0)
vy: (0, 1, 0)
vz: (0, 0, 1)
N=1.5168, N'=1
C0=0.000000
Surface S3 (Reflective Optical Surface of First Mirror M1)
o: (59.645949, −25.9241598, 0)
vx: (0.994830498, −0.101549402, 0)
vy: (0.101549402, 0.994830498, 0)
vz: (0, 0, 1)
N=N'=1
C0=−0.013766
Surface S4 (Entrance-side Surface of Refractive Lens GL)
o: (28.056374, −24.5609586, 0)
vx: (−0.926438891, −0.376445189, 0)
vy: (−0.376445189, 0.926438891, 0)
vz: (0, 0, −1)
N=1, N'=1.522 (vd=52.2)
C0=0.000000
ε=1.0
B(3, 0)=1.54732×10$^{-5}$
B(4, 0)=3.23443×10$^{-6}$
B(5, 0)=5.80217×10$^{-7}$
B(6, 0)=2.68335×10$^{-7}$
B(7, 0)=−1.35461×10$^{-8}$
B(8, 0)=−6.27744×10$^{-9}$
B(1, 2)=3.13620×10$^{-5}$
B(2, 2)=6.57804×10$^{-4}$
B(3, 2)=−1.12043×10$^{-7}$
B(4, 2)=2.17396×107

B(5, 2)=−1.90489×10⁻⁹
B(6, 2)=−6.00843×10⁻⁹
B(0, 4)=1.42169×10⁻⁶
B(1, 4)=−3.12929×10⁻⁷
B(2, 4)=1.89667×10⁷
B(3, 4)=−1.26494×10⁻⁷
B(4, 4)=−2.63887×10⁻⁸
B(5, 4)=5.44704×10⁻⁹
B(6, 4)=5.58232×10⁻¹⁰
B(0, 6)=3.10811×10⁻⁸
B(1, 6)=1.50501×10⁻⁹
B(2, 6)=−5.24497×10⁻⁹
B(3, 6)=5.03032×10⁻⁹
B(4, 6)=7.97552×10⁻¹⁰
B(0, 8)=−4.71610×10⁻¹⁰

Surface S5 (Exit-side Surface of Refractive Lens GL)
o: (26.108471, −24.5597754, 0)
vx: (−0.92422287, −0.381853489, 0)
vy: (−0.381853489, 0.92422287, 0)
vz: (0, 0, −1)
N=1.522, N'=1
C0=0.000000

Surface S6 (Reflective Optical Surface of Second Mirror M2)
o: (15.088351, −22.5540846, 0)
vx: (−0.989366604, 0.145443197, 0)
vy: (0.145443197, 0.989366604, 0)
vz: (0, 0, −1)
N=N'=1
C0=0.013605
ε=1.0
A(4)=4.88417×10⁻⁸
A(6)=1.23311×10⁻⁸
A(8)=−4.02711×10⁻¹¹
A(10)=1.14493×10⁻¹³
A(12)=−1.24923×10⁻¹⁶

Surface S7 (Reflective Optical Surface of Third Mirror M3)
o: (71.619512, −103.204383, 0)
vx: (0.920266862, −0.391291328, 0)
vy: (0.391291328, 0.920266862, 0)
vz: (0, 0, 1)
N=N'=1
C0=0.000000
ε=1.0
B(2, 0)=−1.76828×10⁻³
B(3, 0)=−4.73032×10⁻⁶
B(4, 0)=−3.33885×10⁻⁸
B(5, 0)=1.59056×10⁻¹⁰
B(6,0)=2.76300×10⁻¹²
B(7, 0)=1.08632×10⁻¹³
B(8, 0)=−1.70175×10⁻¹⁵
B(9, 0)=−1.52510×10⁻¹⁷
B(10, 0)=4.11850×10⁻¹⁹
B(0, 2)=−2.16356×10⁻³
B(1, 2)=−9.76469×10⁻⁶
B(2, 2)=1.05188×10⁻⁸
B(3, 2)=1.89098×10⁻⁹
B(4, 2)=3.22260×10⁻¹²
B(5, 2)=−4.62686×10⁻¹³
B(6, 2)=−6.59287×10⁻¹⁶
B(7, 2)=7.37781×10⁻¹⁷
B(8, 2)=3.42779×10²⁰
B(0, 4)=7.26283×10⁻⁸
B(1,4)=1.32917×10⁻⁹
B(2, 4)=−1.02511×10⁻¹¹
B(3, 4)=−3.98957×10⁻¹³
B(4, 4)=−4.01980×10⁻¹⁵
B(5,4)=3.52418×10⁻¹⁶
B(6, 4)=4.90768×10⁻¹⁸
B(0, 6)=−5.25635×10⁻¹²
B(1, 6)=−1.96537×10⁻¹³
B(2, 6)=7.98591×10⁻¹⁵
B(3, 6)=−1.05361×10⁻¹⁶
B(4, 6)=−7.80695×10⁻¹⁹
B(0, 8)=−4.01612×10⁻¹⁵
B(1, 8)=1.03709×10⁻¹⁶
B(2, 8)=−1.23037×10⁻¹⁸
B(0, 10)=1.85791×10⁻¹⁸

Surface S8 (Reflective Optical Surface of Fourth Mirror M4)
o: (−85.619495, −117.852471, 0)
vx: (−0.916956003, 0.398988332, 0)
vy: (0.398988332, 0.916956003, 0)
vz: (0, 0, −1)
N=N'=1
C0=0.000000
ε=1.0
B(2, 0)=1.72179×10⁻³
B(3, 0)=2.43846×10⁻⁵
B(4, 0)=3.23351×10⁻⁷
B(5, 0)=2.16133×10⁻⁹
B(6, 0)=−1.18953×10⁴²
B(7, 0)=1.28030×10⁻¹²
B(8,0)=2.83506×10⁻¹⁴
B(9, 0)=−2.36863×10⁻¹⁶
B(10, 0)=−5.57235×10⁻¹⁸
B(0, 2)=5.19285×10⁻³
B(1, 2)=7.83795×10⁻⁵
B(2, 2)=9.09009×10⁻⁷
B(3, 2)=6.73265×10⁻⁹
B(4, 2)=−3.96121×10⁻¹¹
B(5, 2)=−2.00231×10⁻¹²
B(6, 2)=1.95954×10⁻¹⁴
B(7, 2)=1.75629×10⁻¹⁵
B(8, 2)=1.99894×10⁻¹⁷
B(0, 4)=−3.53924×10⁻⁷
B(1, 4)=−1.40365×10⁻⁸
B(2, 4)=−2.86540×10⁻¹⁰
B(3, 4)=−3.86211×10⁻¹²
B(4, 4)=−2.95498×10⁻¹⁴
B(5, 4)=−4.29030×10⁻¹⁶
B(6, 4)=−7.17886×10⁻¹⁸
B(0,6)=6.41400×10⁻¹¹
B(1,6)=3.17047×10⁻¹²
B(2,6)=5.65488×10⁻¹⁴
B(3,6)=7.61823×10⁻¹⁶
B(4, 6)=8.54106×10⁻¹⁸ B(0, 8)=−1.05468×10⁻¹⁴
B(1, 8)=−4.90518×10⁻¹⁶
B(2, 8)=−7.02616×10⁻¹⁸
B(0, 10)=5.88538×10⁻¹⁹

Surface S9 (Reflective Optical Surface of Fifth Mirror M5)
o: (169.241155, −463.261462, 0)
vx: (1, 0, 0)
vy: (0, 1, 0)
vz: (0, 0, 1)
N=N'=1
C0=0.000000

Surface S10 (Image Projection Surface on Screen SC)
o: (−140.758845, −850.048584, 0)
vx: (−1, 0, 0)
vy: (0, −1, 0)

vz: (0, 0, 1)
N=N'=1
C0=0.000000

CONSTRUCTION DATA OF EXAMPLE 2

Surface S0 (Image Formation Surface on Image Forming Device LV
Image Size (mm, Rectangular): 9.962 (Y-Direction)×17.71 (Z-Direction)
o: (0, 0, 0)
vx: (1, 0, 0)
vy: (0, 1, 0)
vz: (0, 0, 1)
N=N'=1
C0=0.000000
Surface S1 (Entrance-side Surface of Glass Plate GP)
o: (0.47, 0, 0)
vx: (1, 0, 0)
vy: (0, 1, 0)
vz: (0, 0, 1)
N=1, N'=1.5168 (vd=64.2)
C0=0.000000
Surface S2 (Exit-side Surface of Glass Plate GP)
o:(3.47, 0, 0)
vx: (1, 0, 0)
vy: (0, 1, 0)
vz: (0, 0, 1)
N=1.5168, N'=1
C0=0.000000
Surface S3 (Reflective Optical Surface of First Mirror M1)
o: (48.653901, −29.6839473, 0)
vx: (0.977946614, −0.208855022, 0)
vy: (0.208855022, 0.977946614, 0)
vz: (0, 0, 1)
N=N'=1
C0=−0.016241
$\epsilon$=1.0
A(4)=5.96888×10$^{-7}$
A(6)=−5.06216×10$^{-10}$
A(8)=2.66958×10$^{-13}$
A(10)=−6.49357×10$^{-17}$
Surface S4 (Entrance-side Surface of Refractive Lens GL)
o: (30.748091, −17.9025749, 0)
vx: (−0.492621823, −0.870243495, 0)
vy: (−0.870243495, 0.492621823, 0)
vz: (0, 0, −1)
N=1, N'=1.522 (vd=52.2)
C0=0.000000
$\epsilon$=1.0
B(2, 0)=−1.60452×10$^{-4}$
B(3, 0)=2.54471×10$^{-6}$
B(4, 0)=−1.88454×10$^{-6}$
B(5, 0)=−1.40956×10$^{-7}$
B(6, 0)=−3.21319×10$^{-9}$
B(0, 2)=4.56045×10$^{-4}$
B(1, 2)=1.11779×10$^{-4}$
B(2, 2)=8.21560×10$^{-7}$
B(3, 2)=−3.84331×10$^{-7}$
B(4, 2)=−1.30489×10$^{-8}$
B(0, 4)=1.34728×10$^{-6}$
B(1, 4)=−3.22075×10$^{-7}$
B(2, 4)=−1.99485×10$^{-8}$
B(0, 6)=−7.12031×10$^{-9}$
Surface S5 (Exit-side Surface of Refractive Lens GL)
o: (26.806784, −17.9014205, 0)
vx: (−0.483586458, −0.8752966, 0)
vy: (−0.8752966, 0.483586458, 0)
vz: (0, 0, −1)
N=1.522, N'=1
C0=0.000000
Surface S6 (Reflective Optical Surface of Second Mirror M2)
o: (13.407426, −20.124162, 0)
vx: (−0.997767633, 0.066781359, 0)
vy: (0.066781359, 0.997767633, 0)
vz: (0, 0, −1)
N=N'=1
C0=0.018186
Surface S7 (Reflective Optical Surface of Third Mirror M3)
o: (53.572128, −64.4502229, 0)
vx: (0.944300533, −0.329084342, 0)
vy: (0.329084342, 0.944300533, 0)
vz: (0, 0, 1)
N=N'=1
C0=0.000000
$\epsilon$=1.0
B(2, 0)=−3.00843×10$^{-3}$
B(3, 0)=−9.04076×10$^{-6}$
B(4, 0)=1.29013×10$^{-8}$
B(5, 0)=−8.81734×10$^{-10}$
B(6, 0)=−2.27198×10$^{-11}$
B(7, 0)=2.58575×10$^{-12}$
B(8, 0)=2.68946×10$^{-14}$
B(9, 0)=−2.39612×10$^{-15}$
B(10, 0)=−3.68475×10$^{-17}$
B(0, 2)=−3.12301×10$^{-3}$
B(1, 2)=−9.96148×10$^{-6}$
B(2, 2)=9.47765×10$^{-8}$
B(3, 2)=1.79612×10$^{-9}$
B(4, 2)=−3.45552×10$^{-11}$
B(5, 2)=1.05723×10$^{-12}$
B(6, 2)=1.20180×10$^{-13}$
B(7, 2)=−1.64713×10$^{-15}$
B(8, 2)=−8.22710×10$^{-17}$
B(0,4)=8.51748×10$^{-8}$
B(1,4)=1.97489×10$^{-9}$
B(2, 4)=−7.83340×10$^{-12}$
B(3, 4)=−1.63788×10$^{-12}$
B(4,4)=9.43070×10$^{-15}$
B(5,4)=6.88303×10$^{-16}$
B(6,4)=−1.5210×10$^{-17}$
B(0,6)=8.41128×10$^{-12}$
B(1, 6)=−1.37977×10$^{-12}$
B(2, 6)=1.71250×10$^{-16}$
B(3,6)=7.65739×10$^{-16}$
B(4, 6)=1.83853×10$^{-17}$
B(0, 8)=−3.42114×10$^{-14}$
B(1,8)=8.80337×10$^{-16}$
B(2, 8)=1.39197×10$^{-17}$
B(0,10)=2.09175×10$^{-17}$
Surface S8 (Reflective Optical Surface of Fourth Mirror M4)
o: (−162.835502, −82.3771601, 0)
vx: (−0.939777263, 0.341787501, 0)
vy: (0.341787501, 0.939777263, 0)
vz: (0, 0, −1)
N=N'=1
C0=0.000000
$\epsilon$=1.0
B(2, 0)=3.48462×10$^{-3}$
B(3, 0)=6.03157×10$^{-5}$
B(4, 0)=8.78842×10$^{-7}$ B(5, 0)=−1.08865×10$^{-8}$
B(6, 0)=−8.89455×10$^{-10}$
B(7, 0)=6.68260×10$^{-12}$
B(8, 0)=1.11937×10$^{-12}$
B(9, 0)=2.27796×10$^{-14}$
B(10, 0)=1.57741×10$^{-16}$
B(0, 2)=5.82241×10$^{-3}$
B(1, 2)=9.07726×10$^{-5}$
B(2, 2)=8.60040×10$^{-7}$
B(3, 2)=−2.04156×10$^{-9}$
B(4, 2)=−3.36947×10$^{-10}$
B(5, 2)=−6.06674×10$^{-12}$
B(6, 2)=1.92238×10$^{-13}$
B(7, 2)=7.82403×10$^{-15}$
B(8, 2)=4.57854×10$^{-17}$
B(0, 4)=−4.82183×10$^{-7}$
B(1, 4)=−2.16000×10$^{-8}$
B(2, 4)=−4.12472×10$^{-10}$
B(3, 4)=−3.15512×10$^{-12}$
B(4, 4)=−2.00497×10$^{-14}$
B(5, 4)=3.25615×10$^{-16}$
B(6, 4)=2.71224×10$^{-17}$
B(0, 6)=7.92606×10$^{-1}$
B(1, 6)=4.98133×10$^{-12}$
B(2, 6)=1.04435×10$^{-13}$
B(3, 6)=4.44425×10$^{-16}$
B(4, 6)=−3.58144×10$^{-18}$
B(0, 8)=−1.32991×10$^{-14}$
B(1, 8)=−6.36156×10$^{-16}$
B(2, 8)=−1.25988×10$^{-17}$
B(0, 10)=1.31276×10$^{-18}$ Surface S9 (Reflective Optical Surface of Fifth Mirror M5)
o: (147.310269, −463.261462, 0)
vx: (1, 0, 0)
vy: (0, 1, 0)
vz: (0, 0, 1)
N=N'=1
C0=0.000000

Surface S10 (Image Projection Surface on Screen SC)
o: (−212.689731, −746.279172, 0)
vx: (−1, 0, 0)
vy: (0, −1, 0)
vz: (0, 0, 1)
N=N'=1
C0=0.000000

CONSTRUCTION DATA OF EXAMPLE 3

Surface S0 (Image Formation Surface on Image Forming Device LV
Image Size (mm, Rectangular): 9.962 (Y-Direction)×17.71 (Z-Direction)
o: (0, 0, 0)
vx: (1, 0, 0)
vy: (0, 1, 0)
vz: (0, 0, 1)
N=N'=1
C0=0.000000

Surface S1 (Entrance-side Surface of Glass Plate GP)
o: (0.47, 0, 0)
vx: (1, 0, 0)
vy: (0, 1, 0)
vz: (0, 0, 1)
N=1, N'=1.5168 (vd=64.2)
C0=0.000000

Surface S2 (Exit-side Surface of Glass Plate GP)
o: (3.47, 0, 0)
vx: (1, 0, 0)
vy: (0, 1, 0)
vz: (0, 0, 1)
N=1.5168, N'=1
C0=0.000000

Surface S3 (Reflective Optical Surface of First Mirror M1)
o: (57.501031, −31.4796329, 0)
vx: (0.977480752, −0.211024593, 0)
vy: (0.211024593, 0.977480752, 0)
vz: (0, 0, 1)
N=N'=1
C0=−0.015499
ε=1.0
A(4)=2.81692×10$^{-7}$
A(6)=−9.58781×10$^{-11}$
A(8)=5.29346×10$^{-14}$
A(10)=−8.40675×10$^{-18}$ Surface S4 (Entrance-side Surface of Refractive Lens GL)
o: (34.104378, −21.3702357, 0)
vx: (−0.633296683, −0.77390911, 0)
vy: (−0.77390911, 0.633296683, 0)
vz: (0, 0, −1)
N=1, N'=1.522 (vd=52.2)
C0=0.000000
ε=1.0
B(3, 0)=4.69689×10$^{-5}$
B(4, 0)=2.88788×10$^{-6}$
B(5, 0)=2.89726×10$^{-8}$
B(6, 0)=−1.38511×10$^{-9}$
B(7, 0)=9.19459×10$^{-10}$
B(8, 0)=8.55952×10$^{41}$
B(1, 2)=9.90614×10$^{-5}$
B(2, 2)=8.45976×10$^{-4}$
B(3, 2)=2.55145×10$^{-8}$
B(4, 2)=4.25740×10$^{-9}$
B(5, 2)=2.76692×10$^{-9}$
B(6, 2)=9.62317×10$^{-11}$
B(0, 4)=5.25063×10$^{-6}$
B(1, 4)=−2.02471×10$^{-8}$
B(2, 4)=−1.19233×10$^{-8}$
B(3, 4)=2.29248×10$^{-9}$
B(4, 4)=−8.51568×10$^{-10}$
B(5, 4)=−2.10544×10$^{-10}$
B(6, 4)=−1.04284×10$^{-11}$
B(0, 6)=−1.81138×10$^{-8}$
B(1, 6)=−6.75543×10$^{-10}$
B(2, 6)=−1.73027×10$^{-10}$
B(3, 6)=−2.43963×10$^{-11}$
B(4, 6)=−2.54458×10$^{-12}$
B(0, 8)=1.37300×10$^{-11}$ Surface S5 (Exit-side Surface of Refractive Lens GL)
o: (31.375766, −21.3651754, 0)
vx: (−0.624555484, −0.780980439, 0)
vy: (−0.780980439, 0.624555484, 0)
vz: (0, 0, −1)
N=1.522, N'=1
C0=0.000000

Surface S6 (Reflective Optical Surface of Second Mirror M2)
o: (16.215231, −21.7961985, 0)
vx: (−0.998393898, 0.056653554, 0)
vy: (0.056653554, 0.998393898, 0)
vz: (0, 0, −1)
N=N'=1
C0=0.017225
ε=1.0
A(4)=3.83154×10$^{-6}$ A(6)=1.68551×10⁻⁸
A(8)=−6.78196×10⁻¹¹
A(10)=2.67088×10⁻¹³
A(12)=−2.31970×10⁻¹⁶
  Surface S7 (Reflective Optical Surface of Third Mirror M3)
o: (54.82632, −66.280812, 0)
vx: (0.951621336, −0.307273223, 0)
vy: (0.307273223, 0.951621336, 0)
vz: (0, 0, 1)
N=N'=1
C0=0.000000
ε=1.0
B(2, 0)=−2.49556×10⁻³
B(3, 0)=−4.95080×10⁻⁶
B(4, 0)=−1.05898×10⁻⁷
B(5, 0)=−3.90754×10⁻¹⁰
B(6, 0)=8.15033×10⁻¹³
B(7,0)=1.48819×10⁻¹²
B(8,0)=2.75224×10⁻¹⁴
B(9, 0)=−3.74986×10⁻¹⁶
B(10, 0)=−7.71425×10⁻¹⁸
B(0, 2)=−2.46901×10⁻³
B(1, 2)=−1.25580×10⁻⁵
B(2, 2)=−4.99111×10⁻⁸
B(3, 2)=7.47661×10⁻⁹
B(4, 2)=1.76064×10⁻¹⁰
B(5, 2)=1.16660×10⁻¹³
B(6, 2)=−3.09439×10⁻¹⁴
B(7, 2)=3.06228×10⁻¹⁶
B(8, 2)=3.40805×10⁻¹⁸
B(0, 4)=1.88696×10⁻⁷
B(1,4)=8.29511×10⁻⁹
B(2, 4)=2.74308×10⁻¹¹
B(3, 4)=−3.04067×10⁻¹²
B(4,4)=−1.12419×10⁻¹³
B(5,4)=9.84202×10⁻¹⁷
B(6,4)=2.94888×10⁻¹⁷
B(0, 6)=−2.27231×10⁻¹¹
B(1, 6)=−4.01610×10⁻¹²
B(2,6)=6.10292×10⁻¹⁴
B(3,6)=9.99724×10⁻¹⁶
B(4, 6)=4.29875×10⁻¹⁸
B(0, 8)=−5.22064×10⁻¹⁴
B(1, 8)=2.21885×10⁻¹⁵
B(2, 8)=5.18318×10⁻¹⁸
B(0, 10)=3.72508×10⁻¹⁷
  Surface S8 (Reflective Optical Surface of Fourth Mirror M4)
o: (−58.748937, −81.2187422, 0)
vx: (−0.90365989, 0.428250865, 0)
vy: (0.428250865, 0.90365989, 0)
vz: (0, 0, −1)
N=N'=1
C0=0.000000
ε=1.0
B(2, 0)=1.26325×10⁻³
B(3, 0)=2.29410×10⁻⁵
B(4, 0)=3.61890×10⁻⁷
B(5, 0)=6.40922×10⁻⁹
B(6, 0)=1.11248×10⁻¹⁰
B(7, 0)=1.55108×10⁻¹²
B(8, 0)=1.37312×10⁻¹⁴
B(9, 0)=−4.83781×10⁻¹⁶
B(10, 0)=−9.67628×10⁻¹⁸
B(0, 2)=5.02673×10⁻³
B(1, 2)=9.09996×10⁻⁵
B(2, 2)=1.28999×10⁻⁶
B(3, 2)=1.48986×10⁻⁸
B(4, 2)=9.87593×10⁻¹¹
B(5, 2)=−1.89245×10⁻¹²
B(6, 2)=−3.78302×10⁻¹⁴
B(7, 2)=1.19938×10⁻¹⁵
B(8, 2)=2.65730×10⁻¹⁷
B(0, 4)=−3.89626×10⁻⁷
B(1, 4)=−1.85443×10⁻⁸
B(2, 4)=−4.40354×10⁻¹⁰
B(3, 4)=−8.12049×10⁻¹²
B(4, 4)=−1.02434×10⁻¹³
B(5, 4)=−1.35938×10⁻¹⁵
B(6, 4)=−1.71327×10⁻¹⁷
B(0,6)=4.59429×10⁻¹¹
B(1,6)=4.18819×10⁻¹²
B(2, 6)=8.00677×10⁻¹⁴
B(3, 6)=1.37072×10⁻¹⁵
B(4, 6)=1.591511×10⁻¹⁷
B(0, 8)=2.06180×10⁻¹⁵
B(1, 8)=−6.37817×10⁻¹⁶
B(2, 8)=−8.09032×10⁻¹⁸
B(0, 10)=−0.82166×10⁻¹⁸
  Surface S9 (Reflective Optical Surface of Fifth Mirror M5)
o: (78.952532, −463.261462, 0)
vx: (1, 0, 0)
vy: (0, 1, 0)
vz: (0, 0, 1)
N=N'=1
C0=0.000000
  Surface S10 (Image Projection Surface on Screen SC)
o: (−111.047468, −609.962467, 0)
vx: (−1, 0, 0)
vy: (0, −1, 0)
vz: (0, 0, 1)
N=N'=1
C0=0.000000

CONSTRUCTION DATA OF EXAMPLE 4

Surface S0 (Image Formation Surface on Image Forming Device LV
  Image Size (mm, Rectangular): 9.962 (Y-Direction)×17.71 (Z-Direction)
o: (0, 0, 0)
vx: (1, 0, 0)
vy: (0, 1, 0)
vz: (0, 0, 1)
N=N'=1
C0=0.000000
  Surface S1 (Entrance-side Surface of Glass Plate GP)
o: (0.47, 0, 0)
vx: (1, 0, 0)
vy: (0, 1, 0)
vz: (0, 0, 1)
N=1, N'=1.5168 (vd=64.2)
C0=0.000000
  Surface S2 (Exit-side Surface of Glass Plate GP)
o: (3.47, 0, 0)
vx: (1, 0, 0)
vy: (0, 1, 0)
vz: (0, 0, 1)
N=1.5168, N'=1
C0=0.000000
  Surface S3 (Reflective Optical Surface of First Mirror M1)
o: (57.50715, −11.28759, 0)
vx: (0.996255717, 0.086455454, 0)

vy: (−0.086455454, 0.996255717, 0)
vz: (0, 0, 1)
N=N'=1
C0=−0.014768
ε=1.0
$B(2,0)=1.64924\times10^{-4}$
$B(3,0)=4.71784\times10^{-6}$
$B(4,0)=1.18429\times10^{-7}$
$B(5,0)=-1.77762\times10^{-9}$
$B(6,0)=6.54966\times10^{-11}$
$B(7,0)=-4.13603\times10^{-11}$
$B(8,0)=2.68827\times10^{-12}$
$B(9,0)=1.33007\times10^{-13}$
$B(10,0)=-1.00191\times10^{-14}$ $B(0,2)=-1.09438\times10^{-4}$
$B(1,2)=1.70210\times10^{-5}$
$B(2,2)=-4.78385\times10^{-8}$
$B(3,2)=4.80514\times10^{-9}$
$B(4,2)=6.93438\times10^{-11}$
$B(5,2)=-2.92756\times10^{-12}$
$B(6,2)=1.00508\times10^{-12}$
$B(7,2)=-2.32440\times10^{-14}$
$B(8,2)=-1.00210\times10^{-15}$
$B(0,4)=1.63378\times10^{-7}$
$B(1,4)=-2.10074\times10^{-9}$
$B(2,4)=2.54412\times10^{-10}$
$B(3,4)=1.96026\times10^{-11}$
$B(4,4)=-1.25504\times10^{-12}$
$B(5,4)=4.36494\times10^{-14}$
$B(6,4)=-7.75212\times10^{-16}$
$B(0,6)=4.47523\times10^{-11}$
$B(1,6)=1.60913\times10^{-12}$
$B(2,6)=-4.03174\times10^{-14}$
$B(3,6)=-1.02564\times10^{-13}$
$B(4,6)=6.60007\times10^{-15}$
$B(0,8)=1.16268\times10^{-14}$
$B(1,8)=1.40551\times10^{-14}$
$B(2,8)=1.56519\times10^{-16}$
$B(0,10)=-5.10312\times10^{-17}$ Surface S4 (Entrance-side Surface of Refractive Lens GL)
o: (34.295786, −20.3709059, 0)
vx: (−0.561014973, −0.827805654, 0)
vy: (−0.827805654, 0.561014973, 0)
vz: (0, 0, −1)
N=1, N'=1.522 (vd=52.2)
C0=0.000000
ε=1.0
$B(3,0)=2.72468\times10^{-6}$
$B(4,0)=1.5980\times10^{-6}$
$B(5,0)=6.98999\times10^{-8}$
$B(6,0)=8.18034\times10^{-9}$
$B(7,0)=-3.22865\times10^{-10}$
$B(8,0)=-6.87535\times10^{-11}$
$B(1,2)=1.21955\times10^{-4}$
$B(2,2)=7.73903\times10^{-4}$
$B(3,2)=1.88628\times10^{-7}$
$B(4,2)=9.79362\times10^{-9}$
$B(5,2)=1.26980\times10^{-9}$
$B(6,2)=4.99409\times10^{-11}$
$B(0,4)=4.44933\times10^{-6}$
$B(1,4)=7.24429\times10^{-8}$
$B(2,4)=-8.69506\times10^{-9}$
$B(3,4)=2.86803\times10^{-9}$
$B(4,4)=-5.34620\times10^{-11}$
$B(5,4)=-5.06678\times10^{-11}$
$B(6,4)=-2.49567\times10^{-12}$
$B(0,6)=-1.09594\times10^{-8}$
$B(1,6)=6.08485\times10^{-11}$
$B(2,6)=1.64756\times10^{-10}$
$B(3,6)=-2.20376\times10^{-11}$
$B(4,6)=-2.39153\times10^{-12}$
$B(0,8)=2.20838\times10^{-11}$ Surface S5 (Exit-side Surface of Refractive Lens GL)
o: (31.218129, −20.3238321, 0)
vx: (−0.552742167, −0.833352324, 0)
vy: (−0.833352324, 0.552742167, 0)
vz: (0, 0, −1)
N=1.522, N'=1
C0=0.000000

Surface S6 (Reflective Optical Surface of Second Mirror M2)
o: (14.024949, −21.718508, 0)
vx: (−0.997908736, 0.064638644, 0)
vy: (0.064638644, 0.997908736, 0)
vz: (0, 0, −1)
N=N'=1
C0=0.017479
ε=1.0
$A(4)=4.74716\times10^{-6}$
$A(6)=6.51163\times10^{-9}$
$A(8)=-1.66265\times10^{-11}$
$A(10)=1.25904\times10^{-13}$
$A(12)=-1.27742\times10^{-16}$ Surface S7 (Reflective Optical Surface of Third Mirror M3)
o: (52.315902, −65.7812449, 0)
vx: (0.951455437, −0.307786536, 0)
vy: (0.307786536, 0.951455437, 0)
vz: (0, 0, 1)
N=N'=1
C0=0.000000
ε=1.0
$B(2,0)=-2.83870\times10^{-3}$
$B(3,0)=-3.97805\times10^{-6}$
$B(4,0)=-4.22392\times10^{-8}$
$B(5,0)=1.67199\times10^{-10}$
$B(6,0)=-1.72013\times10^{-11}$
$B(7,0)=2.11392\times10^{-13}$
$B(8,0)=1.68836\times10^{-14}$
$B(9,0)=7.04893\times10^{-18}$
$B(10,0)=-2.23285\times10^{-18}$
$B(0,2)=-2.61556\times10^{-3}$
$B(1,2)=-2.44475\times10^{-6}$
$B(2,2)=3.43701\times10^{-8}$
$B(3,2)=3.76824\times10^{-9}$
$B(4,2)=5.08861\times10^{-11}$
$B(5,2)=-4.53109\times10^{-13}$
$B(6,2)=4.40860\times10^{-15}$
$B(7,2)=7.96059\times10^{-16}$
$B(8,2)=4.89067\times10^{-18}$
$B(0,4)=1.12353\times10^{-7}$
$B(1,4)=4.48243\times10^{-9}$
$B(2,4)=1.83246\times10^{-11}$
$B(3,4)=-1.12280\times10^{-12}$
$B(4,4)=-2.41832\times10^{-14}$
$B(5,4)=5.46016\times10^{-16}$
$B(6,4)=2.45122\times10^{-17}$
$B(0,6)=-3.51532\times10^{-11}$
$B(1,6)=-2.85838\times10^{-12}$
$B(2,6)=-9.48517\times10^{-15}$
$B(3,6)=5.06148\times10^{-18}$
$B(4,6)=-1.60635\times10^{-17}$
$B(0,8)=-5.35900\times10^{-15}$
$B(1,8)=1.47187\times10^{-15}$
$B(2,8)=2.27489\times10^{-17}$ B(0, 10)=9.58851×10$^{-18}$
Surface S8 (Reflective Optical Surface of Fourth Mirror M4)
o: (−112.222207, −87.4792214, 0)
vx: (−0.912499635, 0.409077519, 0)
vy: (0.409077519, 0.912499635, 0)
vz: (0, 0, −1)
N=N′=1
C0=0.000000
ε=1.0
B(2, 0)=2.03649×10$^{-3}$
B(3, 0)=3.18324×10$^{-5}$
B(4, 0)=4.74902×10$^{-7}$
B(5, 0)=4.42373×10$^{-9}$
B(6, 0)=3.78713×10$^{-11}$
B(7, 0)=3.25964×10$^{-12}$
B(8, 0)=9.18800×10$^{-14}$
B(9, 0)=−9.97063×10$^{-17}$
B(10, 0)=−1.66803×10$^{-17}$
B(0, 2)=5.07047×10$^{-3}$
B(1, 2)=7.91174×10$^{-5}$
B(2, 2)=9.84717×10$^{-7}$
B(3, 2)=8.41249×10$^{-9}$
B(4, 2)=8.97985×10$^{-12}$
B(5, 2)=−1.89485×10$^{-12}$
B(6, 2)=−1.04024×10$^{-14}$
B(7, 2)=1.66407×10$^{-15}$
B(8, 2)=3.06068×10$^{-17}$
B(0, 4)=−3.51311×10$^{-7}$
B(1, 4)=−1.48000×10$^{-8}$
B(2, 4)=−3.12937×10$^{-10}$
B(3, 4)=−4.32804×10$^{-12}$
B(4, 4)=−4.74007×10$^{-14}$
B(5, 4)=−6.71977×10$^{-16}$
B(6, 4)=−1.02460×10$^{-17}$
B(0, 6)=5.01855×10$^{-11}$
B(1, 6)=2.74206×10$^{-12}$
B(2, 6)=5.64293×10$^{-14}$
B(3, 6)=6.29312×10$^{-16}$
B(4, 6)=7.00023×10$^{-18}$
B(0, 8)=−6.16513×10$^{-15}$
B(1, 8)=−2.87913×16
B(2, 8)=−4.88788×10$^{-18}$
B(0, 10)=3.24619×10$^{-19}$
Surface S9 (Reflective Optical Surface of Fifth Mirror M5)
o: (146.225972, −463.261462, 0)
vx: (1, 0, 0)
vy: (0, 1, 0)
vz: (0, 0, 1)
N=N′=1
C0=0.000000
Surface S10 (Image Projection Surface on Screen SC)
o: (−163.774028, −922.872483, 0)
vx: (−1, 0, 0)
vy: (0, −1, 0)
vz: (0, 0, 1)
N=N′=1
C0=0.000000

In Examples 1 to 4, with respect to temperature variation, the relevant components have linear thermal expansion coefficients and refractive index variation coefficients as follows:

Linear Expansion Coefficients (/° C.)
  Glass Plate (GP): 7.8×10$^{-6}$
  First Mirror (M1): 9.4×10$^{-6}$
  Refractive Lens (GL): 6.00×10$^{-5}$
  Second Mirror (M2): 9.4×10$^{-6}$
  Third Mirror (M3): 6.00×10$^{-5}$
  Fourth Mirror (M4): 6.00×10$^{-5}$
  Member (aluminum) That Holds Together Components from First Mirror (M1)
  Through the Image Forming Device (LV): 2.5×10$^{-5}$ Refractive Index Variation Coefficients (/° C.)
  Glass Plate (GP): 2.6×10$^{-6}$
  Refractive Lens (GL): −1.09×10$^{-4}$ Table 1 shows, for each of Examples 1 to 4, the y- and z-axis direction f-numbers (FNOy and FNOz) together with the surface shapes and optical powers of the reflective optical surfaces S3, S6, S7, and S8 of the first to fourth mirrors M1 to M4. What FNOy and FNOz represent are effective f-numbers calculated from the entrance pupil radius and the entrance pupil position with respect to the entrance pupil from the image formation surface S0 on the image forming device LV to the oblique projection optical system. A reflective optical surface whose optical power is marked with "+" has a concave reflective optical surface and thus has a positive optical power; a reflective optical surface whose optical power is marked with "−" has a convex reflective optical surface and thus has a negative optical power. Table 2 shows the effective radii (maximum effective radii) of the reflective optical surfaces S3, S6, S7, and S8 of the first to fourth mirrors M1 to M4.

TABLE 1

| | | | Reflective Optical Surface Shape & Power | | | | | | |
|---|---|---|---|---|---|---|---|---|---|
| Ex. | FNOy | FNOz | S3(M1) | | S6(M2) | | S7(M3) | | S8(M4) |
| 1 | 3.63 | 3.57 | Spherical | + | Aspherical | − | Free-form | + | Free-form | − |
| 2 | 3.63 | 3.57 | Aspherical | + | Spherical | − | Free-form | + | Free-form | − |
| 3 | 3.63 | 3.57 | Aspherical | + | Aspherical | − | Free-form | + | Free-form | − |
| 4 | 3.63 | 3.57 | Free-form | + | Aspherical | − | Free-form | + | Free-form | − |

TABLE 2

| | Reflective Optical Surface Maximum Effective Radius (mm) | | | |
|---|---|---|---|---|
| Ex. | S3 (M1) | S6 (M2) | S7 (M3) | S8 (M4) |
| 1 | 17.9 | 8.7 | 61.9 | 74.2 |
| 2 | 16.5 | 7.3 | 38.7 | 65.4 |
| 3 | 17.7 | 8.3 | 50.8 | 70.2 |
| 4 | 17.6 | 8.5 | 50.4 | 68.8 |

Table 3 shows the ray thickness D (mm), the screen size Ds (mm), the y- and z-axis direction projection magnifications βy and βz, the screen incidence angle (°), and other data. The ray thickness D denotes the thickness of the range in which the projection light passes, as measured in a direction normal to the image projection surface S10 on the screen SC. The screen size Ds denotes the diagonal length of the image projection surface S10 on the screen SC. The screen incidence angle denotes the angle between the vector of the central principal ray incident on the image projection surface S10 on the screen SC and the vector normal to the image projection surface S10 on the screen SC.

TABLE 3

| Ex. | Ray Thickness D (mm) | Screen Size (Diagonal Length) Ds (mm) | D/Ds | Projection Magnification βy | Projection Magnification βz | Screen Incidence Angle (degrees) |
|---|---|---|---|---|---|---|
| 1 | 310 | 1778 | 0.174 | 87.5 | −87.5 | 52.4 |
| 2 | 360 | 2160 | 0.167 | 106.3 | −106.3 | 44.7 |
| 3 | 190 | 1270 | 0.150 | 62.6 | −62.5 | 58.2 |
| 4 | 310 | 2286 | 0.136 | 112.5 | −112.5 | 55.8 |

Table 4 shows the values of the conditional formulae and the data related thereto as actually observed in each of Examples 1 to 4. The values of L, R, and ρ are those observed at 20° C., and the variations ΔL and ΔR are the differences between the values of L and R observed at 20° C. and those observed at 50° C. (that is, (the 50° C. values)−(the 20° C. values), respectively). The values of R are those observed on the XY-plane. The maximum image dimension on the image forming device LV is Lm=20.32 ($=2\times\sqrt{4.981^2+8.855^2}$). In Example 2, $|1/\rho|$=6232 (on the xy-section) and 2193 (on the xz-section).

TABLE 4

| Ex. | L (mm) | R (mm) | ΔL (mm) | ΔR (mm) | (1) \|2ΔL/ΔR\| | (2) R/L | (3) \|1/(ρ·Lm)\| xy-Section | (3) \|1/(ρ·Lm)\| xz-Section |
|---|---|---|---|---|---|---|---|---|
| 1 | 60.83 | −72.641 | 0.044 | −0.020 | 4.31 | −1.19 | ∞ | ∞ |
| 2 | 50.60 | −61.573 | 0.037 | −0.018 | 4.04 | −1.22 | 306.69 | 107.92 |
| 3 | 59.79 | −64.519 | 0.043 | −0.019 | 4.59 | −1.08 | ∞ | ∞ |
| 4 | 58.59 | −67.714 | 0.042 | −0.019 | 4.43 | −1.16 | ∞ | ∞ |

FIGS. 15A to 15Y and 16A to 16Y, FIGS. 17A to 17Y and 18A to 18Y, FIGS. 19A to 19Y and 20A to 20Y, and FIGS. 21A to 21Y and 22A to 22Y are spot diagrams showing the optical performance of Examples 1 to 4, respectively. FIGS. 15A to 15Y, 17A to 17Y, 19A to 19Y, and 21A to 21Y are spot diagrams obtained at 20° C., and FIGS. 16A to 16Y, 18A to 18Y, 20A to 20Y, and 22A to 22Y are spot diagrams obtained at 50° C. Each spot diagram shows the imaging performance (in ±1 mm divisions on scale) observed for 3 different wavelengths (450 nm, 546 nm, and 605 nm) at 25 evaluation points (A) to (Y), corresponding to the spot diagrams suffixed with "A" to "Y" respectively, on the image projection surface S10 on the screen SC. The projection positions of the spot barycenters of the individual evaluation points (A) to (Y) are listed below, in local coordinates (x, y; mm) with respect to the image projection surface S10 of the screen SC. Since Examples 1 to 4 are all constructed symmetrically about the XY-plane, each spot diagram only shows the spots evaluated at the evaluation points located in one half of the screen with respect to the XY-plane.

Spot Barycenter Projection Positions in Example 1 (20° C.)
(A): y=436.657, z=0
(B): y=436.117, z=−194.24
(C): y=435.316, z=−388.778
(D): y=435.797, z=−584.118
(E): y=435.189, z=−777.24
(F): y=217.978, z=0
(G): y=217.82, z=−193.468
(H): y=217.762, z=−386.22
(I): y=218.255, z=−578.661
(J): y=217.731, z=−772.022
(K): y=0.0838487, z=4.5009×10$^{-18}$
(L): y=0.11865, z=−193.485
(M): y=−0.0389091, z=−385.654
(N): y=−0.135617, z=−577.421
(O): y=0.232292, z=−771.898
(P): y=−218.34, z=−1.5003×10$^{-8}$
(Q): y=−217.824, z=−193.803
(R): y=−217.312, z=−386.892
(S): y=−217.715, z=−579.094
(T): y=−217.719, z=−773.055
(U): y=−435.113, z=1.20024×10$^{-17}$
(V): y=−435.067, z=−194.356
(W): y=−435.61, z=−389.259
(X): y=−436.866, z=−582.985
(Y): y=−436.682, z=−777.31

Spot Barycenter Projection Positions in Example 1 (50° C.)
(A): y=437.476, z=1.5003×10$^{-18}$
(B): y=436.965, z=−194.374
(C): y=436.264, z=−389.069
(D): y=436.949, z=−584.622
(E): y=436.771, z=−778.07
(F): y=218.261, z=0
(G): y=218.119, z=−193.57
(H): y=218.113, z=−386.437
(I): y=218.7, z=−579.021
(J): y=218.317, z=−772.566
(K): y=0.054528, z=−3.0006×10$^{-18}$
(L): y=0.0999042, z=−193.574
(M): y=−0.0247078, z=−385.841
(N): y=−0.0614807, z=−577.729
(O): y=0.401014, z=−772.364
(P): y=−218.592, z=−3.0006×10$^{-18}$
(Q): y=−218.07, z=−193.887
(R): y=−217.536, z=−387.069
(S): y=−217.901, z=−579.382
(T): y=−217.842, z=−773.485
(U): y=−435.547, z=3.0006×10$^{-18}$
(V): y=−435.501, z=−194.44
(W): y=−436.039, z=−389.435
(X): y=−437.274, z=−583.27
(Y): y=−437.046, z=−777.734

Spot Barycenter Projection Positions in Example 2 (20° C.)
(A): y=535.585, z=−1.5003×10$^{-18}$
(B): y=535.133, z=−235.281

(C): y=534.15, z=−470.454
(D): y=533.508, z=−704.709
(E): y=533.49, z=−933.298
(F): y=264.874, z=0
(G): y=264.466, z=−235.242
(H): y=263.962, z=−469.91
(I): y=264.4, z=−703.636
(J): y=264.423, z=−935.237
(K): y=0.167625, z=1.5003×10$^{-18}$
(L): y=0.138141, z=−235.157
(M): y=−0.144449, z=−469.482
(N): y=−0.292754, z=−702.673
(O): y=0.210074, z=−935.455
(P): y=−264.893, z=0
(Q): y=−264.776, z=−234.6
(R): y=−265.045, z=−469.202
(S): y=−265.662, z=−702.538
(T): y=−265.441, z=−935.905
(U): y=−531.53, z=0
(V): y=−531.927, z=−236.151
(W): y=−533.181, z=−472.917
(X): y=−533.47, z=−706.161
(Y): y=−528.566, z=−937.313

Spot Barycenter Projection Positions in Example 2 (50° C.)
(A): y=536.485, z=1.5003×10$^{-18}$
(B): y=536.053, z=−235.452
(C): y=535.124, z=−470.807
(D): y=534.565, z=−705.267
(E): y=534.646, z=−934.078
(F): y=265.241, z=0
(G): y=264.852, z=−235.392
(H): y=264.404, z=−470.225
(I): y=264.935, z=−704.147
(J): y=265.082, z=−935.984
(K): y=0.0942814, z=7.50151×10$^{-19}$
(L): y=0.0803248, z=−235.289
(M): y=−0.155928, z=−469.763
(N): y=−0.226417, z=−703.135
(O): y=0.387861, z=−936.147
(P): y=−265.335, z=1.5003×10$^{-18}$
(Q): y=−265.21, z=−234.721
(R): y=−265.45, z=−469.461
(S): y=−266.012, z=−702.97
(T): y=−265.704, z=−936.559
(U): y=−532.449, z=3.0006×10$^{-18}$
(V): y=−532.838, z=−236.27
(W): y=−534.059, z=−473.176
(X): y=−534.281, z=−706.583
(Y): y=−529.265, z=−937.934

Spot Barycenter Projection Positions in Example 3 (20° C.)
(A): y=311.669, z=−7.50151×10$^{-19}$
(B): y=311.157, z=−138.48
(C): y=311.067, z=−277.551
(D): y=311.867, z=−416.395
(E): y=311.827, z=−555.142
(F): y=156.841, z=−7.50151×10$^{-19}$
(G): y=156.565, z=−138.489
(H): y=156.346, z=−276.77
(I): y=156.384, z=−414.538
(J): y=155.943, z=−553.562
(K): y=0.0484884, z=0
(L): y=0.00265469, z=−138.286
(M): y=−0.168309, z=−276.084
(N): y=−0.255741, z=−413.701
(O): y=0.326591, z=−553.921
(P): y=−155.21, z=2.25045×118
(Q): y=−155.019, z=−138.254
(R): y=−155.258, z=−276.395
(S): y=−156.179, z=−413.878
(T): y=−155.493, z=−553.756
(U): y=−312.725, z=0
(V): y=−312.573, z=−137.936
(W): y=−313.102, z=−277.401
(X): y=−314.491, z=−415.221
(Y): y=−312.763, z=−552.814

Spot Barycenter Projection Positions in Example 3 (50° C.)
(A): y=312.333, z=0
(B): y=311.853, z=−138.591
(C): y=311.863, z=−277.801
(D): y=312.861, z=−416.844
(E): y=313.232, z=−555.93
(F): y=157.046, z=−7.50151×10$^{-19}$
(G): y=156.791, z=−138.554
(H): y=156.637, z=−276.921
(I): y=156.787, z=−414.816
(J): y=156.511, z=−554.029
(K): y=0.0033421, z=−3.0006×10$^{-18}$
(L): y=−0.0271312, z=−138.321
(M): y=−0.151495, z=−276.174
(N): y=−0.158687, z=−413.885
(O): y=0.541293, z=−554.258
(P): y=−155.382, z=3.0006×10$^{-18}$
(Q): y=−155.181, z=−138.27
(R): y=−155.388, z=−276.447
(S): y=−156.255, z=−414.002
(T): y=−155.487, z=−554.013
(U): y=−312.955, z=0
(V): y=−312.799, z=−137.94
(W): y=−313.311, z=−277.429
(X): y=−314.668, z=−415.313
(Y): y=−312.889, z=−553.027

Spot Barycenter Projection Positions in Example 4 (20° C.)
(A): y=561.915, z=−7.50151×10$^{-9}$
(B): y=561.588, z=−248.507
(C): y=560.955, z=−497.348
(D): y=561.03, z=−747.682
(E): y=561.281, z=−998.916
(F): y=280.207, z=0
(G): y=279.853, z=−248.882
(H): y=279.426, z=−497.421
(I): y=279.859, z=−746.834
(J): y=279.326, z=−998.271
(K): y=0.0193607, z=0
(L): y=0.185851, z=−248.983
(M): y=0.088946, z=−497.118
(N): y=0.0447902, z=−745.941
(O): y=0.147972, z=−999.933
(P): y=−279.525, z=−3.75075×10$^{-19}$
(Q): y=−278.758, z=−248.267
(R): y=−278.525, z=−496.552
(S): y=−279.649, z=−744.642
(T): y=−279.551, z=−999.465
(U): y=−560.86, z=1.5003×10$^{-18}$
(V): y=−560.938, z=−247.77
(W): y=−562.705, z=−497.513
(X): y=−564.764, z=−744.043
(Y): y=−560.864, z=−997.892

Spot Barycenter Projection Positions in Example 4 (50° C.)
(A): y=563.243, z=0
(B): y=562.979, z=−248.735
(C): y=562.545, z=−497.856
(D): y=563, z=−748.596
(E): y=563.959, z=−1000.5
(F): y=280.628, z=7.50151×10$^{-19}$
(G): y=280.313, z=−249.016
(H): y=280.006, z=−497.729
(I): y=280.649, z=−747.397
(J): y=280.428, z=−999.216
(K): y=−0.0508456, z=3.0006×10$^{-18}$
(L): y=0.143718, z=−249.062
(M): y=0.131725, z=−497.312
(N): y=0.233793, z=−746.324
(O): y=0.553372, z=−1000.62
(P): y=−279.87, z=−3.0006×10$^{-18}$
(Q): y=−279.085, z=−248.31
(R): y=−278.797, z=−496.677
(S): y=−279.823, z=−744.918
(T): y=−279.575, z=−1000
(U): y=−561.374, z=0
(V): y=−561.448, z=−247.796
(W): y=−563.191, z=−497.606
(X): y=−565.193, z=−744.267
(Y): y=−561.185, z=−998.355

Figure 23:
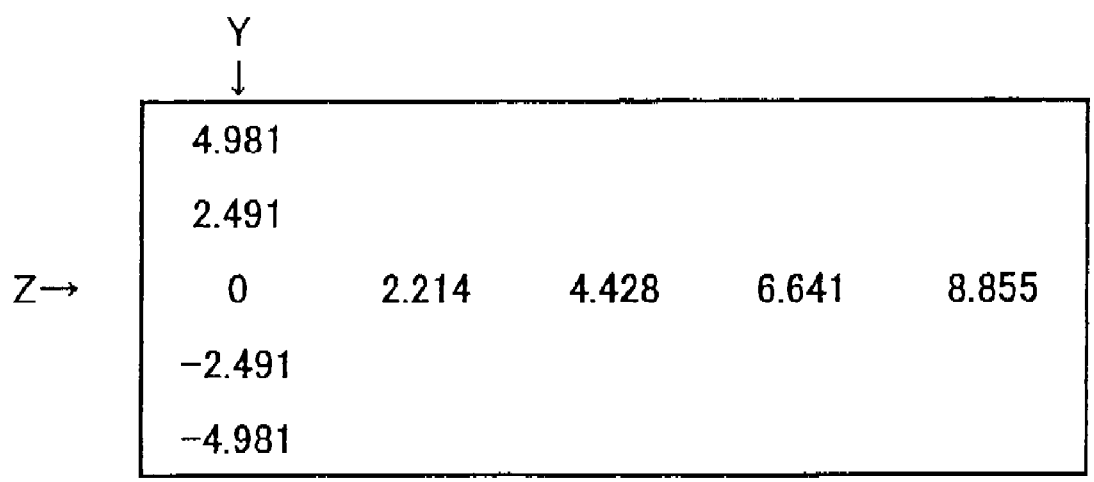
FIG. 23 is a diagram showing the coordinates on the image forming device corresponding to the ideal projection positions of the individual spots.
Figure 24:
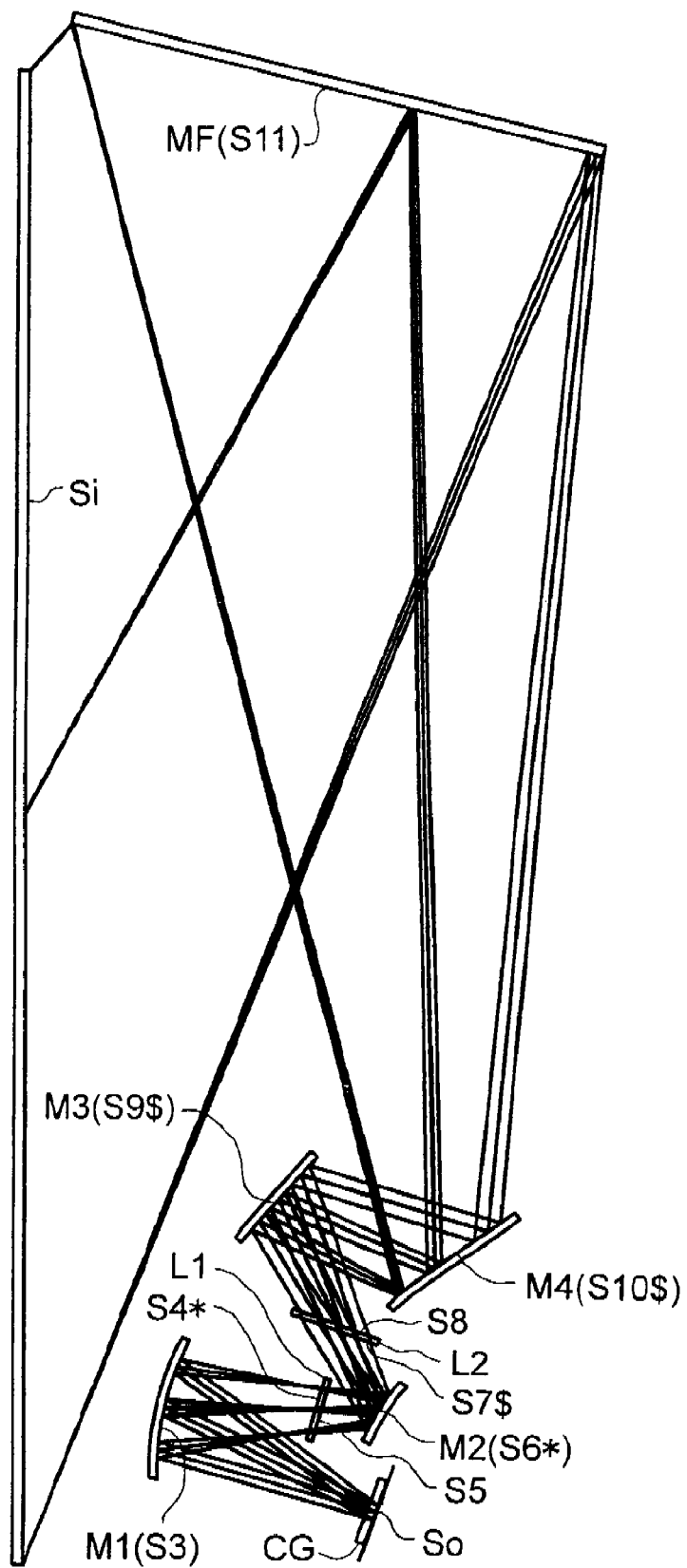
FIG. 24 is an optical path diagram showing the optical construction of a fifth embodiment (Example 5) of the invention.
Figure 25:
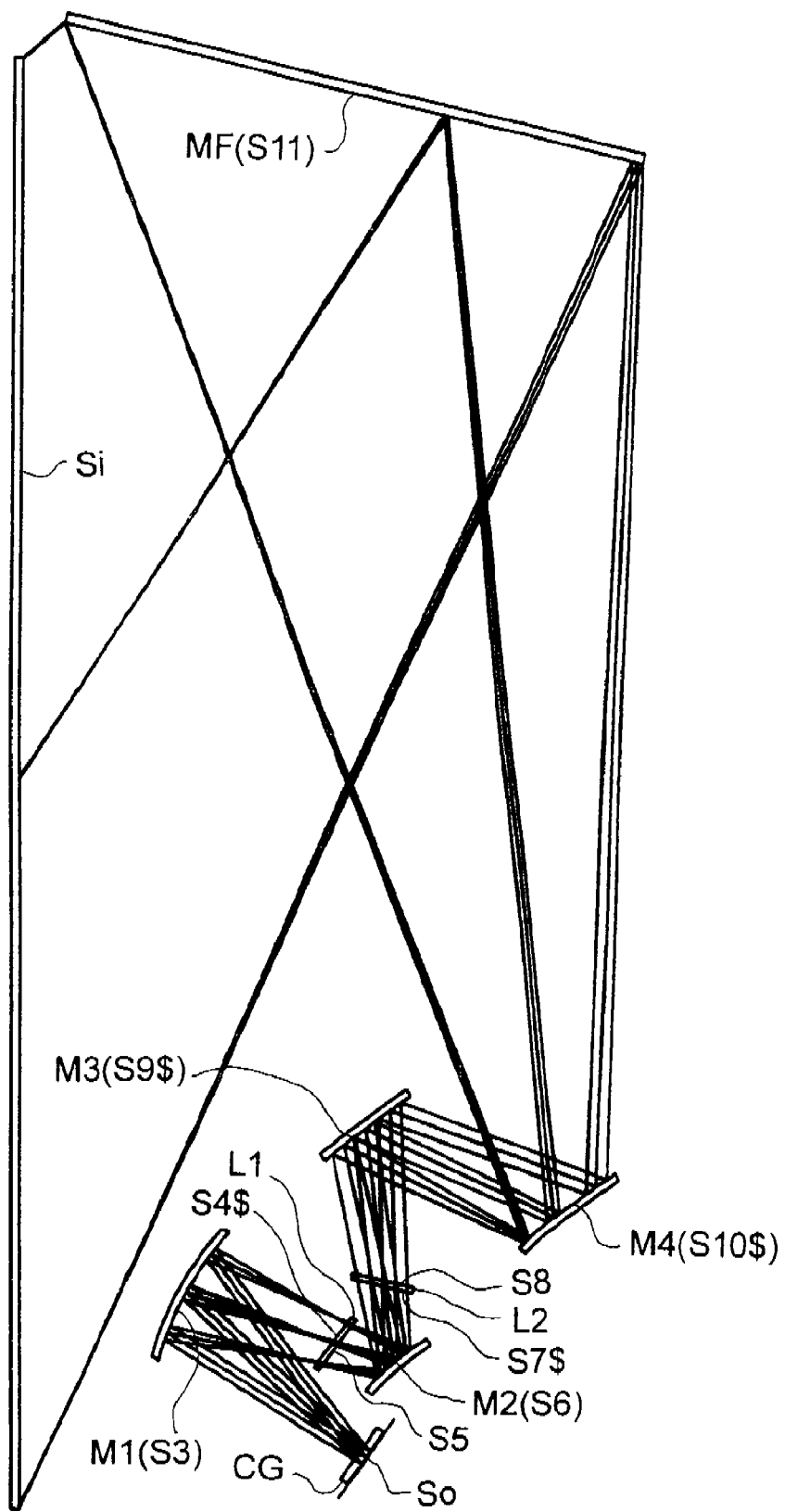
FIG. 25 is an optical path diagram showing the optical construction of a sixth embodiment (Example 6) of the invention.
Figure 26:
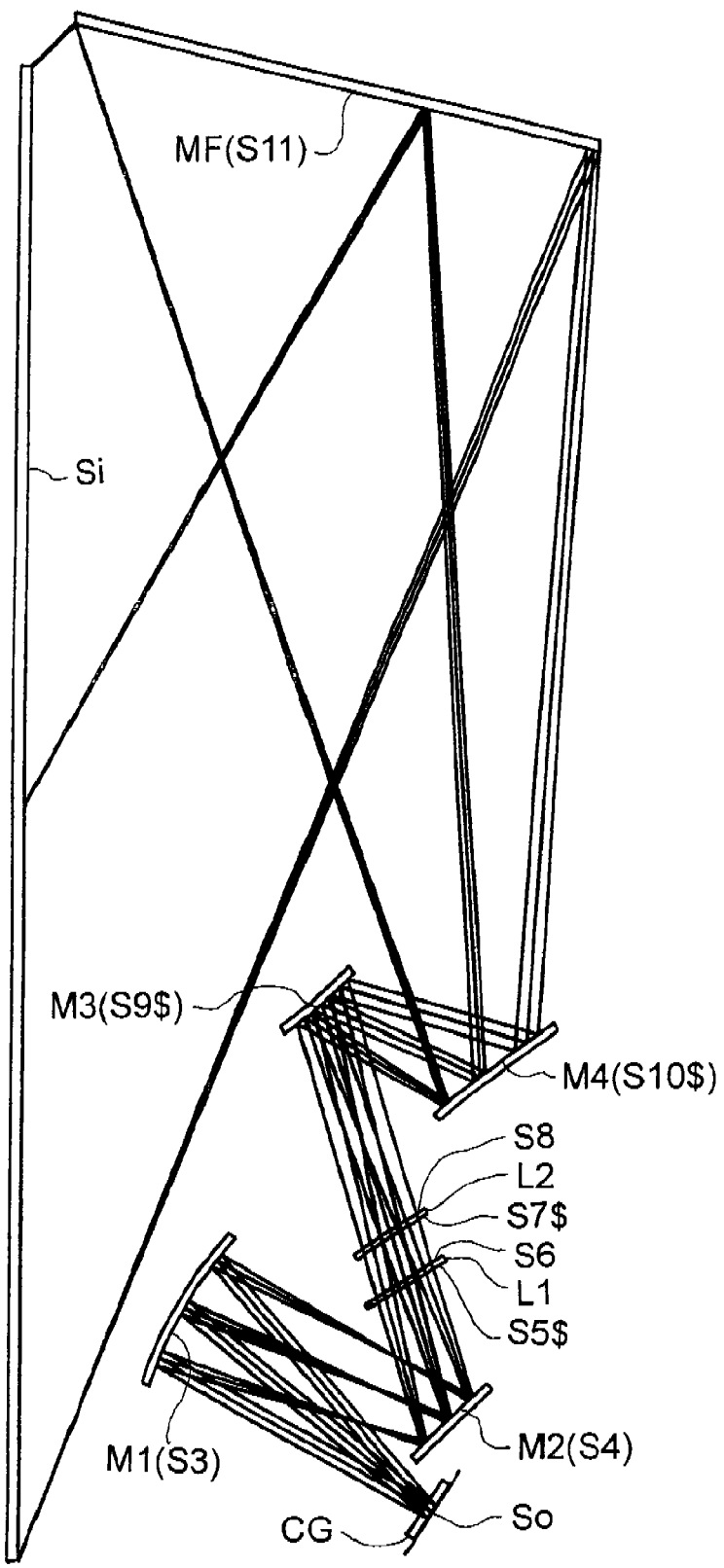
FIG. 26 is an optical path diagram showing the optical construction of a seventh embodiment (Example 7) of the invention.
Figure 27:
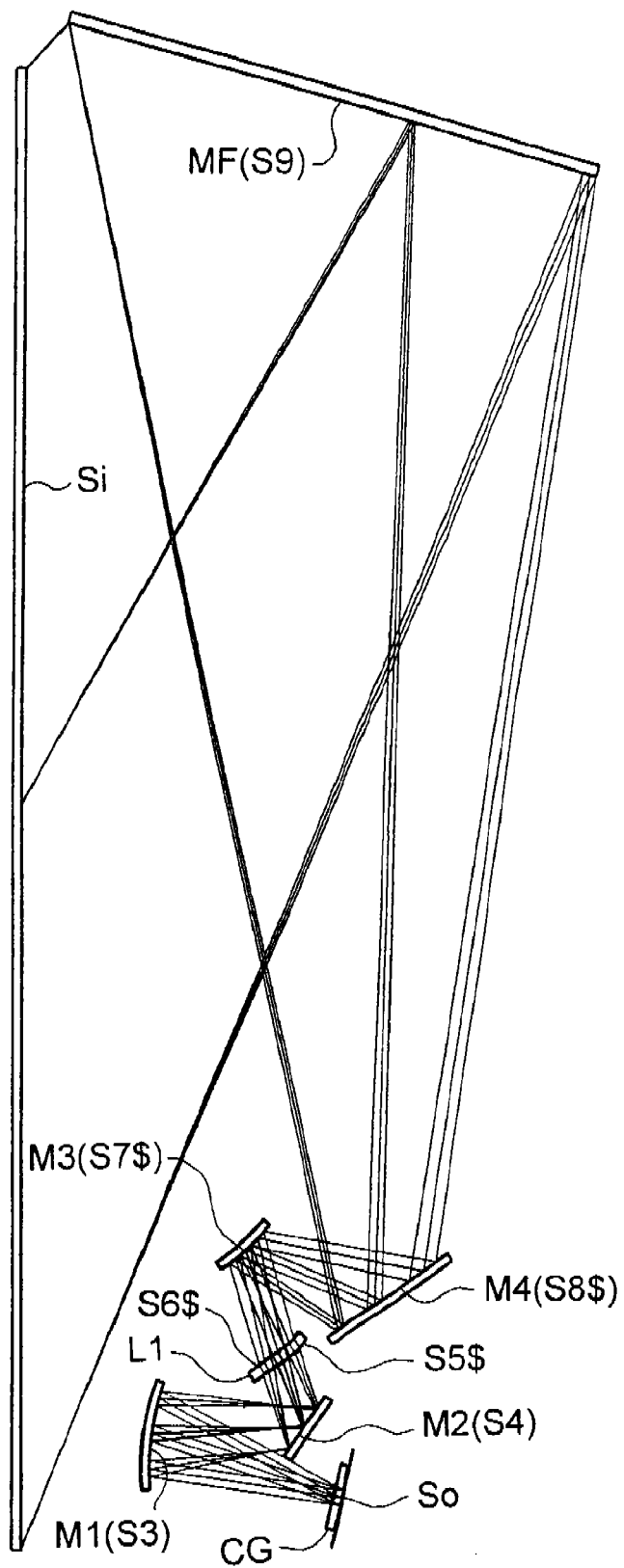
FIG. 27 is an optical path diagram showing the optical construction of an eighth embodiment (Example 8) of the invention.
Figure 28:
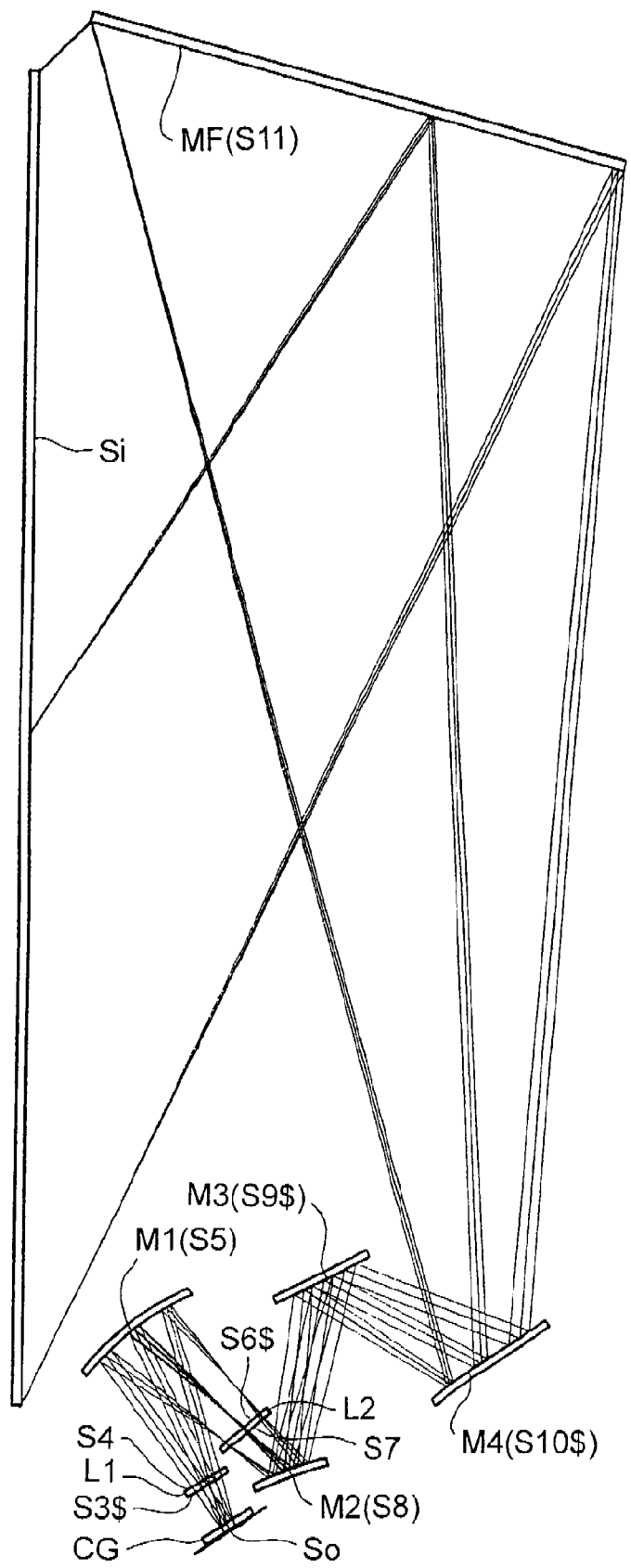
FIG. 28 is an optical path diagram showing the optical construction of a ninth embodiment (Example 9) of the invention.
Figure 29:
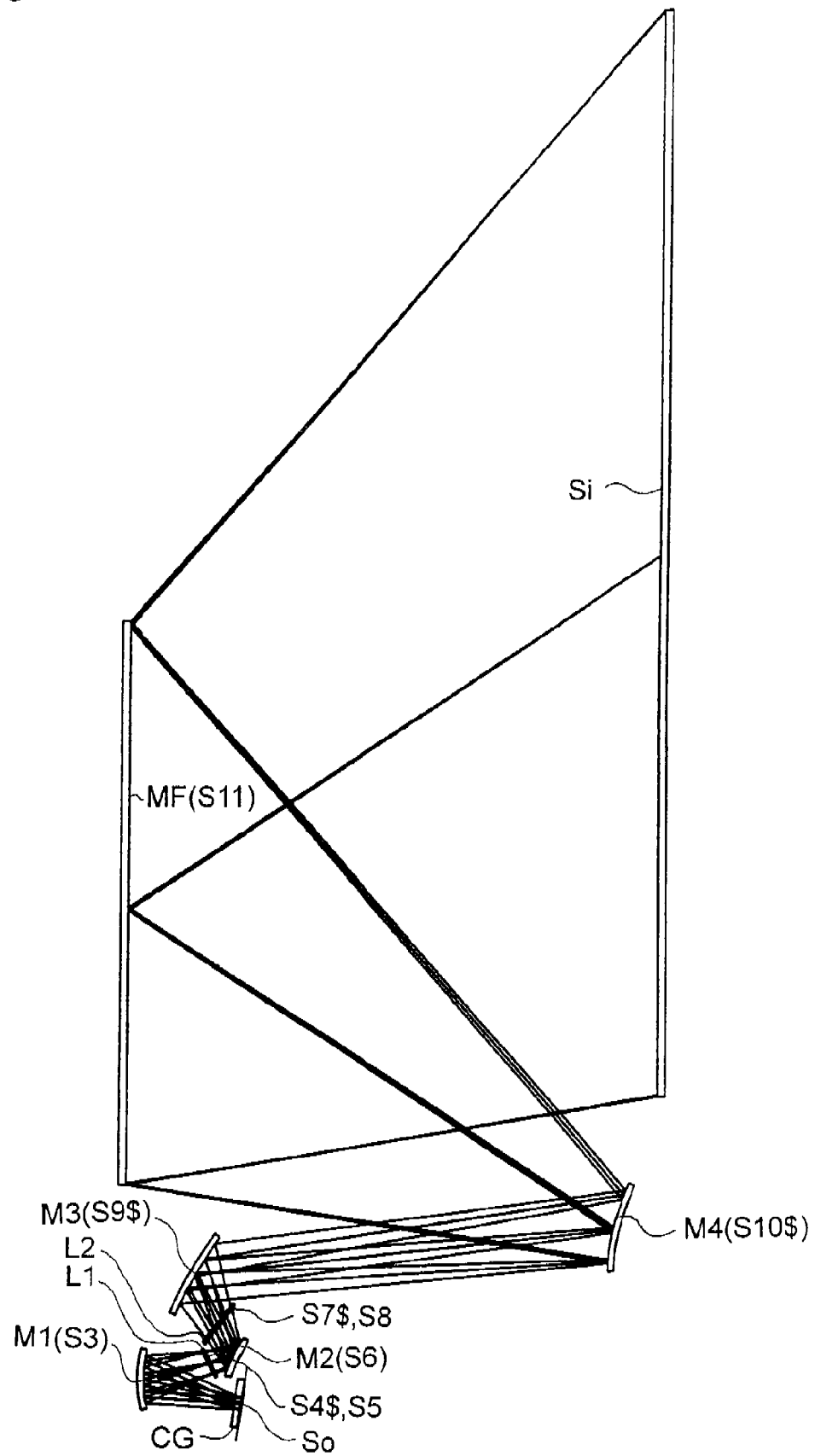
FIG. 29 is an optical path diagram showing the optical construction of a tenth embodiment (Example 10) of the invention.
Figures 32A, 32B, 32C, 32D, 32E:
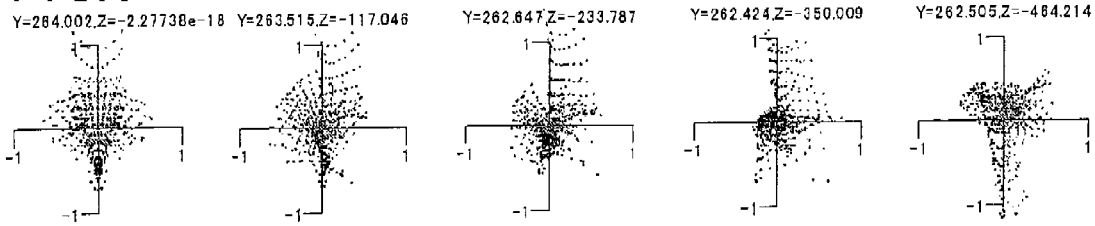
FIGS. 32A to 32Y are spot diagrams of Example 7.
Figures 32F, 32G, 32H, 32I, 32J:
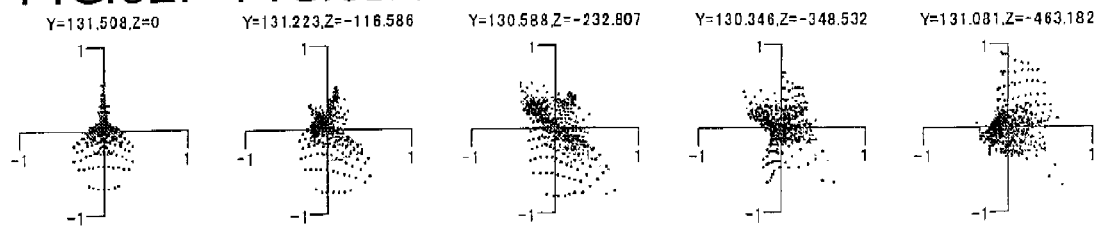
Figures 32K, 32L, 32M, 32N, 32O:
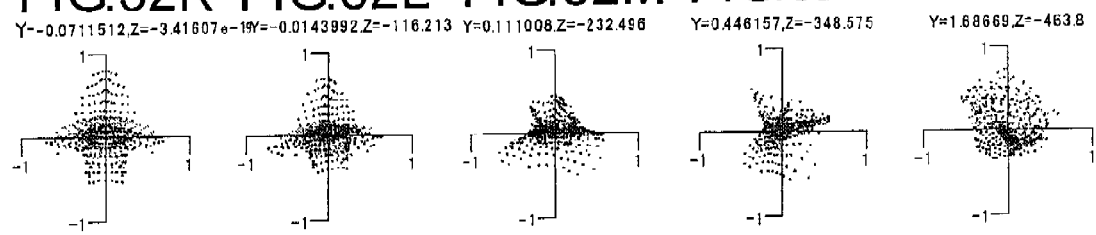
Figures 32P, 32Q, 32R, 32S, 32T:
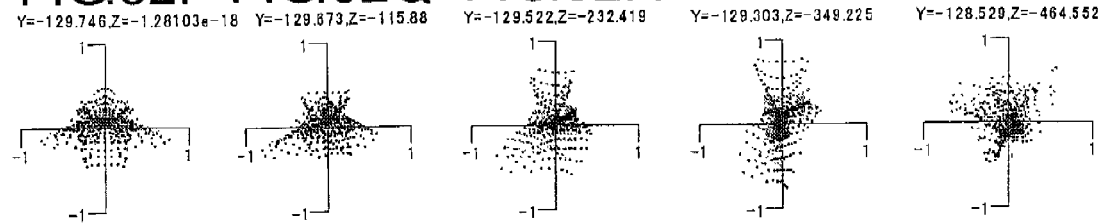
Figures 32U, 32V, 32W, 32X, 32Y:
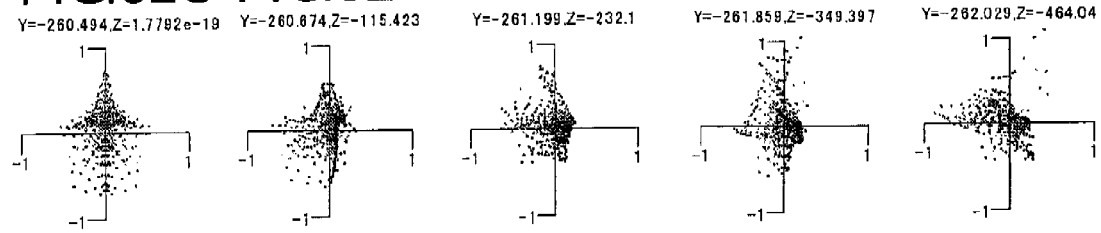
Figures 33A, 33B, 33C, 33D, 33E:
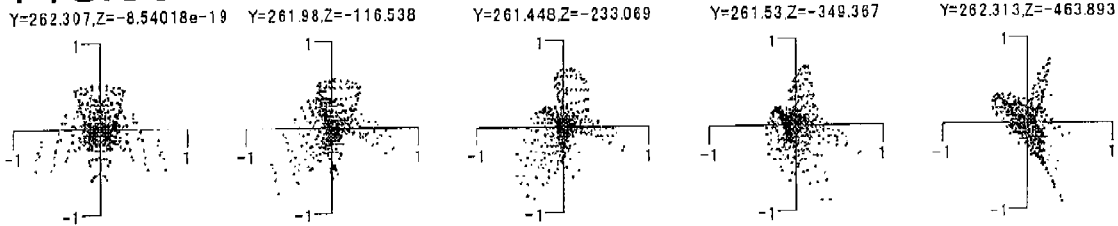
FIGS. 33A to 33Y are spot diagrams of Example 8.
Figures 33F, 33G, 33H, 33I, 33J:
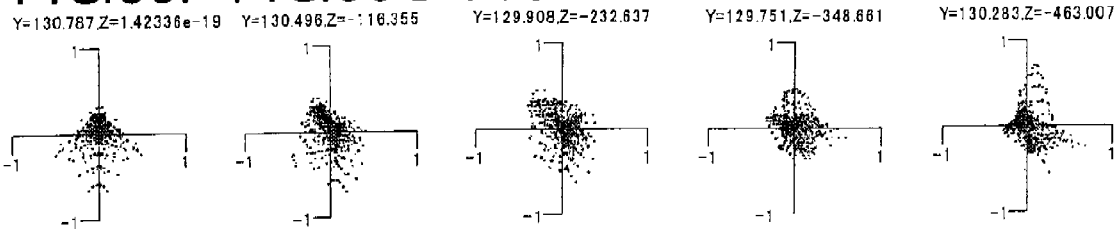
Figures 33K, 33L, 33M, 33N, 33O:
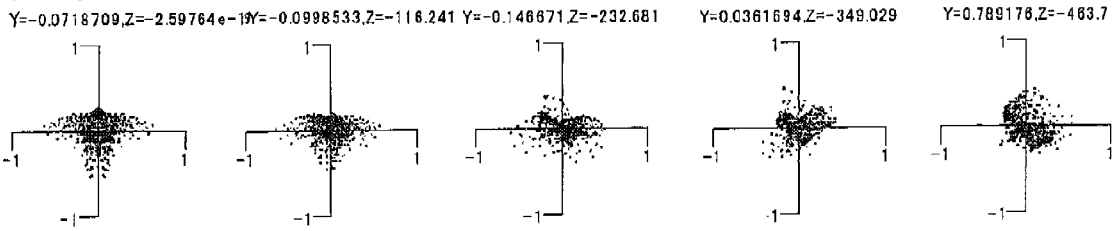
Figures 33P, 33Q, 33R, 33S, 33T:
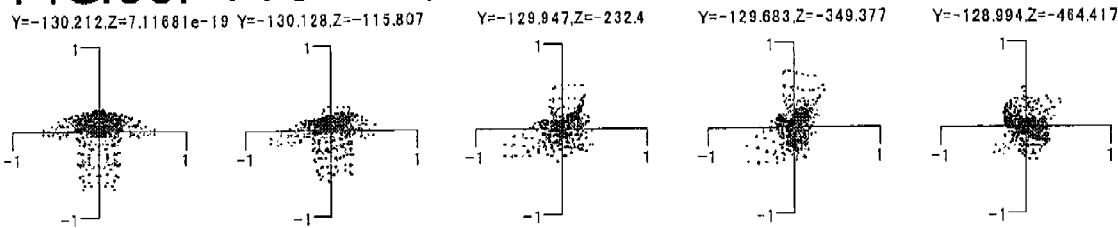
Figures 33U, 33V, 33W, 33X, 33Y:
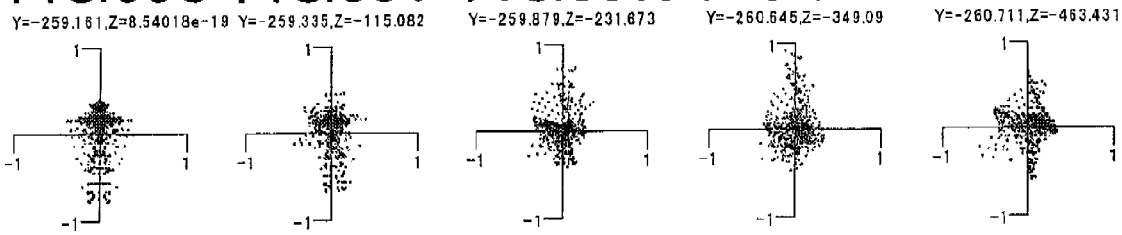

Here, it is assumed that the spot diagrams obtained at 20° C. are those obtained when the construction data are exactly as designed, and that, at 50° C., all the components other than the zeroth surface S0 have expanded. The aim of keeping the zeroth surface S0, that is, the image formation surface S0 on the image forming device LV, unexpanded is to perform a pure comparison of optical performance between at 20° C. and 50° C. The individual optical elements are assumed to freely expand at the linear thermal expansion coefficients listed previously, and, with respect to the amounts of movement of the individual optical elements from the center of the zeroth surface S0, the distances from the zeroth surface S0 to the centers of the individual optical elements are assumed to freely expand at the linear thermal expansion coefficients. With respect to the glass plate GP and the refractive lens GL, which are refractive optical elements, their refractive indices are also assumed to vary at the refractive index variation coefficients listed previously. FIG. 23 shows the coordinates (y, z; mm) on the image formation surface S0 on the image forming device LV corresponding to the ideal projection positions of the individual spots. The values of the ideal projection positions on the image projection surface S10 on the screen SC are calculated by multiplying the values shown in FIG. 23 by the projection magnifications βy and βz, and the deviations from those ideal values correspond to what is generally called distortion in the field of optics.

EXAMPLES 5 to 11

Examples 5 to 11 presented below are numerical examples of oblique projection optical systems corresponding to the fifth to eleventh embodiments, respectively, described previously. Thus, the optical construction diagrams (FIGS. 24 to 29 and 38) showing the fifth to eleventh embodiments also show the optical arrangement, projection optical path, and other features of Examples 5 to 11, respectively. The construction data of each example shows the optical arrangement through the entire system starting with the image formation surface So on the reduction side (corresponding to the object surface in enlargement projection) to the image projection surface Si on the enlargement side (corresponding to the image surface in enlargement projection). The n-th surface counted from the reduction side is represented by Sn (n=1, 2, 3, . . . ). It should be noted that the surfaces S1 and S2 are the two surfaces of the cover glass CG that covers the image formation surface So to protect it, and thus do not constitute part of the projection optical system.

How each optical surface is arranged is represented by the coordinates (x, y, z) (mm), as measured in a global rectangular coordinate system (x, y, z), of the origin (0) and the coordinate axis vectors (VX, VY) of the local rectangular coordinate system (X, Y, Z) established with its origin (0) located at the vertex of the optical surface. Here, all the coordinate systems are defined as right-hand systems, and the global rectangular coordinate system (x, y, z) is an absolute coordinate system that coincides with the local rectangular coordinate system (X, Y, Z) established for the image formation surface So. Thus, the origin (o) of the global rectangular coordinate system (x, y, z) coincides with the origin (0) located at the center of the image formation surface So, the vector VX on the image formation surface So is parallel to a line normal to the image formation surface So, the vector VY is perpendicular to the vector VX and parallel to the shorter sides of the image on the image formation surface So. For an optical surface that forms part of a coaxial system with an optical surface represented by coordinate data (x, y, z) regarded as the foremost surface, its arrangement is represented by the axial distance T' (mm) in the X-direction relative to the immediately previous optical surface.

The surface shape of each optical element is represented by the curvature C0 (mm$^{-1}$), the radius of curvature r (mm), etc. of the optical surface(s) it has. For example, a surface Sn marked with an asterisk (*) is a rotation-symmetric aspherical surface, whose surface shape is defined by formula (AS2) below within the local rectangular coordinate system (X,Y,Z) having its origin (0) at the vertex of the surface. On the other hand, a surface Sn marked with a dollar sign ($) is a non-rotation-symmetric aspherical surface (a so-called free-form curved surface), whose surface shape is defined by formula (FS2) below within the local rectangular coordinate system (X, Y, Z) having its origin (0) at the vertex of the surface. Listed together with the construction data are rotation-symmetric aspherical surface data and non-rotation-symmetric aspherical surface data. It should be noted that any coefficient that is not expressly shown equals zero, and that, for all data, "E−n" stands for "×10$^{-n}$".

$$X = (C0 \cdot H^2)/(1 + \sqrt{1 - \varepsilon \cdot C0^2 \cdot H^2}) + \sum (A(i) \cdot H^i) \quad (AS2)$$

$$X = (C0 \cdot H^2)/(1 + \sqrt{1 - \varepsilon \cdot C0^2 \cdot H^2}) + \sum (G(j,k) \cdot Y^j \cdot Z^k) \quad (FS2)$$

wherein
X represents the displacement (with respect to the vertex) from the reference surface as measured in the X-direction at the height H;
H represents the height in a direction perpendicular to the X-axis (H=$\sqrt{Y^2+Z^2}$);
C0 represents the curvature at the vertex (a positive or negative sign added with respect to the X-axis, a positive sign added when the center of the curvature lies in the positive direction on the vector VX; C0=1/r);
$\varepsilon$ represents the quadric surface parameter;
A(i) represents the rotation-symmetric aspherical surface coefficient of order i; and G(j, k) represents the non-rotation-symmetric aspherical surface coefficient of order j with respect to Y and order k with respect to Z.

Also listed are the refractive index N for the d-line of the medium located on the entrance side of each optical surface, the refractive index N' for the d-line of the medium located on the exit side thereof (when the optical surface in question is a reflective surface, its refractive index takes a negative value), and the Abbe number (vd) of the optical material. For an aperture stop, imaginary aperture stop data (including the effective radius R thereof) are listed as with other optical surface data. The rays that pass through an optical system defined by the construction data are defined as rays that emanate from the image formation surface So and pass the edge of an imaginary circular aperture stop. In actual use, however, a real aperture stop is disposed near where the principal rays converge. Tables 5 and 6 show the values of the conditional formulae and the data related thereto as actually observed in each of Examples 5 to 11. It should be noted that the distance La appearing in conditional formula (4a), (4b), and (4c) corresponds to the distance along the reference ray from the image formation surface So to where the principal rays converge.

In Examples 5 to 11, the dimensions (mm) of the image on the image formation surface So are LY=±2.754 and LZ=±4.892. Here, the image on the image formation surface So has a rectangular shape, with LY representing the dimension of the image on the image formation surface So along the shorter sides thereof (that is, in the Y-direction) and LZ representing the dimension of the image on the image formation surface So along the longer sides thereof (that is, in the Z-direction). The magnification β and the f-numbers (FnoY and FnoZ) of each of Examples 5 to 11 are shown listed below. Here, FnoY represents the f-number in the vertical direction (Y-direction), and FnoZ represents the f-number in the horizontal direction (Z-direction).

Example 5: β=95.03, FnoY=2.83, FnoZ=2.81
Example 6: β=95.04, FnoY=2.83, FnoZ=2.81
Example 7: β=95.04, FnoY=2.83, FnoZ=2.81
Example 8: β=95.03, FnoY=2.83, FnoZ=2.81
Example 9: β=95.03, FnoY=2.83, FnoZ=2.81
Example 10: β=95.02, FnoY=2.83, FnoZ=2.81
Example 11: β=117.67, FnoY=2.83, FnoZ=2.81

FIGS. 30A to 30Y, 31A to 31Y, 32A to 32Y, 33A to 33Y, 34A to 34Y, 35A to 35Y, and 39A to 39Y are spot diagrams of Examples 5 to 11, respectively. Each spot diagram shows the imaging performance (in ±1 mm divisions) observed for 3 different wavelengths (460 nm, 546 nm, and 620 nm) at 25 evaluation points on the image projection surface Si. The coordinates (Y, Z) in the diagrams are local coordinates (Y, Z; mm; e–n=×$10^{-n}$) on the image projection surface Si corresponding to the projection positions of the spot barycenters of the individual evaluation points. Since Examples 5 to 11 are all constructed as optical systems plane-symmetric about the XY-plane, each spot diagram only shows the positive-Z-side half of the image projection surface Si, and the other half is omitted from illustration. The evaluation points are conjugate with an array of vertically five and horizontally five points that equally divide the positive-Z-side half of the image formation surface So. When multiplied with the magnification, the Y and Z values of the local coordinates of the points on the image formation surface So indicate the ideal imaging points on the spot diagrams, and the deviations from those calculated values indicate distortion. In each spot diagram, the starting point lies on the ±Y, +Z side of the image formation surface So. In Examples 5 to 9 and 11, since the image is inverted upside down by the flat-surface mirror MF disposed at the ceiling, the positive-Y and negative-Y sides are reversed; in Example 10, since the image is reversed from side to side by the flat-surface mirror MF disposed at the back, the positive-Z and negative-Z sides are reversed.

CONSTRUCTION DATA OF EXAMPLE 5

Surface So (Image Formation Surface)
Coordinates:
  O: 0.00000, 0.00000, 0.00000
  VX: 1.00000000, 0.00000000, 0.00000000
  VY: 0.00000000, 1.00000000, 0.00000000
N=1.00000
C0=0.00000000 (r=∞)
N'=1.00000
T'=0.47

Surface S1 (Entrance-Side Surface of Cover Glass CG)
N=1.00000
C0=0.00000000 (r=∞)
N'=1.51872, vd=64.20
T'=3

Surface S2 (Exit-Side Surface of Cover Glass CG)
N=1.51872, vd=64.20
C0=0.00000000 (r=∞)
N'=1.00000

Surface S3 (First Curved-Surface Mirror M1)
Coordinates:
  O: 84.77600, −8.80205, 0.00000
  VX: 0.99335574, 0.11508424, 0.00000000
  VY: −0.11508424, 0.99335574, 0.00000000
N=1.00000
C0=−0.01024430 (r=−97.6153)
N'=−1.00000

Surface S4* (Entrance-Side Surface of Lens L1)
Coordinates:
  O: 33.18400, −26.78580, 0.00000
  VX: −0.99802020, −0.06289414, 0.00000000
  VY: −0.06289414, 0.99802020, 0.00000000
N=1.00000
C0=0.00000000 (r=∞)

Aspherical Surface Data:
  ϵ=1100000
  A(4)=1.73282E−6
  A(6)=−2.51393E−8
  A(8)=5.8343E−10
  A(10)=−6.49544E−12
  A(12)=2.72743E−14
N'=1.52729, vd=56.38

Surface S5 (Exit-Side Surface of Lens L1)
Coordinates:
  O: 31.23500, −27.67100, 0.00000
  VX: −0.99802020, −0.06289414, 0.00000000
  VY: −0.06289414, 0.99802020, 0.00000000
N=1.52729, vd=56.38
C0=0.00000000 (r=∞)
N'=1.00000

Surface S6* (Second Curved-Surface Mirror M2)
Coordinates:
  O: 13.34700, −24.19590, 0.00000
  VX: −0.99395174, 0.10981775, 0.00000000
  VY: 0.10981775, 0.99395174, 0.00000000
N=1.00000
C0=0.00931427 (r=107.3621)

Aspherical Surface Data:
ϵ=6.42234
A(4)=1.4105E−6
A(6)=8.58819E−10
A(8)=−2.64074E−12
A(10)=5.41875E−15
A(12)=−4.40215E−18
N'=−1.00000

Surface S7$ (Entrance-Side Surface of Lens L2)
Coordinates:
O: 34.67500, −55.70520, 0.00000
VX: 0.01157085, −0.99993306, 0.00000000
VY: 0.99993306, 0.01157085, 0.00000000
N=1.00000
C0=0.00000000 (r=∞)

Aspherical Surface Data:
ϵ=1.00000
G(3, 0)=8.61966E−6
G(4, 0)=−1.32367E−6
G(5, 0)=1.81013E−9
G(6, 0)=−2.38497E−9
G(7, 0)=3.31534E−10
G(8, 0)=−3.36791E−12
G(9, 0)=−7.71912E−13
G(10, 0)=2.42779E−14
G(1, 2)=−6.6744E−5
G(2, 2)=−2.40316E−6
G(3, 2)=8.97504E−8
G(4, 2)=3.54681E−10
G(5, 2)=4.62364E−10
G(6, 2)=−1.29461E−11
G(7, 2)=−6.77249E−13
G(8, 2)=2.31117E−14
G(0, 4)=2.46946E−6
G(1, 4)=2.0643E−7
G(2, 4)=−6.56518E−10
G(3, 4)=−1.59192E−1
G(4, 4)=−1.66117E−1
G(5, 4)=−6.9256E−13
G(6, 4)=3.52199E−14
G(0, 6)=−3.00301E−9
G(1, 6)=−1.27708E−10
G(2, 6)=2.16243E−12
G(3, 6)=6.36425E−13
G(4, 6)=4.02125E−15
G(0, 8)=5.95575E−12
G(1, 8)=2.69834E−13
G(2, 8)=−1.86336E−14
G(0, 10)=−1.57267E−14
N'=1.52729, vd=56.38

Surface S8 (Exit-Side Surface of Lens L2)
Coordinates:
O: 39.23600, −57.65510, 0.00000
VX: 0.01157085, −0.99993306, 0.00000000
VY: 0.99993306, 0.01157085, 0.00000000
N=1.52729, vd=56.38
C0=0.00000000 (r=∞)
N'=1.00000

Surface S9$ (Third Curved-Surface Mirror M3)
Coordinates:
O: 69.48900, −95.92290, 0.00000
VX: 0.91941593, −0.39328660, 0.00000000
VY: 0.39328660, 0.91941593, 0.00000000
N=1.00000
C0=−0.00044085 (r=−2268.3247)

Aspherical Surface Data:
ϵ=1.00000
G(2, 0)=0.000280832
G(3, 0)=−1.18927E−5
G(4, 0)=−8.7313E−7
G(5, 0)=−8.41805E−9
G(6, 0)=7.25923E−12
G(7, 0)=9.49225E−12
G(8, 0)=1.04654E−13
G(9, 0)=−2.19175E−14
G(10, 0)=7.21665E−16
G(0, 2)=−0.000513986
G(1, 2)=−8.55552E−5
G(2, 2)=−1.12351E−6
G(3, 2)=2.49379E−8
G(4, 2)=8.10459E−10
G(5, 2)=2.58668E−11
G(6, 2)=8.12093E−13
G(7, 2)=2.11287E−15
G(8, 2)=−1.19879E−15
G(0, 4)=1.17194E−6
G(1, 4)=5.41384E−8
G(2, 4)=3.65203E−10
G(3, 4)=−1.88985E−11
G(4, 4)=−1.18863E−12
G(5, 4)=−3.78949E−14
G(6, 4)=7.8927E−17
G(0, 6)=−9.29742E−11
G(1, 6)=3.36094E−13
G(2, 6)=1.0404E−12
G(3, 6)=3.77869E−14
G(4, 6)=2.03532E−15
G(0, 8)=−3.88723E−13
G(1, 8)=−1.38874E−15
G(2, 8)=−1.35813E−15
G(0, 10)=5.45906E−16
N'=−1.00000

Surface S10$ (Fourth Curved-Surface Mirror M4)
Coordinates:
O: 23.67600, −62.46640, 0.00000
VX: −0.99802624, 0.06279831, 0.00000000
VY: 0.06279831, 0.99802624, 0.00000000
N=1.00000
C0=0.05625150 (r=17.7773)

Aspherical Surface Data:
ϵ=−1.54968
G(2, 0)=−0.0018995
G(3, 0)=−1.99289E−5
G(4, 0)=−4.72141E−7
G(5, 0)=−5.6067E−9
G(6, 0)=−2.08536E−11
G(7, 0)=1.58062E−13
G(8, 0)=2.17055E−15
G(9, 0)=6.89436E−18
G(10, 0)=−2.2838E−20
G(0, 2)=−0.00418619
G(1, 2)=−9.36187E−5
G(2, 2)=−2.59756E−6
G(3, 2)=−4.09752E−8
G(4, 2)=−4.09984E−10
G(5, 2)=−3.01393E−12
G(6, 2)=−1.3615E−14
G(7, 2)=−3.03519E−17
G(8, 2)=−9.24981E−20
G(0, 4)=−2.04797E−7
G(1, 4)=−3.13937E−9

G(2, 4)=1.415E−10
G(3, 4)=2.53309E−12
G(4, 4)=1.03641E−14
G(5, 4)=6.70735E−17
G(6, 4)=5.8545E−19
G(0, 6)=1.66422E−10
G(1, 6)=4.93631E−12
G(2, 6)=2.84416E−14
G(3, 6)=−1.4395E−16
G(4, 6)=−2.85288E−18
G(0, 8)=−6.936E−14
G(1, 8)=−1.98833E−15
G(2, 8)=−4.60481E−18
G(0, 10)=−9.75378E−18
N'=−1.00000

Surface S11 (Flat-Surface Mirror MF)
Coordinates:
O: 400.00000, −441.69700, 0.00000
VX: 0.10902324, −0.99403920, 0.00000000
VY: 0.99403920, 0.10902324, 0.00000000
N=1.00000
C0=0.00000000 (r=∞)
N'=−1.00000

Surface Si (Image Projection Surface)
Coordinates:
O: 204.75705, −187.50166, 0.00000
VX: 0.93901635, 0.34387248, 0.00000000
VY: −0.34387248, 0.93901635, 0.00000000

Imaginary Aperture Stop Data
Coordinates:
O: 100400.00000, −10552.50000, 0.00000
VX: 1.00000000, 0.00000000, 0.00000000
VY: 0.00000000, 1.00000000, 0.00000000
N=1.00000
C0=0.00000000 (r=∞), R=18221.4
N'=1.00000

CONSTRUCTION DATA OF EXAMPLE 6

Surface So (Image Formation Surface)
Coordinates:
O: 0.00000, 0.00000, 0.00000
VX: 1.00000000, 0.00000000, 0.00000000
VY: 0.00000000, 1.00000000, 0.00000000
N=1.00000
C0=0.00000000 (r=∞)
N'=1.00000
T'=0.47

Surface S1 (Entrance-Side Surface of Cover Glass CG)
N=1.00000
C0=0.00000000 (r=∞)
N'=1.51872, vd=64.20
T'=3

Surface S2 (Exit-Side Surface of Cover Glass CG)
N=1.51872, vd=64.20
C0=0.00000000 (r=∞)
N'=1.00000

Surface S3 (First Curved-Surface Mirror M1)
Coordinates:
O: 90.77400, −9.43239, 0.00000
VX: 0.99470566, 0.10276503, 0.00000000
VY: −0.10276503, 0.99470566, 0.00000000
N=1.00000
C0=−0.00947483 (r=−105.5428)
N'=−1.00000

Surface S4$ (Entrance-Side Surface of Lens L1)
Coordinates:
O: 34.93000, −27.35840, 0.00000
VX: −0.99926081, 0.03844256, 0.00000000
VY: 0.03844256, 0.99926081, 0.00000000
N=1.00000
C0=0.00000000 (r=∞)
Aspherical Surface Data:
ε=1.00000
G(3, 0)=4.79337E−5
G(4, 0)=1.66079E−7
G(5, 0)=−1.96836E−8
G(6, 0)=−2.68026E−9
G(7, 0)=−7.37523E−11
G(8, 0)=2.04524E−11
G(1, 2)=6.03078E−5
G(2, 2)=2.00845E−7
G(3, 2)=−6.21625E−8
G(4, 2)=1.86635E−9
G(5, 2)=−1.87519E−11
G(6, 2)=−2.05001E−11
G(0, 4)=2.09762E−7
G(1, 4)=−1.08952E−8
G(2, 4)=−7.45365E−9
G(3, 4)=1.81784E−9
G(4, 4)=−4.68858E−10
G(5, 4)=−1.38943E−1
G(6, 4)=3.44102E−12
G(0, 6)=−3.40962E−9
G(1, 6)=−1.12276E−10
G(2, 6)=6.002311E−11
G(3, 6)=−4.60791E−11
G(4, 6)=1.00818E−11
G(0, 8)=2.01876E−11
N'=1.52729, vd=56.38

Surface S5 (Exit-Side Surface of Lens L1)
Coordinates:
O: 32.92900, −27.35840, 0.00000
VX: −0.99926081, 0.03844256, 0.00000000
VY: 0.03844256, 0.99926081, 0.00000000
N=1.52729, vd=56.38
C0=0.00000000 (r=∞)
N'=1.00000

Surface S6 (Second Curved-Surface Mirror M2)
Coordinates:
O: 12.26300, −34.36970, 0.00000
VX: −0.96790260, 0.25132559, 0.00000000
VY: 0.25132559, 0.96790260, 0.00000000
N=1.00000
C0=0.00985145 (r=101.5079)
N'=−1.00000

Surface S7$ (Entrance-Side Surface of Lens L2)
Coordinates:
O: 31.18600, −54.59710, 0.00000
VX: 0.39219801, −0.91988082, 0.00000000
VY: 0.91988082, 0.39219801, 0.00000000
N=1.00000
C0=0.00000000 (r=∞)
Aspherical Surface Data:
ε=1.00000
G(3, 0)=5.73937E−5
G(4, 0)=−5.45469E−6

G(5, 0)=2.95092E−7
G(6, 0)=−2.06184E−8
G(7, 0)=−1.16518E−9
G(8, 0)=1.35153E−10
G(9, 0)=6.4726E−12
G(10, 0)=−5.025E−13
G(1, 2)=−0.000126608
G(2, 2)=−6.23703E−6
G(3, 2)=4.57652E−7
G(4, 2)=−2.00146E−8
G(5, 2)=5.45813E−10
G(6, 2)=7.61716E−11
G(7, 2)=−5.57207E−12
G(8, 2)=7.34366E−14
G(0, 4)=2.11766E−7
G(1, 4)=2.85424E−7
G(2, 4)=−9.85049E−9
G(3, 4)=−1.94353E−9
G(4, 4)=1.5748E−10
G(5, 4)=6.50179E−12
G(6, 4)=−4.86407E−13
G(0, 6)=−6.00982E−9
G(1, 6)=−3.09522E−10
G(2, 6)=9.47728E−11
G(3, 6)=8.74303E−12
G(4, 6)=−1.09605E−12
G(0, 8)=2.702111E−11
G(1, 8)=2.24846E−13
G(2, 8)=−2.41804E−13
G(0, 10)=−3.61895E−14
N'=1.52729, vd=56.38

Surface S8 (Exit-Side Surface of Lens L2)
Coordinates:
 O: 36.28600, −54.59710, 0.00000
 VX: 0.39219801, −0.91988082, 0.00000000
 VY: 0.91988082, 0.39219801, 0.00000000
N=1.52729, vd=56.38
C0=0.00000000 (r=∞)
N'=1.00000

Surface S9$ (Third Curved-Surface Mirror M3)
Coordinates:
 O: 63.70100, −115.89200, 0.00000
 VX: 0.94854728, −0.31663552, 0.00000000
 VY: 0.31663552, 0.94854728, 0.00000000
N=1.00000
C0=0.00000000 (r=∞)

Aspherical Surface Data:
 ε=1.00000
 G(2, 0)=−5.15803E−5
 G(3, 0)=−1.13296E−6
 G(4, 0)=8.52923E−7
 G(5, 0)=−6.27157E−8
 G(6, 0)=1.41661E−9
 G(7, 0)=−3.56406E−11
 G(8, 0)=1.50969E−12
 G(9, 0)=−3.50278E−14
 G(10, 0)=2.91876E−16
 G(0, 2)=−0.000402355
 G(1, 2)=−5.60524E−5
 G(2, 2)=−6.69469E−7
 G(3, 2)=−8.57874E−8
 G(4, 2)=6.6728E−9
 G(5, 2)=−1.56226E−10
 G(6, 2)=3.38308E−13
 G(7, 2)=4.11594E−14
 G(8, 2)=−4.65932E−16
 G(0, 4)=4.22597E−7
 G(1, 4)=−8.6363E−9
 G(2, 4)=4.70355E−9
 G(3, 4)=−2.75078E−10
 G(4, 4)=7.27498E−12
 G(5, 4)=−9.54345E−14
 G(6, 4)=4.55717E−16
 G(0, 6)=3.43582E−10
 G(1, 6)=−2.026711E−11
 G(2, 6)=−1.86668E−12
 G(3, 6)=9.87737E−14
 G(4, 6)=−9.24113E−16
 G(0, 8)=−1.12593E−12
 G(1, 8)=8.93545E−14
 G(2, 8)=−1.9713E−15
 G(0, 10)=5.99231E−16
N'=−1.00000

Surface S10$ (Fourth Curved-Surface Mirror M4)
Coordinates:
 O: −1.39500, −84.28560, 0.00000
 VX: −0.96052569, −0.27819129, 0.00000000
 VY: −0.27819129, 0.96052569, 0.00000000
N=1.00000
C0=0.05432750 (r=18.4069)

Aspherical Surface Data:
 ε=−1.36189
 G(2, 0)=−0.000934535
 G(3, 0)=−3.48304E−5
 G(4, 0)=−7.40846E−7
 G(5, 0)=−1.69932E−9
 G(6, 0)=−1.17443E−11
 G(7, 0)=−4.47739E−13
 G(8, 0)=1.56421E−14
 G(9, 0)=−1.12835E−16
 G(10, 0)=−4.88174E−18
 G(0, 2)=−0.00317468
 G(1, 2)=−0.000120379
 G(2, 2)=−4.32862E−6
 G(3, 2)=−4.59941E−8
 G(4, 2)=−7.39556E−11
 G(5, 2)=−5.65321E−12
 G(6, 2)=−9.03851E−14
 G(7, 2)=1.47842E−15
 G(8, 2)=2.56086E−17
 G(0, 4)=−1.71503E−6
 G(1, 4)=−2.91565E−8
 G(2, 4)=5.32461E−10
 G(3, 4)=2.21225E−12
 G(4, 4)=3.78441E−14
 G(5, 4)=1.18072E−15
 G(6, 4)=−3.85671E−17
 G(0, 6)=3.79575E−9
 G(1, 6)=9.11696E−11
 G(2, 6)=−6.67831E−13
 G(3, 6)=−1.00298E−15
 G(4, 6)=3.74512E−16
 G(0, 8)=−4.48844E−12
 G(1, 8)=−1.92448E−13

G(2, 8)=−2.09534E−15
G(0, 10)=6.35726E−17
N'=−1.00000

Surface S11 (Flat-Surface Mirror MF)
Coordinates:
    O: 400.00000, −354.01600, 0.00000
    VX: 0.37721984, −0.92612375, 0.00000000
    VY: 0.92612375, 0.37721984, 0.00000000
N=1.00000
C0=0.00000000 (r=∞)
N'=−1.00000

Surface Si (Image Projection Surface)
Coordinates:
    O: 249.18738, −124.11922, 0.00000
    VX: 0.81007868, 0.58632118, 0.00000000
    VY: −0.58632118, 0.81007868, 0.00000000

Imaginary Aperture Stop Data
Coordinates:
    O: 100400.00000, −10552.50000, 0.00000
    VX: 1.00000000, 0.00000000, 0.00000000
    VY: 0.00000000, 1.00000000, 0.00000000
N=1.00000
C0=0.00000000 (r=∞), R=18221.4
N'=1.00000

CONSTRUCTION DATA OF EXAMPLE 7

Surface So (Image Formation Surface)
Coordinates:
    O: 0.00000, 0.00000, 0.00000
    VX: 1.00000000, 0.00000000, 0.00000000
    VY: 0.00000000, 1.00000000, 0.00000000
N=1.00000
C0=0.00000000 (r=∞)
N'=1.00000
T'=0.47

Surface S1 (Entrance-Side Surface of Cover Glass CG)
N=1.00000
C0=0.00000000 (r=∞)
N'=1.51872, vd=64.20
T'=3

Surface S2 (Exit-Side Surface of Cover Glass CG)
N=1.51872, vd=64.20
C0=0.00000000 (r=∞)
N'=1.00000

Surface S3 (First Curved-Surface Mirror M1)
Coordinates:
    O: 113.07600, −11.77640, 0.00000
    VX: 0.99922072, 0.03947082, 0.00000000
    VY: −0.03947082, 0.99922072, 0.00000000
N=1.00000
C0=−0.00674329 (r=−148.2956)
N'=−1.00000

Surface S4 (Second Curved-Surface Mirror M2)
Coordinates:
    O: 13.15900, −30.33870, 0.00000
    VX: −0.96794356, 0.25116780, 0.00000000
    VY: 0.25116780, 0.96794356, 0.00000000
N=1.00000
C0=0.00206292 (r=484.7498)
N'=−1.00000

Surface S5$ (Entrance-Side Surface of Lens L1)
Coordinates:
    O: 51.25400, −61.87380, 0.00000
    VX: 0.91188021, −0.41045643, 0.00000000
    VY: 0.41045643, 0.91188021, 0.00000000
N=1.00000
C0=0.00000000 (r=∞)

Aspherical Surface Data:
    ϵ=1.00000
    G(3, 0)=0.000114197
    G(4, 0)=−1.24701E−6
    G(5, 0)=3.74209E−8
    G(6, 0)=−1.68367E−9
    G(7, 0)=−3.84701E−10
    G(8, 0)=2.97769E−11
    G(9, 0)=1.00513E−12
    G(10, 0)=−8.67331E−14
    G(1, 2)=0.0002736
    G(2, 2)=−1.22047E−6
    G(3, 2)=−6.33043E−8
    G(4, 2)=4.56774E−9
    G(5, 2)=−8.25473E−10
    G(6, 2)=3.80255E−12
    G(7, 2)=6.92421E−12
    G(8, 2)=−3.88592E−13
    G(0, 4)=−6.0736E−7
    G(1, 4)=−1.1142E−7
    G(2, 4)=7.26114E−9
    G(3, 4)=8.2169E−10
    G(4, 4)=−1.10821E−10
    G(5, 4)=−3.6659E−12
    G(6, 4)=5.52235E−13
    G(0, 6)=−3.01045E−10
    G(1, 6)=5.7005E−11
    G(2, 6)=−5.90839E−11
    G(3, 6)=−4.72053E−12
    G(4, 6)=6.74149E−13
    G(0, 8)=5.48356E−12
    G(1, 8)=−8.68524E−14
    G(2, 8)=1.43298E−13
    G(0, 10)=−2.44685E−14
N'=1.52729, vd=56.38

Surface S6 (Exit-Side Surface of Lens L1)
Coordinates:
    O: 53.44800, −61.87380, 0.00000
    VX: 0.91188021, −0.41045643, 0.00000000
    VY: 0.41045643, 0.91188021, 0.00000000
N=1.52729, vd=56.38
C0=0.00000000 (r=∞)
N'=1.00000

Surface S7$ (Entrance-Side Surface of Lens L2)
Coordinates:
    O: 65.22700, −73.19270, 0.00000
    VX: 0.91488721, −0.40370954, 0.00000000
    VY: 0.40370954, 0.91488721, 0.00000000
N=1.00000
C0=0.00000000 (r=∞)

Aspherical Surface Data:
    ϵ=1.00000
    G(3, 0)=−4.82239E−5
    G(4, 0)=−4.89547E−7
    G(5, 0)=2.54879E−8
    G(6, 0)=6.24823E−10
    G(7, 0)=2.11456E−10
    G(8, 0)=−2.20978E−11

G(9, 0)=−2.95641E−13
G(10, 0)=4.80958E−14
G(1, 2)=−0.000305772
G(2, 2)=−2.17884E−6
G(3, 2)=1.96709E−7
G(4, 2)=−2.75062E−9
G(5, 2)=6.16911−10
G(6, 2)=−8.46916E−12
G(7, 2)=−4.24345E−12
G(8, 2)=3.03939E−13
G(0, 4)=3.36416E−7
G(1, 4)=2.09041E−7
G(2, 4)=−5.85361E−9
G(3, 4)=−5.29989E−10
G(4, 4)=1.0493E−10
G(5, 4)=1.11505E−12
G(6, 4)=−4.86259E−13
G(0, 6)=−5.01369E−10
G(1, 6)=−9.95524E−12
G(2, 6)=6.29716E−11
G(3, 6)=2.10439E−12
G(4, 6)=−4.52807E−13
G(0, 8)=−1.45202E−12
G(1, 8)=2.39055E−14
G(2, 8)=−1.18323E−13
G(0, 10)=1.6537E−14
N'=1.52729, vd=56.38

Surface S8 (Exit-Side Surface of Lens L2)
Coordinates:
 O: 67.41300, −73.19270, 0.00000
 VX: 0.91488721, −0.40370954, 0.00000000
 VY: 0.40370954, 0.91488721, 0.00000000
N=1.52729, vd=56.38
C0=0.00000000 (r=∞)
N'=1.00000

Surface S9$ (Third Curved-Surface Mirror M3)
Coordinates:
 O: 126.48200, −149.02900, 0.00000
 VX: 0.98714743, −0.15981226, 0.00000000
 VY: 0.15981226, 0.98714743, 0.00000000
N=1.00000
C0=0.00000000 (r=∞)

Aspherical Surface Data:
 ε=1.00000
 G(2, 0)=0.000872262
 G(3, 0)=7.20708E−5
 G(4, 0)=3.87737E−7
 G(5, 0)=−7.31262E−8
 G(6, 0)=1.40453E−9
 G(7, 0)=−3.44176E−11
 G(8, 0)=1.54525E−12
 G(9, 0)=−3.41459E−14
 G(10, 0)=2.70166E−16
 G(0, 2)=0.00336591
 G(1, 2)=−5.38495E−5
 G(2, 2)=−3.20324E−6
 G(3, 2)=−1.00318E−7
 G(4, 2)=7.894E−9
 G(5, 2)=−1.30413E−10
 G(6, 2)=−2.71244E−13
 G(7, 2)=3.57266E−14
 G(8, 2)=−2.8839E−16
 G(0, 4)=2.14833E−7
 G(1, 4)=4.47333E−8
 G(2, 4)=5.19129E−9
 G(3, 4)=−2.77129E−10
 G(4, 4)=5.98438E−12
 G(5, 4)=−5.94433E−14
 G(6, 4)=−1.85989E−16
 G(0, 6)=1.23462E−9
 G(1, 6)=−9.96987E−11
 G(2, 6)=2.93684E−12
 G(3, 6)=−1.3074E−13
 G(4, 6)=3.70177E−15
 G(0, 8)=−4.09372E−12
 G(1, 8)=2.17315E−13
 G(2, 8)=−4.14025E−15
 G(0, 10)=3.84291E−15
N'=−1.00000

Surface S10$ (Fourth Curved-Surface Mirror M4)
Coordinates:
 O: 77.22100, −109.36100, 0.00000
 VX: −0.99904553, −0.04368097, 0.00000000
 VY: −0.04368097, 0.99904553, 0.00000000
N=1.00000
C0=0.04637070 (r=21.5653)

Aspherical Surface Data:
 G(2, 0)=−0.00514755
 G(3, 0)=−0.000101701
 G(4, 0)=−1.01339E−6
 G(5, 0)=3.14147E−9
 G(6, 0)=2.06419E−11
 G(7, 0)=−1.54956E−12
 G(8, 0)=9.7579E−15
 G(9, 0)=4.60062E−16
 G(10, 0)=2.43486E−18
 G(0, 2)=−0.00100032
 G(1, 2)=−0.000100053
 G(2, 2)=−5.13582E−6
 G(3, 2)=−6.59522E−8
 G(4, 2)=−1.30555E−10
 G(5, 2)=−4.52205E−12
 G(6, 2)=−8.06881E−14
 G(7, 2)=1.4402E−15
 G(8, 2)=2.07926E−17
 G(0, 4)=−2.09192E−6
 G(1, 4)=−2.23099E−8
 G(2, 4)=2.75285E−9
 G(3, 4)=5.96202E−11
 G(4, 4)=−3.41509E−13
 G(5, 4)=−1.92883E−14
 G(6, 4)=−1.44741E−16
 G(0, 6)=1.76453E−9
 G(1, 6)=8.187E−11
 G(2, 6)=1.46474E−12
 G(3, 6)=1.81244E−14
 G(4, 6)=1.29768E−16
 G(0, 8)=−8.10969E−13
 G(1, 8)=−3.17658E−14
 G(2, 8)=−2.85186E−16
 G(0, 10)=−1.92403E−17
N'=−1.00000

Surface S11 (Flat-Surface Mirror MF)
Coordinates:
 O: 400.00000, −363.80500, 0.00000
 VX: 0.34096872, −0.94007464, 0.00000000
 VY: 0.94007464, 0.34096872, 0.00000000
N=1.00000
C0=0.00000000 (r=∞)
N'=−1.00000

Surface Si (Image Projection Surface)
Coordinates:
O: 258.99815, −126.02650, 0.00000
VX: 0.83889067, 0.54429995, 0.00000000
VY: −0.54429995, 0.83889067, 0.00000000

Imaginary Aperture Stop Data
Coordinates:
O: 100400.00000, −10552.50000, 0.00000
VX: 1.00000000, 0.00000000, 0.00000000
VY: 0.00000000, 1.00000000, 0.00000000
N=1.00000
C0=0.00000000 (r=∞), R=18221.4
N'=1.00000

CONSTRUCTION DATA OF EXAMPLE 8

Surface So (Image Formation Surface)
Coordinates:
O: 0.00000, 0.00000, 0.00000
VX: 1.00000000, 0.00000000, 0.00000000
VY: 0.00000000, 1.00000000, 0.00000000
N=1.00000
C0=0.00000000 (r=∞)
N'=1.00000
T'=0.47

Surface S1 (Entrance-Side Surface of Cover Glass CG)
N=1.00000
C0=0.00000000 (r=∞)
N'=1.51872, vd=64.20
T'=3

Surface S2 (Exit-Side Surface of Cover Glass CG)
N=1.51872, vd=64.20
C0=0.00000000 (r=∞)
N'=1.00000

Surface S3 (First Curved-Surface Mirror M1)
Coordinates:
O: 71.00732, −7.65741, 0.00000
VX: 0.99699145, 0.07751161, 0.00000000
VY: −0.07751161, 0.99699145, 0.00000000
N=1.00000
C0=−0.01108338 (r=−90.2252)
N'=−1.00000

Surface S4 (Second Curved-Surface Mirror M2)
Coordinates:
O: 18.95503, −22.39441, 0.00000
VX: −0.92576750, 0.37809329, 0.00000000
VY: 0.37809329, 0.92576750, 0.00000000
N=1.00000
C0=0.00212283 (r=471.0689)
N'=−1.00000

Surface S5$ (Entrance-Side Surface of Lens L1)
Coordinates:
O: 32.97341, −40.82300, 0.00000
VX: 0.75740764, −0.65294232, 0.00000000
VY: 0.65294232, 0.75740764, 0.00000000
N=1.00000
C0=0.00000000 (r=∞)
Aspherical Surface Data:
ε=1.00000
G(1, 0)=0.0100577718
G(2, 0)=0.00139910092
G(3, 0)=−9.06457401E−5
G(4, 0)=2.28707998E−5
G(5, 0)=−9.39310544E−7
G(6, 0)=2.41861580E−8
G(7, 0)=9.16106307E−10
G(8, 0)=−1.82542777E−11
G(9, 0)=−8.30494552E−12
G(10, 0)=−5.95119738E−13
G(0, 2)=0.00271945898
G(1, 2)=0.00150978878
G(2, 2)=2.19403095E−5
G(3, 2)=−5.68346152E−6
G(4, 2)=1.57344375E−7
G(5, 2)=2.44319490E−9
G(6, 2)=−7.94275803E−11
G(7, 2)=6.53926004E−12
G(8, 2)=−2.68441366E−13
G(0, 4)=−7.87874988E−6
G(1, 4)=−3.97683655E−6
G(2, 4)=1.49214267E−7
G(3, 4)=4.36088480E−9
G(4, 4)=−3.22491761E−10
G(5, 4)=−1.69947160E−12
G(6, 4)=−9.29999105E−14
G(0, 6)=2.45107229E−8
G(1, 6)=2.14023344E−9
G(2, 6)=−1.03486338E−11
G(3, 6)=−1.37286624E−11
G(4, 6)=−1.19373582E−12
G(0, 8)=−1.76768030E−11
G(1, 8)=−1.05560579E−11
G(2, 8)=−1.81191389E−12
G(0, 10)=3.43787692E−14
N'=1.52729, vd=56.38

Surface S6$ (Exit-Side Surface of Lens L1)
Coordinates:
O: 37.53799, −41.61062, 0.00000
VX: 0.75740764, −0.65294232, 0.00000000
VY: 0.65294232, 0.75740764, 0.00000000
N=1.52729, vd=56.38
C0=0.00000000 (r=∞)
Aspherical Surface Data:
ε=1.00000
G(2, 0)=−0.00153100721
G(3, 0)=5.98626993E−6
G(4, 0)=1.61386599E−5
G(5, 0)=−7.14550554E−7
G(6, 0)=3.48908548E−8
G(0, 2)=0.00745727210
G(1, 2)=0.00159914734
G(2, 2)=−2.31181000E−5
G(3, 2)=−4.52346475E−6
G(4, 2)=1.73803253E−7
G(0, 4)=−2.14422100E−5
G(1, 4)=−3.88410353E−6
G(2, 4)=9.53281392E−8
G(0, 6)=1.83495540E−8
N'=1.00000

Surface S7$ (Third Curved-Surface Mirror M3)
Coordinates:
O: 61.65399, −67.54286, 0.00000
VX: 0.73874916, −0.67398047, 0.00000000
VY: 0.67398047, 0.73874916, 0.00000000
N=1.00000
C0=0.00261459 (r=382.4695)

Aspherical Surface Data:
ϵ=0.937079340
G(2, 0)=0.00206350053
G(3, 0)=−7.82554975E−5
G(4, 0)=1.00811694E−6
G(5, 0)=−1.83328813E−9
G(6, 0)=−5.20363224E−10
G(7, 0)=8.12522152E−11
G(8, 0)=−4.67850933E−12
G(9, 0)=−2.98048933E−13
G(10, 0)=−3.71806758E−15
G(0, 2)=0.000409668464
G(1, 2)=6.75737399E−5
G(2, 2)=2.74470472E−5
G(3, 2)=6.85306319E−7
G(4, 2)=1.66222167E−8
G(5, 2)=7.57237767E−10
G(6, 2)=−3.24202574E−11
G(7, 2)=−2.35360103E−12
G(8, 2)=−3.37472250E−14
G(0, 4)=8.22136263E−6
G(1, 4)=1.49151597E−7
G(2, 4)=4.09938867E−8
G(3, 4)=4.68068345E−9
G(4, 4)=1.78603064E−10
G(5, 4)=4.12554515E−12
G(6, 4)=5.44945607E−14
G(0, 6)=3.28606994E−8
G(1, 6)=5.20899027E−9
G(2, 6)=3.07619742E−10
G(3, 6)=1.075473811E−11
G(4, 6)=2.10434714E−13
G(0, 8)=−6.40125927E−11
G(1, 8)=−8.32728638E−12
G(2, 8)=−2.65096517E−13
G(0, 10)=3.87702065E−14
N'=−1.00000

Surface S8$ (Fourth Curved-Surface Mirror M4)
Coordinates:
O: 24.03468, −43.79535, 0.00000
VX: −0.95672122, 0.29100602, 0.00000000
VY: 0.29100602, 0.95672122, 0.00000000
N=1.00000
C0=0.07127908 (r=14.0294)

Aspherical Surface Data:
ϵ=−0.705145844
G(2, 0)=−0.0155388033
G(3, 0)=−0.000221939515
G(4, 0)=−1.84532487E−6
G(5, 0)=3.24226709E−9
G(6, 0)=1.33274680E−10
G(7, 0)=−1.08208954E−12
G(8, 0)=−1.92005530E−14
G(9, 0)=7.44278784E−17
G(10, 0)=1.25307151E−18
G(0, 2)=−0.0164378355
G(1, 2)=−0.000393394180
G(2, 2)=−7.94003282E−6
G(3, 2)=−7.42218351E−8
G(4, 2)=3.44383238E−10
G(5, 2)=5.05104575E−12
G(6, 2)=−1.83446687E−13
G(7, 2)=−3.01640382E−15
G(8, 2)=−1.22987466E−17
G(0, 4)=9.83130260E−7
G(1, 4)=2.18412129E−8
G(2, 4)=1.30192993E−9
G(3, 4)=2.66788212E−11
G(4, 4)=−1.99116200E−13
G(5, 4)=−1.00235280E−14
G(6, 4)=−7.21176301E−17
G(0, 6)=1.58954600E−9
G(1, 6)=1.46771101E−10
G(2, 6)=4.40398590E−12
G(3, 6)=5.85229803E−14
G(4, 6)=2.97903698E−16
G(0, 8)=−1.95625493E−13
G(1, 8)=−1.00598483E−14
G(2, 8)=−1.02890189E−16
G(0, 10)=−4.09691066E−18
N'=−1.00000

Surface S9 (Flat-Surface Mirror MF)
Coordinates:
O: 400.00000, −493.60714, 0.00000
VX: −0.04922367, −0.99878778, 0.00000000
VY: −0.99878778, 0.04922367, 0.00000000
N=1.00000
C0=0.00000000 (r=∞)
N'=−1.00000

Surface Si (Image Projection Surface)
Coordinates:
O: 166.62163, −212.70667, 0.00000
VX: 0.97459287, 0.22398380, 0.00000000
VY: −0.22398380, 0.97459287, 0.00000000

Imaginary Aperture Stop Data
Coordinates:
O: 100400.00000, −10552.50000, 0.00000
VX: 1.00000000, 0.00000000, 0.00000000
VY: 0.00000000, 1.00000000, 0.00000000
N=1.00000
C0=0.00000000 (r=∞), R=18221.4
N'=1.00000

CONSTRUCTION DATA OF EXAMPLE 9

Surface So (Image Formation Surface)
Coordinates:
O: 0.00000, 0.00000, 0.00000
VX: 1.00000000, 0.00000000, 0.00000000
VY: 0.00000000, 1.00000000, 0.00000000
N=1.00000
C0=0.00000000 (r=∞)
N'=1.00000
T'=0.47

Surface S1 (Entrance-Side Surface of Cover Glass CG)
N=1.00000
C0=0.00000000 (r=∞)
N'=1.51872, vd=64.20
T'=3

Surface S2 (Exit-Side Surface of Cover Glass CG)
N=1.51872, vd=64.20
C0=0.00000000 (r=∞)
N'=1.00000

Surface S3$ (Entrance-Side Surface of Lens L1)
Coordinates:
O: 20.00000, −1.31837, 0.00000
VX: 0.99899454, −0.04483192, 0.00000000
VY: 0.04483192, 0.99899454, 0.00000000
N=1.00000
C0=0.00000000 (r=∞)

Aspherical Surface Data:
 ε=1.00000000
 G(2, 0)=1.79159514E−5
 G(3, 0)=−0.000287877429
 G(4, 0)=4.92552574E−6
 G(5, 0)=1.09935845E−6
 G(6, 0)=7.15877008E−8
 G(7, 0)=−1.57073057E−8
 G(8, 0)=−1.92108065E−9
 G(9, 0)=1.17281673E−10
 G(10, 0)=1.51478742E−11
 G(0, 2)=0.000908053438
 G(1, 2)=−0.000174143474
 G(2, 2)=5.88030150E−6
 G(3, 2)=9.92783275E−7
 G(4, 2)=−9.30451112E−9
 G(5, 2)=−4.98543520E−9
 G(6, 2)=−4.12272060E−10
 G(7, 2)=4.43649742E−11
 G(8, 2)=4.13497218E−12
 G(0, 4)=−7.87562372E−7
 G(1, 4)=8.18359773E−7
 G(2, 4)=7.68935038E−8
 G(3, 4)=−2.67636522E−9
 G(4, 4)=−3.34258701E−10
 G(5, 4)=−3.63256950E−11
 G(6, 4)=1.32262748E−12
 G(0, 6)=9.66974935E−9
 G(1, 6)=−7.10625930E−9
 G(2, 6)=−1.31689470E−9
 G(3, 6)=−1.58414704E−1
 G(4, 6)=−2.44976357E−12
 G(0, 8)=−9.39903109E−1
 G(1, 8)=3.16239598E−1
 G(2, 8)=5.48821504E−12
 G(0, 10)=2.78352425E−13
N'=1.52729, vd=56.38

Surface S4 (Exit-Side Surface of Lens L1)
Coordinates:
 O: 22.28159, −6.23973, 0.00000
 VX: 0.99899454, −0.04483192, 0.00000000
 VY: 0.04483192, 0.99899454, 0.00000000
N=1.52729, vd=56.38
C0=0.00000000 (r=∞)
N'=1.00000

Surface S5 (First Curved-Surface Mirror M1)
Coordinates:
 O: 88.06662, −9.08073, 0.00000
 VX: 0.99588376, 0.09063960, 0.00000000
 VY: −0.09063960, 0.99588376, 0.00000000
N=1.00000
C0=−0.00924700 (r=−108.1431)
N'=−1.00000

Surface S6$ (Entrance-Side Surface of Lens L2)
Coordinates:
 O: 31.08722, −24.28952, 0.00000
 VX: −0.99386670, −0.11058471, 0.00000000
 VY: −0.11058471, 0.99386670, 0.00000000
N=1.00000
C0=0.00000000 (r=∞)

Aspherical Surface Data:
 ε=1.00000000
 G(2, 0)=0.000580901839
 G(3, 0)=7.25404078E−5
 G(4, 0)=3.41316892E−7
 G(5, 0)=4.56627542E−9
 G(6, 0)=−2.41336512E−8
 G(7, 0)=2.94083353E−10
 G(8, 0)=2.50880553E−10
 G(9, 0)=−2.46061591E−12
 G(10, 0)=−9.26598606E−13
 G(0, 2)=0.000597757534
 G(1, 2)=4.85768027E−5
 G(2, 2)=−1.37913590E−6
 G(3, 2)=2.57845188E−7
 G(4, 2)=3.26300907E−8
 G(5, 2)=−5.48104327E−9
 G(6, 2)=−5.40495256E−10
 G(7, 2)=3.23176155E−1
 G(8, 2)=2.81382402E−12
 G(0, 4)=−8.79826924E−8
 G(1, 4)=1.22848767E−7
 G(2, 4)=2.31039983E−8
 G(3, 4)=−8.71377457E−9
 G(4, 4)=−1.12148354E−9
 G(5, 4)=9.63500043E−11
 G(6, 4)=1.01769860E−11
 G(0, 6)=−1.31572154E−9
 G(1, 6)=−1.63723169E−9
 G(2, 6)=−2.93950187E−10
 G(3, 6)=7.15757319E−11
 G(4, 6)=9.65446677E−12
 G(0, 8)=8.13618708E−12
 G(1, 8)=6.47038170E−12
 G(2, 8)=1.38282972E−12
N'=1.52729, vd=56.38

Surface S7 (Exit-Side Surface of Lens L2)
Coordinates:
 O: 28.30128, −21.85833, 0.00000
 VX: −0.99386670, −0.11058471, 0.00000000
 VY: −0.11058471, 0.99386670, 0.00000000
N=1.52729, vd=56.38
C0=0.00000000 (r=∞)
N'=1.00000

Surface S8 (Second Curved-Surface Mirror M2)
Coordinates:
 O: 7.28104, −32.66251, 0.00000
 VX: −0.97383895, 0.22723929, 0.00000000
 VY: 0.22723929, 0.97383895, 0.00000000
N=1.00000
C0=0.00647478 (r=154.4453)
N'=−1.00000

Surface S9$ (Third Curved-Surface Mirror M3)
Coordinates:
 O: 61.49942, −102.33885, 0.00000
 VX: 0.99788549, −0.06499647, 0.00000000
 VY: 0.06499647, 0.99788549, 0.00000000
N=1.00000
C0=0.00000000 (r=∞)

Aspherical Surface Data:
 ε=1.00000000
 G(2, 0)=0.00197072795
 G(3, 0)=−3.81202793E−5
 G(4, 0)=1.19272141E−6
 G(5, 0)=−5.38542004E−8
 G(6, 0)=1.41360965E−9
 G(7, 0)=−3.82550826E−11
 G(8, 0)=1.47325851E−12
 G(9, 0)=−3.45413601E−14
 G(10, 0)=3.04119486E−16

G(0, 2)=0.000872013793
G(1, 2)=−0.000104850044
G(2, 2)=1.80536979E−6
G(3, 2)=−9.01314495E−8
G(4, 2)=5.95985549E−9
G(5, 2)=−1.60308945E−10
G(6, 2)=5.59550963E−13
G(7, 2)=4.70144456E−14
G(8, 2)=−5.63042088E−16
G(0, 4)=6.89777556E−7
G(1, 4)=1.20833762E−8
G(2, 4)=4.77512494E−9
G(3, 4)=−3.42692563E−10
G(4, 4)=8.05014636E−12
G(5, 4)=−2.89407589E−14
G(6, 4)=−8.46251679E−16
G(0, 6)=2.63205584E−9
G(1, 6)=−2.72192836E−10
G(2, 6)=6.25157761E−12
G(3, 6)=−4.24505377E−14
G(4, 6)=4.39725575E−16
G(0, 8)=−2.27825918E−12
G(1, 8)=2.46764250E−13
G(2, 8)=−4.64738423E−15
G(0, 10)=9.77973547E−16
N'=−1.00000

Surface S10$ (Fourth Curved-Surface Mirror M4)
Coordinates:
  O: −4.63688, −83.29060, 0.00000
  VX: −0.85553880, −0.51773870, 0.00000000
  VY: −0.51773870, 0.85553880, 0.00000000
N=1.00000
C0=0.03912606 (r=25.5584)

Aspherical Surface Data:
  ε=−1.38364722
  G(2, 0)=−0.00302387018
  G(3, 0)=−4.38369235E−5
  G(4, 0)=−4.36969411E−7
  G(5, 0)=−2.43344649E−9
  G(6, 0)=−4.87450265E−11
  G(7, 0)=2.71998456E−13
  G(8, 0)=9.46283073E−15
  G(9, 0)=−1.52901684E−16
  G(10, 0)=−2.19268717E−18
  G(0, 2)=−0.00464773078
  G(1, 2)=−0.000224005932
  G(2, 2)=−5.57085914E−6
  G(3, 2)=−3.97620569E−8
  G(4, 2)=−7.15380509E−11
  G(5, 2)=−6.60629040E−12
  G(6, 2)=−6.52115253E−14
  G(7, 2)=1.26650561E−15
  G(8, 2)=1.56465235E−17
  G(0, 4)=−2.78795172E−6
  G(1, 4)=−2.24726148E−8
  G(2, 4)=8.82688577E−10
  G(3, 4)=4.72263924E−12
  G(4, 4)=2.95922334E−14
  G(5, 4)=−2.84662443E−16
  G(6, 4)=−2.54730586E−17
  G(0, 6)=4.95849418E−9
  G(1, 6)=1.09694734E−10
  G(2, 6)=−3.29505803E−13
  G(3, 6)=−2.07116324E−16
  G(4, 6)=1.88426761E−16
  G(0, 8)=−4.17748617E−12

G(1, 8)=−1.53614451E−13
G(2, 8)=−1.36086540E−15
G(0, 10)=−1.00176596E−17
N'=−1.00000

Surface S11 (Flat-Surface Mirror MF)
Coordinates:
  O: 400.00000, −389.48956, 0.00000
  VX: 0.67402959, −0.73870434, 0.00000000
  VY: 0.73870434, 0.67402959, 0.00000000
N=1.00000
C0=0.00000000 (r=∞)
N'=−1.00000

Surface Si (Image Projection Surface)
Coordinates:
  O: 309.46105, −97.78205, 0.00000
  VX: 0.53942016, 0.84203675, 0.00000000
  VY: −0.84203675, 0.53942016, 0.00000000

Imaginary Aperture Stop Data
Coordinates:
  O: 100400.00000, −10552.50000, 0.00000
  VX: 1.00000000, 0.00000000, 0.00000000
  VY: 0.00000000, 1.00000000, 0.00000000
N=1.00000
C0=0.00000000 (r=∞), R=18221.4
N'=1.00000

CONSTRUCTION DATA OF EXAMPLE 10

Surface So (Image Formation Surface)
Coordinates:
  O: 0.00000, 0.00000, 0.00000
  VX: 1.00000000, 0.00000000, 0.00000000
  VY: 0.00000000, 1.00000000, 0.00000000
N=1.00000
C0=0.00000000 (r=∞)
N'=1.00000
T'=0.47

Surface S1 (Entrance-Side Surface of Cover Glass CG)
N=1.00000
C0=0.00000000 (r=∞)
N'=1.51045, vd=61.19
T'=3

Surface S2 (Exit-Side Surface of Cover Glass CG)
N=1.51045, vd=61.19
C0=0.00000000 (r=∞)
N'=1.00000

Surface S3 (First Curved-Surface Mirror M1)
Coordinates:
  O: 48.96700, −14.20240, 0.00000
  VX: 1.00000000, 0.00000000, 0.00000000
  VY: 0.00000000, 1.00000000, 0.00000000
N=1.00000
C0=−0.01546350 (r=−64.6684)
N'=−1.00000

Surface S4$ (Entrance-Side Surface of Lens L1)
Coordinates:
  O: 19.23000, −16.96300, 0.00000
  VX: −0.81867000, −0.57426426, 0.00000000
  VY: −0.57426426, 0.81867000, 0.00000000
N=1.00000
C0=0.00000000 (r=∞)

Aspherical Surface Data:
 ε=1.00000
 G(3, 0)=0.000207464
 G(4, 0)=1.14246E−5
 G(5, 0)=1.20494E−6
 G(6, 0)=1.06696E−7
 G(7, 0)=−3.02936E−8
 G(8, 0)=−4.41178E−9
 G(9, 0)=3.41721E−10
 G(10, 0)=5.54915E−11
 G(1, 2)=0.000162314
 G(2, 2)=1.4371E−5
 G(3, 2)=−4.27162E−7
 G(4, 2)=−7.39006E−7
 G(5, 2)=3.49685E−8
 G(6, 2)=2.42461E−8
 G(7, 2)=−7.2984E−10
 G(8, 2)=−2.68712E−10
 G(0, 4)=8.82019E−7
 G(1, 4)=2.51879E−8
 G(2, 4)=−7.2353E−7
 G(3, 4)=6.41671E−9
 G(4, 4)=5.07206E−8
 G(5, 4)=−9.81886E−10
 G(6, 4)=−8.48865E−10
 G(0, 6)=−1.88006E−8
 G(1, 6)=−8.66998E−9
 G(2, 6)=2.2825E−8
 G(3, 6)=7.41986E−1
 G(4, 6)=−8.93265E−10
 G(0, 8)=4.99054E−11
 G(1, 8)=1.05376E−10
 G(2, 8)=−2.19821E−10
 G(0, 10)=1.84679E−12
N'=1.52729, vd=56.38

Surface S5 (Exit-Side Surface of Lens L1)
 Coordinates:
  O: 17.33700, −16.96300, 0.00000
  VX: −0.81867000, −0.57426426, 0.00000000
  VY: −0.57426426, 0.81867000, 0.00000000
 N=1.52729, vd=56.38
 C0=0.00000000 (r=∞)
 N'=1.00000

Surface S6 (Second Curved-Surface Mirror M2)
 Coordinates:
  O: 10.07900, −11.37240, 0.00000
  VX: −0.98620918, 0.16550365, 0.00000000
  VY: 0.16550365, 0.98620918, 0.00000000
 N=1.00000
 C0=0.01306160 (r=76.5603)
 N'=−1.00000

Surface S7$ (Entrance-Side Surface of Lens L2)
 Coordinates:
  O: 16.28000, −35.77360, 0.00000
  VX: 0.86028006, −0.50982175, 0.00000000
  VY: 0.50982175, 0.86028006, 0.00000000
 N=1.00000
 C0=0.00000000 (r=∞)

Aspherical Surface Data:
 ε=1.00000
 G(3, 0)=−0.000174602
 G(4, 0)=−1.03746E−5
 G(5, 0)=−9.46462E−8
 G(6, 0)=−4.79007E−9
 G(7, 0)=−1.24798E−9
 G(8, 0)=−5.10548E−11
 G(9, 0)=9.2399E−12
 G(10, 0)=6.12688E−13
 G(1, 2)=−0.000108187
 G(2, 2)=−1.04622E−5
 G(3, 2)=1.05953E−7
 G(4, 2)=−1.72241E−8
 G(5, 2)=−9.05722E−10
 G(6, 2)=1.54742E−10
 G(7, 2)=3.46828E−12
 G(8, 2)=−3.61383E−13
 G(0, 4)=−2.00068E−7
 G(1, 4)=2.70886E−7
 G(2, 4)=9.59209E−9
 G(3, 4)=−1.1994E−9
 G(4, 4)=1.34414E−10
 G(5, 4)=6.66588E−12
 G(6, 4)=−3.33295E−14
 G(0, 6)=−7.93457E−9
 G(1, 6)=−1.01883E−9
 G(2, 6)=−4.19726E−11
 G(3, 6)=1.21275E−11
 G(4, 6)=3.18134E−13
 G(0, 8)=4.3472E−11
 G(1, 8)=2.41596E−12
 G(2, 8)=1.25612E−13
 G(0, 10)=−9.91337E−14
N'=1.52729, vd=56.38

Surface S8 (Exit-Side Surface of Lens L2)
 Coordinates:
  O: 17.97600, −35.77360, 0.00000
  VX: 0.86028006, −0.50982175, 0.00000000
  VY: 0.50982175, 0.86028006, 0.00000000
 N=1.52729, vd=56.38
 C0=0.00000000 (r=∞)
 N'=1.00000

Surface S9$ (Third Curved-Surface Mirror M3)
 Coordinates:
  O: 31.19700, −58.89770, 0.00000
  VX: 0.92716589, −0.37465105, 0.00000000
  VY: 0.37465105, 0.92716589, 0.00000000
 N=1.00000
 C0=0.00000000 (r=∞)

Aspherical Surface Data:
 ε=1.00000
 G(2, 0)=−0.00253046
 G(3, 0)=−1.98526E−5
 G(4, 0)=−2.21274E−7
 G(5, 0)=7.4579E−10
 G(6, 0)=−1.3363E−10
 G(7, 0)=−7.42385E−12
 G(8, 0)=−2.08402E−13
 G(9, 0)=1.94289E−14
 G(10, 0)=8.35298E−16
 G(0, 2)=−0.00256062
 G(1, 2)=−2.29562E−5
 G(2, 2)=−1.41116E−7
 G(3, 2)=7.99832E−9
 G(4, 2)=−5.9207E−10
 G(5, 2)=1.91797E−12
 G(6, 2)=1.29835E−12
 G(7, 2)=−4.28515E−15
 G(8, 2)=−1.13043E−15
 G(0, 4)=3.42121E−7
 G(1, 4)=1.4899E−8

G(2, 4)=1.16518E−10
G(3, 4)=−4.61531E−12
G(4, 4)=1.0354E−12
G(5, 4)=−6.46921E−15
G(6, 4)=−8.90709E−16
G(0, 6)=−3.34489E−10
G(1, 6)=−1.39636E−11
G(2, 6)=−4.17459E−13
G(3, 6)=6.3028E−14
G(4, 6)=1.89946E−15
G(0, 8)=7.81396E−13
G(1, 8)=1.05774E−14
G(2, 8)=−8.59272E−17
G(0, 10)=−8.28409E−16
N'=−1.00000

Surface S10$ (Fourth Curved-Surface Mirror M4)
Coordinates:
   O: −242.30500, 6.09706, 0.00000
   VX: −0.98127175, −0.19262855, 0.00000000
   VY: −0.19262855, 0.98127175, 0.00000000
N=1.00000
C0=0.00514069 (r=194.5264)

Aspherical Surface Data:
   $\epsilon$=1.10289
   G(2, 0)=−0.0199628
   G(3, 0)=−0.000119759
   G(4, 0)=−8.34955E−8
   G(5, 0)=−4.45381E−9
   G(6, 0)=−3.42805E−11
   G(7, 0)=2.13827E−13
   G(8, 0)=2.22834E−15
   G(9, 0)=4.3619E−18
   G(10, 0)=−2.1277E−21
   G(0, 2)=−0.0211476
   G(1, 2)=−0.000446694
   G(2, 2)=−2.20143E−6
   G(3, 2)=−2.88962E−8
   G(4, 2)=−4.92707E−10
   G(5, 2)=−2.92292E−12
   G(6, 2)=−1.0437E−14
   G(7, 2)=−5.55082E−17
   G(8, 2)=−1.65605E−19
   G(0, 4)=5.57039E−7
   G(1, 4)=5.87362E−8
   G(2, 4)=3.1969E−10
   G(3, 4)=−5.48985E−13
   G(4, 4)=1.50246E−14
   G(5, 4)=1.66907E−16
   G(6, 4)=3.29182E−19
   G(0, 6)=1.14858E−9
   G(1, 6)=5.76017E−12
   G(2, 6)=−4.45395E−15
   G(3, 6)=2.0592E−16
   G(4, 6)=1.37957E−18
   G(0, 8)=−2.79787E−13
   G(1, 8)=−2.05258E−15
   G(2, 8)=−5.27482E−18
   G(0, 10)=1.84266E−17
N'=−1.00000

Surface S11 (Flat-Surface Mirror MF)
Coordinates:
   O: 57.66300, 0.00000, 0.00000
   VX: 0.99048024, 0.13765496, 0.00000000
   VY: −0.13765496, 0.99048024, 0.00000000
N=1.00000
C0=0.00000000 (r=∞)
N'=−1.00000

Surface Si (Image Projection Surface)
Coordinates:
   O: −144.79156, −432.04276, 0.00000
   VX: −0.99048024, −0.13765496, 0.00000000
   VY: 0.13765496, −0.99048024, 0.00000000

Imaginary Aperture Stop Data
Coordinates:
   O: 100400.00000, −10552.50000, 0.00000
   VX: 1.00000000, 0.00000000, 0.00000000
   VY: 0.00000000, 1.00000000, 0.00000000
N=1.00000
C0=0.00000000 (r=∞), R=18221.4
N'=1.00000

CONSTRUCTION DATA OF EXAMPLE 11

Surface So (Image Formation Surface)
Coordinates:
   O: 0.00000, 0.00000, 0.00000
   VX: 1.00000000, 0.00000000, 0.00000000
   VY: 0.00000000, 1.00000000, 0.00000000
N=1.00000
C0=0.00000000 (r=∞)
N'=1.00000
T'=0.47

Surface S1 (Entrance-Side Surface of Cover Glass CG)
N=1.00000
C0=0.00000000 (r=∞)
N'=1.51872, vd=64.20
T'=3

Surface S2 (Exit-Side Surface of Cover Glass CG)
N=1.51872, vd=64.20
C0=0.00000000 (r=∞)
N'=1.00000

Surface S3 (First Curved-Surface Mirror M1)
Coordinates:
   O: 72.45471, −7.50698, 0.00000
   VX: 0.99073620, 0.13580054, 0.00000000
   VY: −0.13580054, 0.99073620, 0.00000000
N=1.00000
C0=−0.01206016 (r=−82.9177)
N'=−1.00000

Surface S4$ (Entrance-Side Surface of Lens L1)
Coordinates:
   O: 30.51021, −22.14357, 0.00000
   VX: −0.99382597, −0.11095020, 0.00000000
   VY: −0.11095020, 0.99382597, 0.00000000
N=1.00000
C0=0.00000000 (r=∞)

Aspherical Surface Data:
   $\epsilon$=1.00000000
   G(2, 0)=0.000620932631
   G(3, 0)=6.19504515E−5
   G(4, 0)=−4.77919857E−6
   G(5, 0)=−2.52694993E−7
   G(6, 0)=2.90055687E−7
   G(7, 0)=3.67348763E−8
   G(8, 0)=−4.20197238E−9
   G(9, 0)=−9.85113007E−10
   G(10, 0)=−4.62895082E−11

G(0, 2)=0.000769868063
G(1, 2)=3.86684841E−5
G(2, 2)=4.13734108E−7
G(3, 2)=3.89742350E−7
G(4, 2)=1.53405655E−8
G(5, 2)=−1.94662383E−8
G(6, 2)=−6.10739748E−10
G(7, 2)=3.01120062E−10
G(8, 2)=1.99223609E−11
G(0, 4)=1.73029783E−7
G(1, 4)=1.35800660E−7
G(2, 4)=3.35595454E−8
G(3, 4)=−1.98779982E−8
G(4, 4)=−2.79634572E−9
G(5, 4)=3.83292655E−10
G(6, 4)=4.92903037E−11
G(0, 6)=3.98504960E−8
G(1, 6)=−8.76220748E−10
G(2, 6)=−7.94025570E−10
G(3, 6)=2.07808852E−10
G(4, 6)=3.87617172E−1
G(0, 8)=−1.11544584E−9
G(1, 8)=−1.56764241E−1
G(2, 8)=5.79294551E−12
G(0, 10) 1.01002737E−11
N'=1.52729, vd=56.38
T'=2

Surface S5 (Exit-Side Surface of Lens L1)
N=1.52729, vd=56.38
C0=0.00000000 (r=∞)
N'=1.00000

Surface S6* (Second Curved-Surface Mirror M2)
Coordinates:
    O: 13.32137, −23.84864, 0.00000
    VX: −0.99259447, 0.12147513, 0.00000000
    VY: 0.12147513, 0.99259447, 0.00000000
N=1.00000
C0=0.01535417 (r=65.1289)

Aspherical Surface Data:
    ε=3.89368875
    A(4)=2.44022298E−6
    A(6)=−1.62104288E−8
    A(8)=5.97794885E−11
    A(10)=−9.86471907E−14
    A(12)=9.66494410E−17
N'=−1.00000

Surface S7$ (Entrance-Side Surface of Lens L2)
Coordinates:
    O: 26.30279, −48.71061, 0.00000
    VX: 0.78613964, −0.61804892, 0.00000000
    VY: 0.61804892, 0.78613964, 0.00000000
N=1.00000
C0=0.00000000 (r=∞)

Aspherical Surface Data:
    ε=1.00000000
    G(2, 0)=0.00108846673
    G(3, 0)=4.69128435E−5
    G(4, 0)=−1.48895726E−5
    G(5, 0)=−1.49762773E−7
    G(6, 0)=1.63538283E−8
    G(7, 0)=−2.28470576E−9
    G(8, 0)=3.13561060E−11
    G(9, 0)=1.13171702E−11
    G(10, 0)=−1.01710753E−13

G(0, 2)=−0.000245960274
G(1, 2)=−9.15189267E−5
G(2, 2)=−1.76108450E−5
G(3, 2)=5.23832153E−7
G(4, 2)=4.21056426E−8
G(5, 2)=−1.20077211E−10
G(6, 2)=2.53475637E−10
G(7, 2)=−4.04423075E−12
G(8, 2)=−4.11283650E−13
G(0, 4)=2.44799035E−6
G(1, 4)=7.59196854E−7
G(2, 4)=4.85209213E−8
G(3, 4)=−2.54549450E−9
G(4, 4)=−1.81366745E−10
G(5, 4)=−6.87728649E−12
G(6, 4)=−4.79628765E−13
G(0, 6)=−4.65114056E−9
G(1, 6)=−1.35057051E−9
G(2, 6)=−1.61443935E−10
G(3, 6)=4.68707904E−12
G(4, 6)=7.87731950E−13
G(0, 8)=1.17172060E−11
G(1, 8)=1.14861586E−12
G(2, 8)=2.04277867E−13
G(0, 10)=−3.66571456E−14
N'=1.52729, vd=56.38
T'=2

Surface S8 (Exit-Side Surface of Lens L2)
N=1.52729, vd=56.38
C0=0.00000000 (r=∞)
N'=1.00000

Surface S9$ (Third Curved-Surface Mirror M3)
Coordinates:
    O: 73.30020, −91.64368, 0.00000
    VX: 0.94936971, −0.31416105, 0.00000000
    VY: 0.31416105, 0.94936971, 0.00000000
N=1.00000
C0=−0.01205945 (r=−82.9225)

Aspherical Surface Data:
    G(2, 0)=0.00331198982
    G(3, 0)=−3.67342456E−5
    G(4, 0)=−1.28317910E−6
    G(5, 0)=7.53260283E−9
    G(6, 0)=4.16617872E−10
    G(7, 0)=−4.82087538E−13
    G(8, 0)=−7.42417239E−14
    G(9, 0)=5.20648904E−18
    G(10, 0)=5.24506049E−18
    G(0, 2)=0.00227083430
    G(1, 2)=−4.99686705E−5
    G(2, 2)=−1.68188172E−6
    G(3, 2)=2.27034944E−8
    G(4, 2)=9.92288688E−10
    G(5, 2)=−2.73189011E−12
    G(6, 2)=−3.28452909E−13
    G(7, 2)=−1.69512931E−15
    G(8, 2)=2.91970992E−17
    G(0, 4)=−4.33756552E−7
    G(1, 4)=8.77736841E−9
    G(2, 4)=7.42904458E−10
    G(3, 4)=−7.95677364E−12
    G(4, 4)=−6.14021506E−13
    G(5, 4)=−3.33739126E−15
    G(6, 4)=6.24746526E−17
    G(0, 6)=4.77931802E−10

G(1, 6)=1.01763365E−11
G(2, 6)=−2.62298257E−13
G(3, 6)=−1.78104854E−15
G(4, 6)=1.20581039E−16
G(0, 8)=−1.60013918E−13
G(1, 8)=−6.33524359E−15
G(2, 8)=−4.96702645E−17
G(0, 10)=1.74808382E−18
N'=−1.00000

Surface S10$ (Fourth Curved-Surface Mirror M4)
Coordinates:
 O: 11.80997, −86.84980, 0.00000
 VX: −0.94219440, −0.33506672, 0.00000000
 VY: −0.33506672, 0.94219440, 0.00000000
N=1.00000
C0=0.05972131 (r=16.7444)

Aspherical Surface Data:
 ϵ=−3.74769581
 G(2, 0)=0.0383298588
 G(3, 0)=0.00183499516
 G(4, 0)=6.99024075E−5
 G(5, 0)=1.84669364E−6
 G(6, 0)=2.43089081E−8
 G(7, 0)=−1.17597921E−10
 G(8, 0)=−8.99121629E−12
 G(9, 0)=−1.16069875E−13
 G(10, 0)=−5.00510475E−16
 G(0, 2)=0.00758448200
 G(1, 2)=−0.000275731289

G(2, 2)=−3.55311731E−5
G(3, 2)=−9.96144588E−7
G(4, 2)=−6.97586514E−9
G(5, 2)=−5.97734357E−11
G(6, 2)=−9.82775860E−12
G(7, 2)=−2.54799046E−13
G(8, 2)=−1.95425134E−15
G(0, 4)=−5.53394640E−6
G(1, 4)=6.19008684E−7
G(2, 4)=9.94304175E−8
G(3, 4)=5.10286577E−9
G(4, 4)=1.30800595E−10
G(5, 4)=1.71070619E−12
G(6, 4)=9.12297873E−15
G(0, 6)=7.60407915E−9
G(1, 6)=5.28646932E−10
G(2, 6)=1.41888486E−11

G(3, 6)=1.67826127E−13
G(4, 6)=7.52610385E−16
G(0, 8)=−1.60151346E−12
G(1, 8)=−6.85129262E−14
G(2, 8)=−8.64633191E−16
G(0, 10)=9.46099268E−17
N'=−1.00000

Surface S11 (Flat-Surface Mirror MF)
Coordinates:
 O: 400.00000, −480.36765, 0.00000
 VX: 0.29206022, −0.95639993, 0.00000000
 VY: 0.95639993, 0.29206022, 0.00000000
N=1.00000
C0=0.00000000 (r=∞)
N'=−1.00000

Surface Si (Image Projection Surface)
Coordinates:
 O: 230.25125, −168.00993, 0.00000
 VX: 0.86354784, 0.50426691, 0.00000000
 VY: −0.50426691, 0.86354784, 0.00000000

Imaginary Aperture Stop Data
Coordinates:
 O: 100400.00000, −10552.50000, 0.00000
 VX: 1.00000000, 0.00000000, 0.00000000
 VY: 0.00000000, 1.00000000, 0.00000000
N=1.00000
C0=0.00000000 (r=∞), R=18221.4
N'=1.00000

TABLE 5

|  |  | (4a), (4b), (4c) | | | (5) | | | (6) |
| --- | --- | --- | --- | --- | --- | --- | --- | --- |
| Ex. | Lens | Surface | La | Lr | Lr/La | dmax | dmin | dmax/dmin | θ |
| 5 | L1 | Reduction Side | 134.77 | 139.87 | 1.04 | 2.09 | 2.00 | 1.05 | 15.61 |
|  | L2 | Reduction Side | 134.77 | 194.01 | 1.44 | 2.42 | 2.15 | 1.13 | 45.93 |
| 6 | L1 | Reduction Side | 144.59 | 149.92 | 1.04 | 2.09 | 2.03 | 1.03 | 20.00 |
|  | L2 | Reduction Side | 144.59 | 201.36 | 1.39 | 2.16 | 2.01 | 1.08 | 20.00 |
| 7 | L1 | Reduction Side | 188.02 | 264.77 | 1.41 | 2.28 | 1.77 | 1.29 | 15.38 |
|  | L2 | Reduction Side | 188.02 | 282.76 | 1.50 | 2.26 | 1.79 | 1.26 | 15.81 |
| 8 | L1 | Reduction Side | 117.02 | 149.14 | 1.27 | 4.14 | 3.93 | 1.05 | 18.56 |
|  |  | Enlargement Side | 117.02 | 153.19 | 1.31 |  |  |  |  |
| 9 | L1 | Reduction Side | 139.50 | 20.07 | 0.14 | 2.55 | 2.38 | 1.07 | 3.45 |
|  | L2 | Reduction Side | 139.50 | 147.76 | 1.06 | 2.54 | 2.46 | 1.03 | 10.11 |
| 10 | L1 | Reduction Side | 81.74 | 80.01 | 0.98 | 1.65 | 1.50 | 1.10 | 12.63 |
|  | L2 | Reduction Side | 81.74 | 109.43 | 1.34 | 1.73 | 1.50 | 1.15 | 27.07 |
| 11 | L1 | Reduction Side | 114.06 | 117.73 | 1.03 | 1.88 | 1.73 | 1.09 | 15.33 |
|  | L2 | Reduction Side | 114.06 | 160.31 | 1.41 | 3.50 | 3.12 | 1.12 | 11.04 |

TABLE 6

|  | (7) | | |
| --- | --- | --- | --- |
| Ex. | H3 | H4 | H4/H3 |
| 5 | 30.58 | 44.97 | 1.47 |
| 6 | 31.63 | 38.58 | 1.22 |
| 7 | 23.52 | 42.57 | 1.81 |
| 8 | 16.62 | 43.63 | 2.62 |
| 9 | 27.81 | 40.08 | 1.44 |
| 10 | 33.50 | 36.11 | 1.08 |
| 11 | 44.53 | 42.62 | 0.96 |

Table 7 shows the values of conditional formulae (4b), (5), and (7) as actually observed in each of Examples 1 to 4. It should be noted that the distance La in conditional formula (4b) corresponds to the distance along the reference ray from the image formation surface So to where the principal rays converge. Table 8 shows the values of conditional formulae (1) and (2) and the data related thereto as actually observed in each of Examples 5 to 11. The values of L and R are those observed at 20° C., and the variations ΔL and ΔR are the differences between the values of L and R observed at 20° C. and those observed at 50° C. (that is, (the 50° C. values)–(the 20° C. values), respectively). The values of R are those observed on the XY-plane.

TABLE 7

| Ex. | (4b)<br>Lr/La | (5)<br>dmax/dmin | (7)<br>H4/H3 |
|---|---|---|---|
| 1 | 0.99 | 1.05 | 1.05 |
| 2 | 0.87 | 1.10 | 1.15 |
| 3 | 0.92 | 1.09 | 1.33 |
| 4 | 0.90 | 1.09 | 1.23 |

TABLE 8

| Ex. | L (mm) | R (mm) | ΔL (mm) | ΔR (mm) | (1)<br>|2ΔL/ΔR| | (2)<br>R/L |
|---|---|---|---|---|---|---|
| 5  | 84.776  | −97.615  | 0.0636 | −0.0275 | 4.62 | −1.15 |
| 6  | 90.774  | −105.543 | 0.0681 | −0.0298 | 4.57 | −1.16 |
| 7  | 113.076 | −148.296 | 0.0848 | −0.0418 | 4.06 | −1.31 |
| 8  | 71.007  | −90.225  | 0.0533 | −0.0254 | 4.19 | −1.27 |
| 9  | 88.067  | −108.143 | 0.0660 | −0.0305 | 4.33 | −1.23 |
| 10 | 48.967  | −64.668  | 0.0367 | −0.0182 | 4.03 | −1.32 |
| 11 | 72.455  | −82.918  | 0.0543 | −0.0234 | 4.65 | −1.14 |

What is claimed is:

1. A projection optical system for projecting, while enlarging, an image formed on an image formation surface onto an image projection surface obliquely relative to the image projection surface, the projection optical system comprising:
   a plurality of curved reflective surfaces including at least a first convex reflective surface; and
   at least one aberration correcting refractive surface,
   wherein at least one of the aberration correcting refractive surface fulfills conditional formula (4b) below, and is located in an optical path on an enlargement side of the first convex reflective surface as counted from a reduction side, and a most enlargement-side curved optical surface is a reflective surface:

$$1.1 < Lr/La < 2 \quad (4b)$$

where, let a ray traveling from an image center on the image formation surface through a center of a pupil to an image center on the image projection surface be called a "reference ray",
   La represents a distance from the image formation surface to the pupil along the reference ray; and
   Lr represents a distance from the image formation surface to the aberration correction refractive surface along the reference ray.

2. The projection optical system of claim 1, wherein there are provided at least four of the curved reflective surfaces, and the third and fourth curved reflective surfaces as counted from the reduction side fulfill conditional formula (7) below:

$$0.8 < H4/H3 < 2 \quad (7)$$

where
   H3 represents a linear distance from an upper limit point to a lower limit point of an effective area of the third curved reflective surface, as measured on a plane including paths along which the reference ray is incident on and emergent from the third curved reflective surface; and
   H4 represents a linear distance from an upper limit point to a lower limit point of an effective area of the fourth curved reflective surface, as measured on a plane including paths along which the reference ray is incident on and emergent from the fourth curved reflective surface.

3. The projection optical system of claim 1, wherein at least one of the first and second curved reflective surfaces as counted from the reduction side is a spherical surface.

4. The projection optical system of claim 3, wherein the plurality of curved reflective surfaces comprises at least four curved reflective surfaces, and wherein at least one of the third and fourth curved reflective surfaces as counted from the reduction side is a non-rotation-symmetric free-form curved surface.

5. The projection optical system of claim 1, further comprising:
   at least one transmissive optical element having the aberration correction refractive surface and fulfilling conditional formula (5) below:

$$d\max/d\min < 1.5 \quad (5)$$

where, in a direction along an arbitrary ray that passes through the transmissive optical element,
   dmax represents a maximum distance from a reduction-side surface to an enlargement-side surface of the transmissive optical element; and
   dmin represents a minimum distance from the reduction-side surface to the enlargement-side surface of the transmissive optical element 6. The projection optical system of claim 1, wherein at least one of the aberration correction refractive surface fulfils conditional formula (6) below:

$$5 < \eta < 50 \quad (6)$$

where, let a ray traveling from an image center on the image formation surface through a center of a pupil to an image center on the image projection surface be called a "reference ray",
   η represents an angle in degrees between the reference ray and a line normal to the aberration correction refractive surface, as measured at a point where the reference ray intersects the aberration correction refractive surface.

7. The projection optical system of claim 1, wherein the plurality of curved reflective surfaces comprises at least three curved reflective surfaces, and wherein the first, second, and third curved reflective surfaces as counted from the reduction side are concave, convex, and concave, respectively, toward a side from which light is incident thereon.

* * * * *

UNITED STATES PATENT AND TRADEMARK OFFICE
CERTIFICATE OF CORRECTION

PATENT NO. : 7,880,972 B2
APPLICATION NO. : 12/165969
DATED : February 1, 2011
INVENTOR(S) : Masayuki Imaoka, Tomokazu Masubuchi and Jun Ishihara It is certified that error appears in the above-identified patent and that said Letters Patent is hereby corrected as shown below:

Column 76:
Line 38, claim 5, delete "missive optical element"
and insert -- missive optical element. --.

Column 76:
Line 43, claim 6, delete "$5 < \eta < 50$         (6)"
and insert -- $5 < \theta < 50$         (6) --.

Column 76:
Line 48, claim 6, delete "$\eta$    represents an angle in degrees between the reference ray"
and insert -- $\theta$    represents an angle in degrees between the reference ray --.

Signed and Sealed this
Nineteenth Day of April, 2011

David J. Kappos
*Director of the United States Patent and Trademark Office*